US012790770B2

(12) United States Patent
Heimrich et al.

(10) Patent No.: US 12,790,770 B2
(45) Date of Patent: Nov. 10, 2026

(54) COMPACTING POWER TOOL

(71) Applicant: BLACK & DECKER INC., New Britain, CT (US)

(72) Inventors: Tim Heimrich, Bad Camberg (DE); Markus Rompel, Runkel (DE); Rene Thieme, Riesa (DE); Dieter Schmidtfrerick, Idstein (DE); Marco Kugler, Waldbrunn-Haused (DE); Petra Mocibov Koehler, Wetzlar (DE); Fridtjof Krische, Mainz (DE)

(73) Assignee: BLACK & DECKER INC., New Britain, CT (US)

( * ) Notice: Subject to any disclaimer, the term of this patent is extended or adjusted under 35 U.S.C. 154(b) by 507 days.

(21) Appl. No.: 18/447,575

(22) Filed: Aug. 10, 2023

(65) Prior Publication Data

US 2023/0392326 A1 Dec. 7, 2023

Related U.S. Application Data

(63) Continuation of application No. PCT/EP2022/055123, filed on Mar. 1, 2022.

(30) Foreign Application Priority Data

Mar. 1, 2021 (GB) ...................................... 2102883

(51) Int. Cl.
*E01C 19/40* (2006.01)
*E01C 21/00* (2006.01)
(Continued)

(52) U.S. Cl.
CPC ............ *E01C 19/402* (2013.01); *E01C 21/00* (2013.01); *E02D 3/068* (2013.01); *F16F 15/04* (2013.01);
(Continued)

(58) Field of Classification Search
CPC .... E01C 19/402; E01C 21/00; H01M 10/623; H01M 10/6561; H01M 50/242;
(Continued)

(56) References Cited

U.S. PATENT DOCUMENTS 6,582,155 B1 * 6/2003 Bromberger ............ F16F 15/08 429/96
7,682,102 B1 * 3/2010 Burke ..................... E01C 19/35 404/133.05
(Continued)

FOREIGN PATENT DOCUMENTS

| | | | | |
|---|---|---|---|---|
| DE | 102020105242 | A1 * | 9/2021 | .......... H01M 10/613 |
| EP | 3744897 | A1 | 12/2020 | |
| JP | 2013181324 | A | 9/2013 | |
| WO | 2013107613 | A1 | 7/2013 | |
| WO | 2020194727 | A1 | 10/2020 | |

OTHER PUBLICATIONS

Search Report and Written Opinion dated Jul. 29, 2022 cited in corresponding PCT Application No. PCT/EP2022/055123.
Combined Search and Examination Report, GB Application No. 2102883.2, Aug. 31, 2021, 5 pages, UKIPO.
(Continued)

*Primary Examiner* — Raymond W Addie
(74) *Attorney, Agent, or Firm* — Rhonda L. Barton

(57) ABSTRACT

A compacting power tool comprising: a motor; a housing; at least one handle connected to the housing; a reciprocating drive mechanism coupled to the motor; and a compacting foot coupled to the reciprocating drive mechanism and configured to engage a surface to be compacted; a battery carrier coupled to a vibration compensation mechanism moveably mounted on a side of the housing.

35 Claims, 27 Drawing Sheets

(51) Int. Cl.

| | |
|---|---|
| ***E02D 3/068*** | (2006.01) |
| ***F16F 15/04*** | (2006.01) |
| ***H01M 10/623*** | (2014.01) |
| ***H01M 10/6561*** | (2014.01) |
| ***H01M 50/242*** | (2021.01) |
| ***H01M 50/247*** | (2021.01) |
| *H01M 50/51* | (2021.01) |
| *H01M 50/512* | (2021.01) |

(52) U.S. Cl.

CPC ..... *H01M 10/623* (2015.04); *H01M 10/6561* (2015.04); *H01M 50/242* (2021.01); *H01M 50/247* (2021.01); *F16F 2222/08* (2013.01); *F16F 2228/04* (2013.01); *F16F 2236/08* (2013.01); *H01M 50/51* (2021.01); *H01M 50/512* (2021.01); *H01M 2220/30* (2013.01)

(58) Field of Classification Search

CPC ............... H01M 50/247; H01M 50/51; H01M 50/512; H01M 2220/30; F16F 15/04; F16F 2222/08; F16F 2228/04; F16F 2236/08

USPC .......................................... 404/133.05–133.1

See application file for complete search history.

(56) References Cited

U.S. PATENT DOCUMENTS

| | | | | |
|---|---|---|---|---|
| 9,284,697 | B2 | 3/2016 | Steffen | |
| 2004/0234337 | A1 | 11/2004 | Burkert et al. | |
| 2010/0296869 | A1 | 11/2010 | Catanzarite et al. | |
| 2013/0004237 | A1* | 1/2013 | Krings .................. | E01C 19/288 404/133.05 |
| 2013/0279980 | A1 | 10/2013 | Steffen | |
| 2014/0154535 | A1* | 6/2014 | Olsson ................ | H01M 10/613 429/53 |
| 2014/0262400 | A1 | 9/2014 | Berger et al. | |
| 2016/0032548 | A1 | 2/2016 | Braun | |
| 2019/0078282 | A1 | 3/2019 | Steffen et al. | |
| 2024/0392516 | A1* | 11/2024 | Carroll .................... | E01C 19/35 |

OTHER PUBLICATIONS

International Preliminary Report on Patentability, PCT Application No. PCT/EP2022/055123, Aug. 29, 2023, 12 pages, WIPO.

Communication pursuant to Article 94(3) EPC, EP Application No. 22709704.5, Mar. 12, 2025, 4 pages, EPO.

Communication pursuant to Article 94(3) EPC, EP Application No. 22709704.5, Oct. 16, 2025, 6 pages, EPO.

* cited by examiner

COMPACTING POWER TOOL

TECHNICAL FIELD

The present disclosure relates to a compacting power tool. In particular the present disclosure relates to a battery powered rammer.

BACKGROUND

Some power tools are designed for robust tasks such as compacting soil, asphalt or hardcore. One such known power tool is a rammer which comprises a reciprocating foot which impacts and flattens the surface to be compacted. A rammer may also be known as a tamper, a soil compactor, a jumping jack compactor, or a jumping jack tamper.

Some known rammers comprise an engine for driving the reciprocating plate whilst other rammers comprises a motor connected to a battery for driving the reciprocating plate. It may be preferable to use a battery powered rammer because some worksites may have strict exhaust emission control which may prevent use of a gas powered rammer.

A problem with the rammer and other similar soil compacting power tools is that the operator and internal components can experience excessive vibrations during operation. If the components are exposed to prolonged vibrations from the rammer, then some of the internal components such as the battery and electronics in the rammer can be damaged due to the vibrations during operation.

It is known that rammers and other such soil compacting power tools can comprise a vibration dampening system for components of the rammer. One such arrangement is shown in EP2804987 wherein a battery is mounted on top of the housing. This means that the battery experiences reduced vibrations from the rammer during operation.

A problem with this is that the height of the rammer is increased which makes the rammer less stable. Accordingly, if the user needs to inspect or replace the battery, the user must release their grip from the rammer handle and physically move towards the battery. This can be dangerous because the rammer can topple over when the user adjusts their grip to access the battery.

SUMMARY

Examples of the present disclosure aim to address the aforementioned problems and other problems.

According to an aspect of the present disclosure there is provided a compacting power tool comprising: a motor; a housing; at least one handle connected to the housing; a reciprocating drive mechanism coupled to the motor; and a compacting foot coupled to the reciprocating drive mechanism and configured to engage a surface to be compacted; a battery carrier coupled to a vibration compensation mechanism moveably mounted on a side of the housing.

Optionally, the vibration compensation mechanism is moveable between a first position and a second position during operation.

Optionally, the vibration compensation mechanism comprises at least one pivotable coupling.

Optionally, the vibration compensation mechanism comprises a first pivotable coupling to the housing and a second pivotable coupling to the handle.

Optionally, the vibration compensation mechanism comprises a vibration dampening mechanism.

Optionally, the vibration dampening mechanism comprises a frequency tuning mechanism.

Optionally, the frequency tuning mechanism comprises at least one spring.

Optionally, the compacting power tool further comprising a battery removably coupled to the battery carrier, the battery carrier comprises at least one electrical connection configured to electrically couple battery with the motor.

Optionally, at least one air conduit is connected between the housing and the vibration compensation mechanism for providing an air flow to the battery.

Optionally, at least one wire conduit is connected between the housing and the vibration compensation mechanism for routing wiring between the motor and the battery.

Optionally, the at least one air conduit and/or the at least one wire conduit are moveable with respect to the housing or the vibration compensation mechanism.

Optionally, the reciprocating drive mechanism and the compacting foot are configured to move substantially along a longitudinal axis of the compacting power tool.

Optionally, the vibration compensation mechanism is configured to move along a second axis remote from the longitudinal axis.

Optionally, the second axis is inclined to the longitudinal axis.

Optionally, the second axis is parallel to the longitudinal axis.

Optionally, the longitudinal axis of the compacting power tool is inclined with respect to a plane of the compacting foot.

Optionally, the battery is mounted on the vibration compensation mechanism at a position between an intersection of the longitudinal axis of the compacting power tool and the plane of the compacting foot and the handle.

Optionally, at least a portion of the vibration compensation mechanism is mounted on a side of the housing between the motor and the handle.

Optionally, the power tool is a rammer, a tamper, a soil compactor, a compactor, a jumping jack compactor, a jumping jack tamper, a plate compactor, or a vibratory plate.

Optionally, the battery carrier is arranged to mechanically and electrically couple to at least one battery pack.

According to another aspect, there is provided a compacting power tool comprising: a housing having a motor mounted within the housing; at least one handle connected to the housing; a reciprocating drive mechanism coupled to the motor; a compacting foot coupled to the reciprocating drive mechanism and configured to engage a surface to be compacted; and a battery electrically connected to the motor is mounted on a side of the housing between the motor and the handle.

According to another aspect of the present disclosure there is provided a compacting power tool comprising: a housing; a motor; a reciprocating drive mechanism coupled to the motor; and a compacting foot coupled to the reciprocating drive mechanism and configured to engage a surface to be compacted; and a controller configured to receive at least one motor signal and to determine a change in the operational load of the motor based on the received at least one motor signal when the compacting foot is not engaging the surface to be compacted.

Optionally, the controller is configured to send a control signal to modify the operation of the motor based on a determined change in the operational load of the motor.

Optionally, the controller is configured to send a stop signal to stop the operation of the motor or a slow signal to slow the speed of the motor.

Optionally, the at least one motor signal is a current signal, a voltage signal, a speed signal, motor parameter or a control variable.

Optionally, the controller is configured to determine that at least one motor signal exceeds or drops below a predetermined threshold.

Optionally, the predetermined threshold corresponds to when the motor has no operational load.

Optionally, at least one handle connected to the housing and the handle comprises an ON/OFF switch.

Optionally, at least one handle connected to the housing and the handle comprises at least one user operated switch.

Optionally, the at least one user operated switch is a hold to use switch.

Optionally, the controller is configured to receive a switch signal from the at least one user operated switch.

Optionally, the controller is configured to issue a stop signal to the motor in dependence of the received switch signal from the at least one user operated switch.

Optionally, the at least one user operated switch is configured to send a signal to the controller if the user releases the at least one user operated switch.

Optionally, the controller issues the stop signal to the motor if controller does not detect actuation of the at least one user operated switch within a predetermined timer period.

Optionally, at least one handle comprises both the at least one user operated switch and the ON/OFF switch.

Optionally, wherein the power tool comprises a tilt sensor configured to send a tilt signal to the controller.

Optionally, the controller is configured to issue a stop signal to the motor in dependence of the received tilt signal exceeding a predetermined tilt angle threshold.

Optionally, the power tool is a rammer, a tamper, a soil compactor, a compactor, a jumping jack compactor, a jumping jack tamper, a plate compactor, or a vibratory plate.

According to another aspect, there is provided a controller for a compacting power tool having a motor, a reciprocating drive mechanism coupled to the motor and a compacting foot coupled to the reciprocating drive mechanism and configured to engage a surface to be compacted, wherein the controller is configured to: receive at least one motor signal; and determine a change in the operational load of the motor based on the received at least one motor signal when the compacting foot does not engage a surface to be compacted.

Optionally, the controller is further configured to send a control signal to modify the operation of the motor based on a determined change in the operational load of the motor.

According to another aspect, there is provided a compacting power tool comprising: a housing; a motor; a reciprocating drive mechanism coupled to the motor; and a compacting foot coupled to the reciprocating drive mechanism and configured to engage a surface to be compacted; and a controller configured to: receive at least one signal relating to one or more parameters and/or variables of the compacting power tool; determine an operational status function based on the received at least one signal; and determine a change in the operational status function corresponding to an operational change in the compacting power tool.

Optionally, the controller is configured to calculate a threshold value indicating the operational change of the compacting power tool, wherein the controller is configured to calculate the threshold value from a threshold function is based on the at least one signal.

Optionally, the controller is configured to determine the change in the operational status function when the operational status function exceeds or drops below the calculated threshold value.

Optionally, the change in the operational status function corresponds to when the compacting foot is not engaging the surface to be compacted.

According to another aspect of the present disclosure there is a compacting power tool comprising: a housing; a motor and a first electrical storage electrically connected to the motor mounted within the housing; a reciprocating drive mechanism coupled to the motor; and a compacting foot coupled to the reciprocating drive mechanism and configured to reciprocate and engage a surface to be compacted when the motor is operating; and an energy capture system comprising a second electrical energy storage and at least one generator electrically connected to the second electrical energy storage, wherein the at least one generator is coupled to the reciprocating drive mechanism.

Optionally, the at least one generator comprises the motor.

Optionally, the at least one generator comprises a linear generator.

Optionally, the energy capture system is configured to store electrical energy in the second electrical energy storage when operation of the motor is interrupted.

Optionally, the energy capture system is configured to store electrical energy in the second electrical energy storage when the reciprocating drive mechanism is moved at least partly under the influence of gravity.

Optionally, the first electrical storage is a first battery mounted on the housing.

Optionally, the second electric storage is a second battery mounted on the housing.

Optionally, the second electrical storage is a supercapacitor.

Optionally, the second electrical energy storage system is configured to supply a current to the motor when the motor is operating.

Optionally, the first and the second electrical storages are both configured to supply a current to the motor when the motor is operating.

Optionally, the first and the second electrical storages are both configured to selectively supply a current to the motor when the motor is operating.

Optionally, the first and/or the second electrical storages selectively supply a current to the motor when the motor is operating in response to a user actuated signal.

Optionally, an actuator mounted on a handle is configured to generate the user actuated signal.

Optionally, the first and the second electrical storages are separate electrical storages.

Optionally, the first electrical storage and the second electrical storage are mounted in the same battery pack.

Optionally, the first and/or the second electrical storage are removeable.

Optionally, the compacting power tool comprises a controller configured to receive a current signal from the motor and to determine a change in the operational load of the motor based on the current signal.

Optionally, the controller is configured to determine that the current through the motor drops below a predetermined threshold current.

Optionally, the predetermined threshold current is a current corresponding to when the motor has no operational load.

Optionally, the controller is configured to send a control signal to the second electrical storage in dependence of the determined change.

Optionally, the compacting power tool comprises a controller configured to: receive a signal indicating the back EMF from the motor; and switch a connection of the motor from the first electrical storage to the second electrical storage in dependence on the back EMF.

Optionally, the at least one generator comprises a linear generator comprising a sliding magnet mounted to the reciprocating mechanism.

According to another aspect, there is provided a compacting power tool comprising: a housing; a motor and a first electrical storage electrically connected to the motor mounted within the housing; a reciprocating drive mechanism coupled to the motor; and a compacting foot coupled to the reciprocating drive mechanism and configured to reciprocate and engage a surface to be compacted when the motor is operating; and an energy capture system comprising a second electrical energy storage and at least one generator configured to convert mechanical energy into electrical energy, wherein the at least one generator is electrically connected to the second electrical energy storage.

Optionally, the at least one generator comprises a linear generator mounted to the housing and comprising a magnet movable with respect to one or more coils.

Optionally, the at least one generator comprises a piezoelectric element.

Optionally, the power tool is a rammer, a tamper, a soil compactor, a compactor, a jumping jack compactor, a jumping jack tamper, a plate compactor, or a vibratory plate.

According to another aspect of the present disclosure there is a compacting power tool comprising: a housing; a motor mounted within the housing; a reciprocating drive mechanism coupled to the motor, wherein reciprocating drive mechanism comprises a reciprocating piston movable between a first position and a second position; a compacting foot coupled to the reciprocating drive mechanism and configured to reciprocate and engage a surface to be compacted when the motor is operating; and a controller configured to cause the motor to provide a first torque when the reciprocating piston is moving from the first position to the second position and to provide a second torque when the reciprocating piston is moving from the second position to the first position, wherein the first torque is greater than the second torque.

According another aspect, there is provided a compacting power tool comprising: a housing; a motor mounted within the housing; a reciprocating drive mechanism coupled to the motor, wherein reciprocating drive mechanism comprises a reciprocating piston movable between a first position and a second position; a compacting foot coupled to the reciprocating drive mechanism and configured to reciprocate and engage a surface to be compacted when the motor is operating; and a controller configured to cause the motor to provide an increasing torque when the reciprocating piston is moving from the first position to the second position and to provide no or a reduced torque when the reciprocating piston is moving from the second position to the first position.

Optionally, the reciprocating piston moves from the first position to the second position and back to the first position in a cycle of operation, the controller being configured to increase the speed of the motor for each subsequent cycle of operation.

Optionally, the controller is configured to increase the speed of the motor for each subsequent cycle of operation up to a target speed.

Optionally, the controller is configured to, when the speed reaches the target speed, control the speed of the motor to be constant during each subsequent cycle of operation.

Optionally, the motor comprises a drive shaft that is directly coupled to an eccentric drive wheel of the reciprocating drive mechanism.

Optionally, the motor comprises a drive shaft that is coupled to an eccentric drive wheel of the reciprocating drive mechanism via at least one gear.

Optionally, the drive shaft is coupled to the eccentric drive wheel without a clutch therebetween.

Optionally, the power tool is a rammer, a tamper, a soil compactor, a compactor, a jumping jack compactor, a jumping jack tamper, a plate compactor, or a vibratory plate.

According to another aspect, there is provided a method for a compacting power tool comprising a reciprocating drive mechanism coupled to a motor, wherein reciprocating drive mechanism comprises a reciprocating piston movable between a first position and a second position, the method comprising: controlling the motor to provide a first torque when the reciprocating piston is moving from the first position to the second position; and controlling the motor to provide a second torque when the reciprocating mass is moving from the second position to the first position, wherein the first torque is greater than the second torque.

According to another aspect, there is provided a method for a compacting power tool comprising a reciprocating drive mechanism coupled to a motor, wherein reciprocating drive mechanism comprises a reciprocating piston movable between a first position and a second position, the method comprising: controlling the motor to provide an increasing torque when the reciprocating piston is moving from the first position to the second position; and controlling the motor to provide no or a reduced torque when the reciprocating piston is moving from the second position to the first position.

Optionally, the reciprocating mass moves from the first position to the second position and back to the first position in a cycle of operation, the method further comprising the step of increasing the speed of the motor for each subsequent cycle of operation.

Optionally, the speed is increased for each subsequent cycle of operation up to a target speed.

Optionally, the speed reaches the target speed, controlling the speed of the motor to be constant during each subsequent cycle of operation.

Optionally, the motor comprises a drive shaft that is directly coupled to an eccentric drive wheel of the reciprocating drive mechanism.

Optionally, the motor comprises a drive shaft that is coupled to an eccentric drive wheel of the reciprocating drive mechanism via at least one gear.

Optionally, the drive shaft is coupled to the eccentric drive wheel without a clutch therebetween.

Optionally, the power tool is a rammer, a tamper, a soil compactor, a compactor, a jumping jack compactor, a jumping jack tamper, a plate compactor, a vibratory plate, concrete vibrator, or a concrete screed.

Optionally, the battery carrier is mounted on a first and/or second lateral side of the housing extending between a front side and a rear side of the housing.

Optionally, the vibration compensation mechanism comprises a mass dampener.

Optionally, the battery carrier comprises an electronics module.

Optionally, the electronics module comprises one or more components for controlling the compacting power tool.

Optionally, the battery carrier is mounted to at least one moveable plate and the at least one moveable plate is coupled to the housing via at least one torsional dampener.

In another aspect of the disclosure there is provided a compacting power tool comprising: a motor; a housing; at least one handle connected to the housing; a reciprocating drive mechanism coupled to the motor; a compacting foot coupled to the reciprocating drive mechanism and configured to engage a surface to be compacted; and at least one first battery pack and at least one second battery pack, the at least one first battery pack and the at least one second battery pack being electrically connectable to the motor.

Optionally, the at least one first battery pack and the at least one second battery pack are connected in series.

Optionally, the at least one first battery pack and the at least one second battery pack are connected in parallel.

Optionally, the compacting power tool comprising a controller configured to selectively connect the at least one first battery pack and the at least one second battery pack to the motor.

Optionally, the controller is configured to connect the at least one first battery pack and/or the at least one second battery pack to the motor in dependence of a received signal.

Optionally, the received signal is a manually actuated signal indicating a user battery selection.

Optionally, the received signal comprises a voltage indication of the at least one first battery pack and/or the at least one second battery pack and the controller is configured to connect the motor to the at least one first battery pack and/or the at least one second battery pack in dependence of the voltage indication of the at least one first battery pack and/or the at least one second battery pack.

Optionally, the controller is configured to connect the at least one first battery pack and/or the at least one second battery pack to the motor in series, in parallel or separately.

Optionally, the controller is configured to compare the voltage indication of the at least one first battery pack and the at least one second battery pack and connect the at least one first battery pack or the at least one second battery pack in dependence of the voltage indication of the at least one first battery pack or the at least one second battery pack being closest to a required voltage of the motor.

Optionally, the required voltage of the motor is in dependence of the motor speed, a motor voltage rating, or a motor parameter.

Optionally, the received signal comprises an indication that a status of either the at least one first battery pack or the at least one second battery pack has exceeded a threshold and the controller is configured to connect the motor to the other of the at least one first battery pack or the at least one second battery pack which has not exceeded the threshold.

Optionally, the threshold is a battery operating temperature threshold, a battery capacity threshold, a battery voltage threshold, or a battery current threshold.

Optionally, the received signal is signal indicating an error status of either the at least one first battery pack or the at least one second battery pack is malfunctioning or disconnected and the controller is configured to connect the motor to the other of the at least one first battery pack or the at least one second battery pack.

Optionally, the at least one first battery pack and at least one second battery pack are mountable on a battery carrier coupled to a vibration compensation mechanism moveably mounted on a side of the housing.

Optionally, the at least one first battery pack and at least one second battery pack are mountable on a battery carrier mounted on the at least one handle.

Optionally, the at least one first battery pack and at least one second battery pack are mountable on separate battery carriers and each battery carrier is coupled to a separate vibration compensation mechanism.

Optionally, the controller is configured to connect the at least one first battery pack to the motor and the at least one second battery pack to an electrical generator.

Optionally, the electrical generator recovers energy from the rammer during operation.

In another aspect of the disclosure, there is provided a compacting power tool comprising: a motor; a housing; at least one handle connected to the housing; a reciprocating drive mechanism coupled to the motor; a compacting foot coupled to the reciprocating drive mechanism and configured to engage a surface to be compacted; a first battery pack interface and a second battery pack interface; a battery pack couplable to one of the first or second battery pack interface; an adaptor couplable to the other of the first or second battery pack interface, wherein the adaptor is connected to an alternating current (AC) power source and comprises an AC to direct current (DC) converter for converting AC power from the AC power source to DC power.

BRIEF DESCRIPTION OF THE DRAWINGS

Various other aspects and further examples are also described in the following detailed description and in the attached claims with reference to the accompanying drawings, in which:

DETAILED DESCRIPTION

Figure 1:
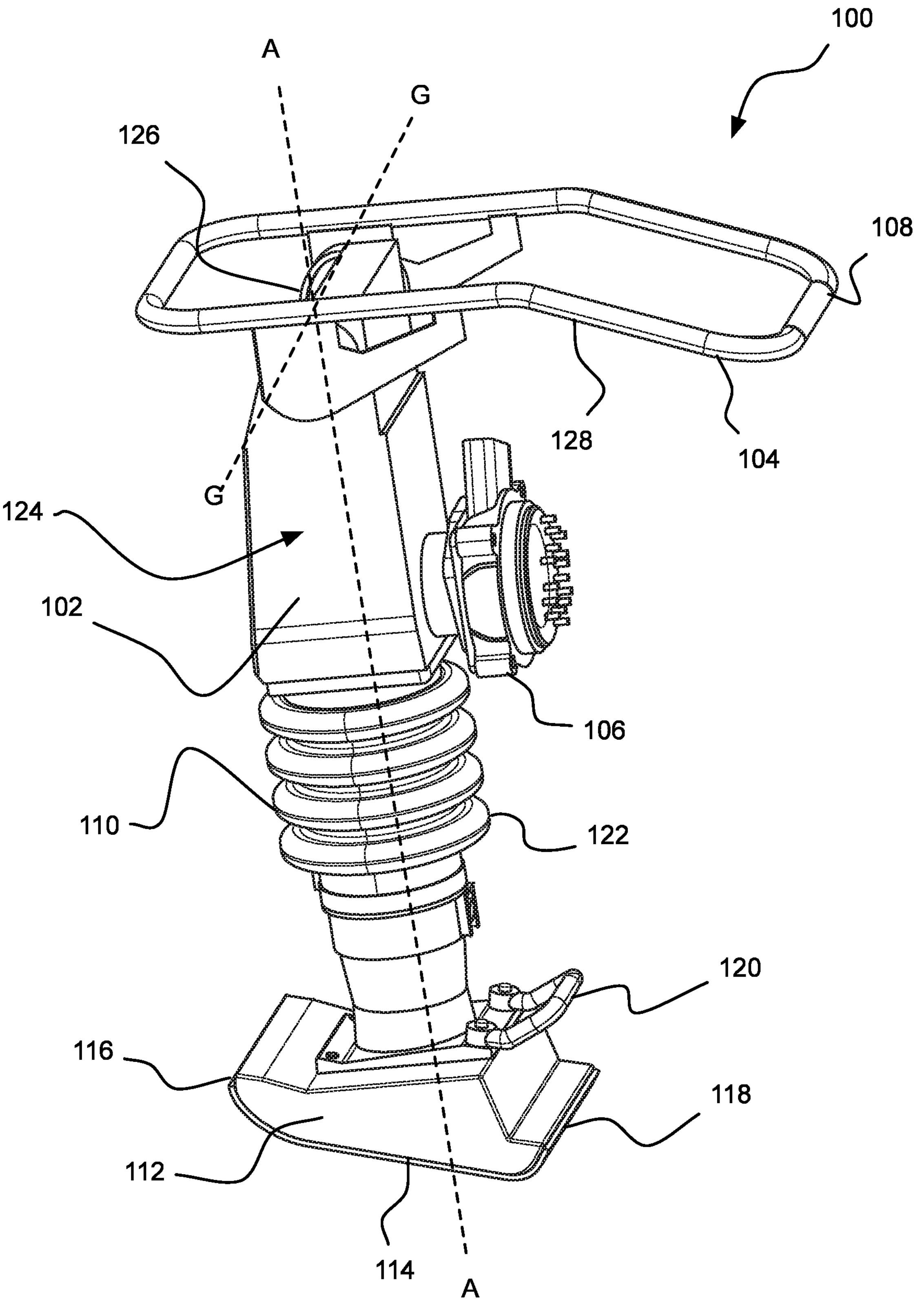
FIG. 1 shows a perspective view of a rammer according to an example.

FIG. 1 shows a perspective view of a compacting power tool 100. The compacting power tool 100 as shown in FIG. 1 is a rammer 100. Whilst FIG. 1 shows a rammer 100, in other examples any other type of surface compacting power tool 100 can be used. For example, the compacting power tool 100 can be a tamper, a soil compactor, a compactor, a jumping jack compactor, a plate compactor, a vibratory plate. or a jumping jack tamper.

Hereinafter the term "rammer" will be used to describe the arrangements shown in the accompanying Figures.

The rammer 100 comprises a primary housing 102. The primary housing 102 comprises a clam shell type construction having two halves which are fastened together. The halves of the primary housing 102 are fastened together with screws but in alternative examples any suitable means for fastening the primary housing 102 together may be used such as glue, clips, bolts and so on. For the purposes of clarity, the fastenings in the primary housing 102 are not shown in FIG. 1. The primary housing 102 can comprise a unitary element surrounding the internal components of the rammer 100. In other examples, the primary housing 102 can comprise one or more housing portions (not shown) which are mounted together to form the primary housing 102.

As shown in FIG. 1, the primary housing 102 is connected to a handle 104 for the user to grip during use. Optionally, one or more other secondary handles 120 can be mounted to the primary housing 102 to provide alternative gripping positions e.g. when the rammer 100 is not in use. In some examples, the handle 104 is moveable with respect to the primary housing 102. In some examples, the handle 104 is pivotally mounted on the primary housing 102 at a pivotal mounting 126. The pivotal mounting 126 in some examples is a rubber mounting or other flexible material for permitting pivotable movement of the handle 104 with respect to the primary housing 102 about pivotal axis G-G. In some other examples, the pivotable mounting 126 can be any suitable pivotable mounting to provide pivotal movement of the handle 104 with respect to the primary housing 102.

Figure 9:
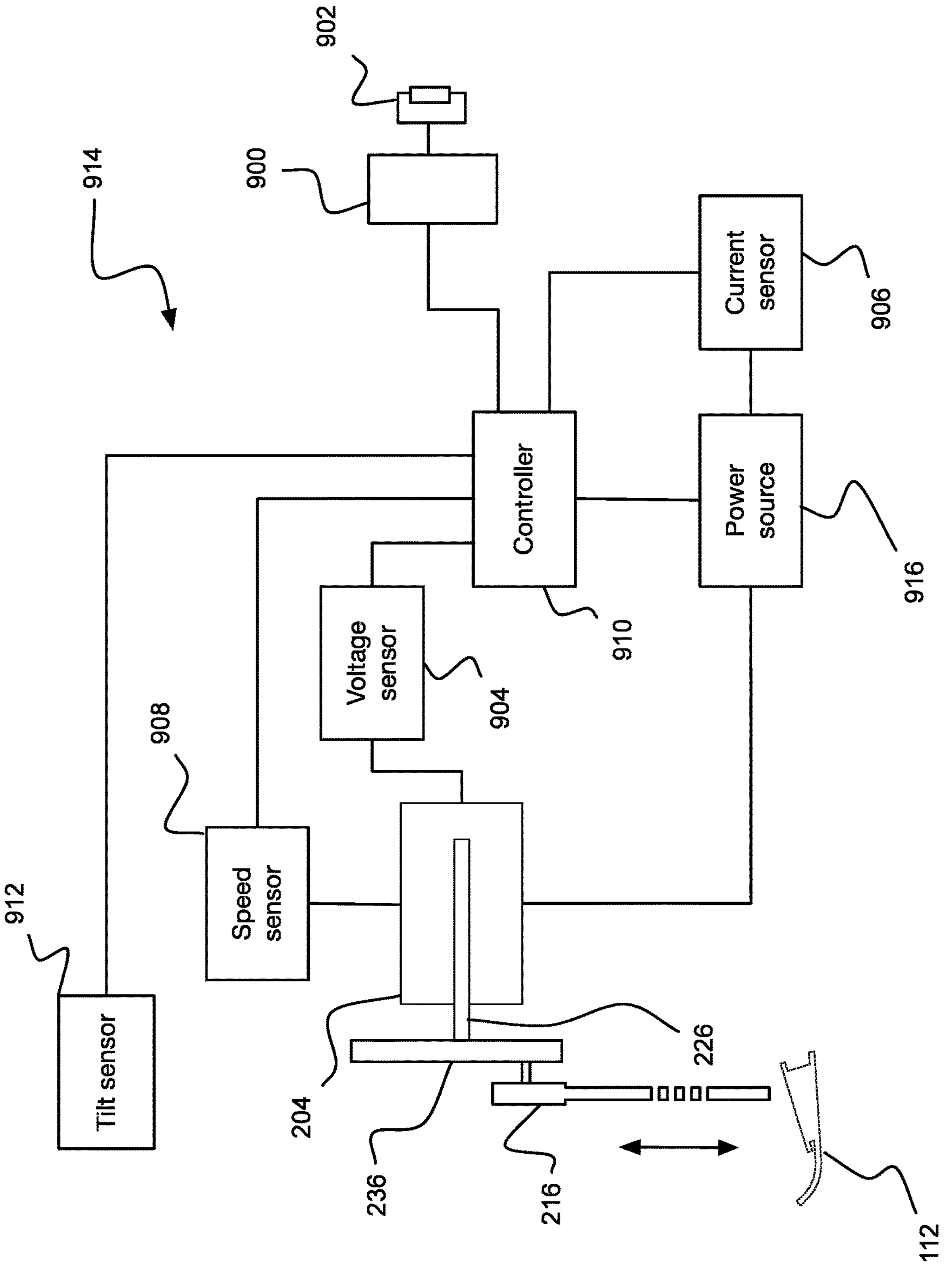
FIG. 9 shows a schematic view of a rammer according to an example.

One or more controls (not shown) such as a trigger button (not shown) or a user operated switch 902 (best shown in FIG. 9) is mounted on the handle 104 which is gripped by the user to actuate a motor 204 (as shown in FIG. 9). The handle 104 comprises a primary gripping portion 108 where the user grips the handle 104 during use. The handle 104 is an elongate tubular construction which extends around the primary housing 102. In some examples the handle 104 is an elongate tubular loop. This means that there are secondary gripping positions on the handle 104 for multiple people to manoeuvre the rammer 100 when it is not in use e.g. being lifted off a truck. Additionally, the handle 104 having an elongate tubular loop construction means that the rammer 100 can be conveniently hoisted using a crane or winch onsite. In some examples the handle 104 optionally comprises an angled portion 128 which angles the primary gripping portion 108 of the handle 104 closer to the ground than other parts of the handle 104 when the rammer 100 is in operation or upright. By angling the primary gripping portion 108, the primary gripping portion 108 is in a more ergonomic position for the user.

The primary housing 102 comprises a motor housing 106 mounted to the primary housing 102. The motor 204 is mounted in the motor housing 106. In this way, the motor 204 is positioned closer to the handle 104 and the primary gripping portion 108. In some alternative examples, optionally the motor 204 is mounted within the primary housing 102 and there is no motor housing 106. For the purposes of clarity, a battery pack 202 is not shown in FIG. 1. Instead the battery pack 202 is shown in more detail in FIG. 2.

The rammer 100 comprises a reciprocating leg portion 110 which is coupled to a compacting foot 112. The compacting foot 112 comprises a substantially flat plate 114 for compacting soil, hardcore, asphalt or any other material to be compacted. The substantially flat plate 114 is arranged to be parallel to the surface S to be compacted. The compacting foot 112 comprises a curved toe portion 116 and a curved heel portion 118. The curved toe portion 116 and a curved heel portion 118 curve towards the handle 104 and limit the curved toe portion 116 and the curved heel portion 118 catching on the surface S to be compacted when moving the rammer 100.

The compacting foot 112 in some examples comprises an optional secondary handle 120 for aiding in moving and lifting the rammer 100.

The reciprocating leg portion 110 comprises an outer flexible sleeve 122 which is configured to flex and deform when the reciprocating leg portion 110 moves along the longitudinal axis A-A. In some examples, as shown in FIG. 1 the outer flexible sleeve 122 is a deformable bellows. The outer flexible sleeve 122 can be optionally made from silicone, rubber, or any other flexible material. The outer flexible sleeve 122 shields the reciprocating mechanism 200 (as best shown in FIG. 2) from ingress of dirt and debris.

Figure 2:
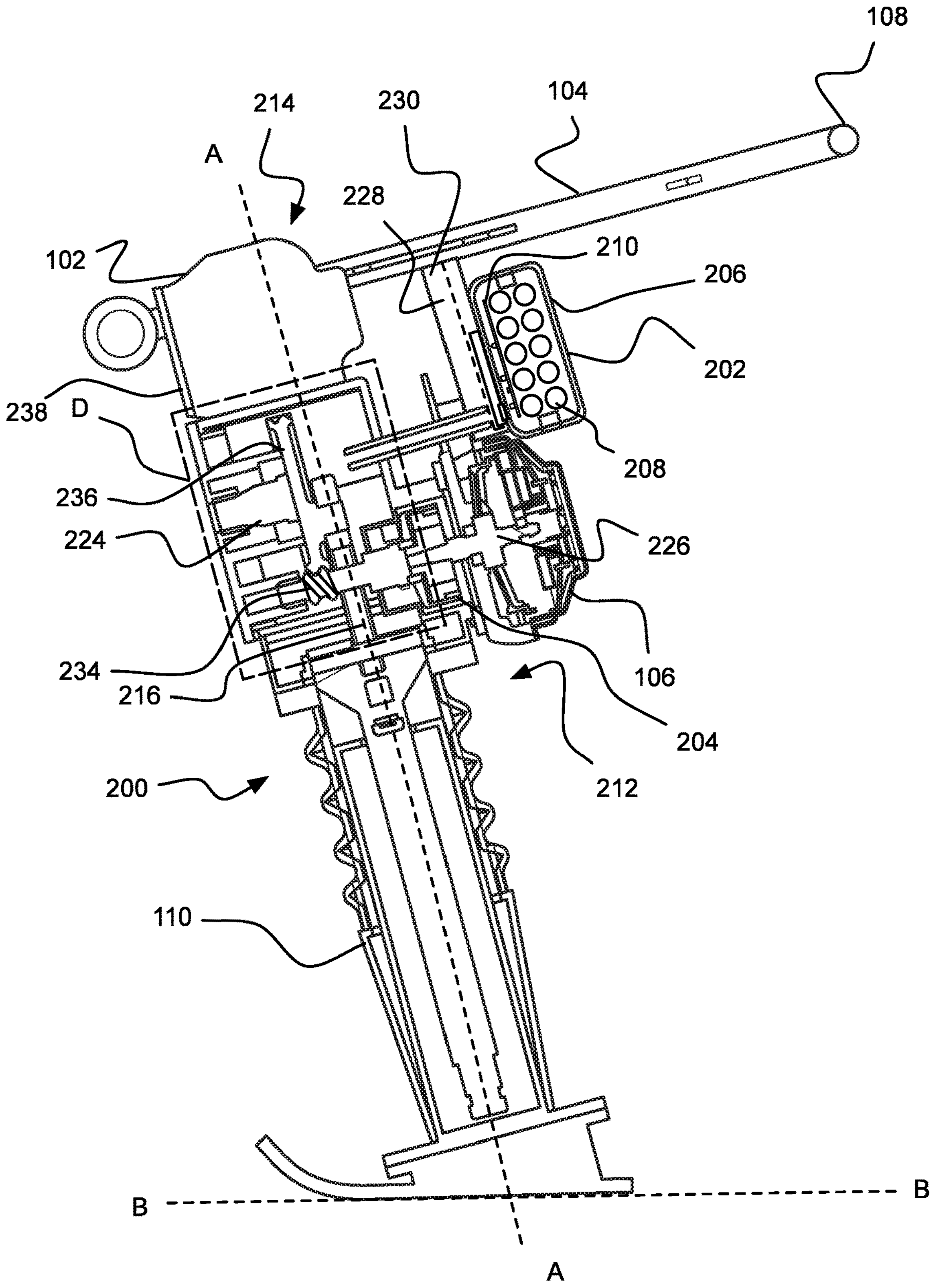
FIG. 2 shows cross-sectional side view of a rammer according to an example.

Reference will now be made to FIG. 2 which shows a cross-sectional side view of the rammer 100 according to an example. The motor 204 is electrically connected to a battery pack 202 or a main electricity supply (not shown). The battery pack 202 comprises a battery housing 206 surrounding a plurality of battery cells 208. A battery controller 210 may be mounted on a circuit board within the battery housing 206. The battery controller 210 is known and will not be described in any further detail. In this example, a single battery pack 202 is shown. However, two or more battery packs (e.g. a first battery pack 202_a_ and a second battery pack 202_b_ as described later) can be used to power the motor 204.

In some examples, the battery pack 202 is removeable from the rammer 100. This means that the battery pack 202 can be replaced with another battery pack during operation of the rammer 100. The removed battery pack 202 can then be charged separately from the rammer 100. In some examples, the rammer 100 comprises a battery charging circuit (not shown) within the primary housing 102. In this way, the rammer 100 can be plugged in to a main supply and the battery pack 202 can be charged whilst still mounted to the rammer 100.

The battery pack 202 is mounted to the exterior of the primary housing 102. Optionally, the battery pack 202 is not removeable and mounted within the primary housing 102. Accordingly, the battery pack 202 is integral with the rammer 100. As shown in FIG. 2, however, the battery pack 202 is mounted on a rear side 212 of the primary housing 102 of the rammer 100. In some examples, the rear side 212 of the primary housing 102 is the side of the housing closest to the handle 104 and/or the primary gripping portion 108.

In some examples, the battery pack 202 is on an upper side of the primary housing 102. By positioning the battery pack 202 on the rear side 212 mounted adjacent to the handle 104, the user is able to easily reach through the handle 104 and release the battery pack 202 from the rammer 100. In other words, the battery pack 202 is mounted on the primary housing 102 at a position within arm's reach from the handle 104. This means that replacing the battery pack 202 is a one handed operation and the user can hold the handle 104 with the other hand.

For example, the user can grip the handle 104 in the primary gripping portion 108 with one hand and grip the battery pack 202 with the other hand. In contrast, if the battery pack 202 were located on the top of the primary housing 102 or elsewhere, the user would have to walk round the rammer 100 to replace or maintain the battery during an operation. This is awkward for the user because this means there will be more interruptions when using the rammer 100.

In some examples, the battery pack 202 is secured to the primary housing 102 via a latch mechanism (not shown). The user can depress the latch mechanism and slide the battery pack 202 out from engagement with the primary housing 102.

Figure 19:
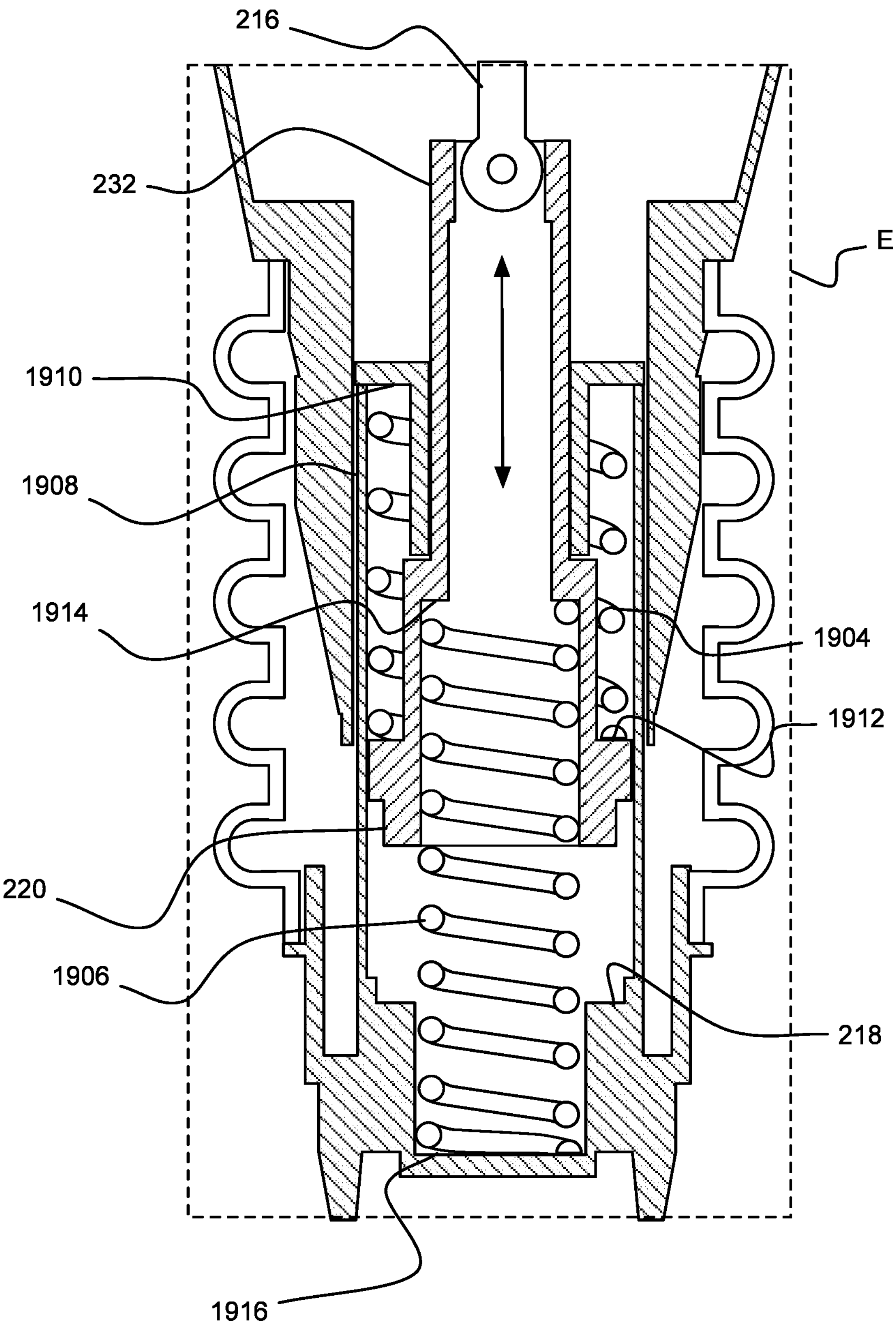
FIGS. 19 and 20 which show a cross-sectional side view of the rammer according to an example.
Figure 20:
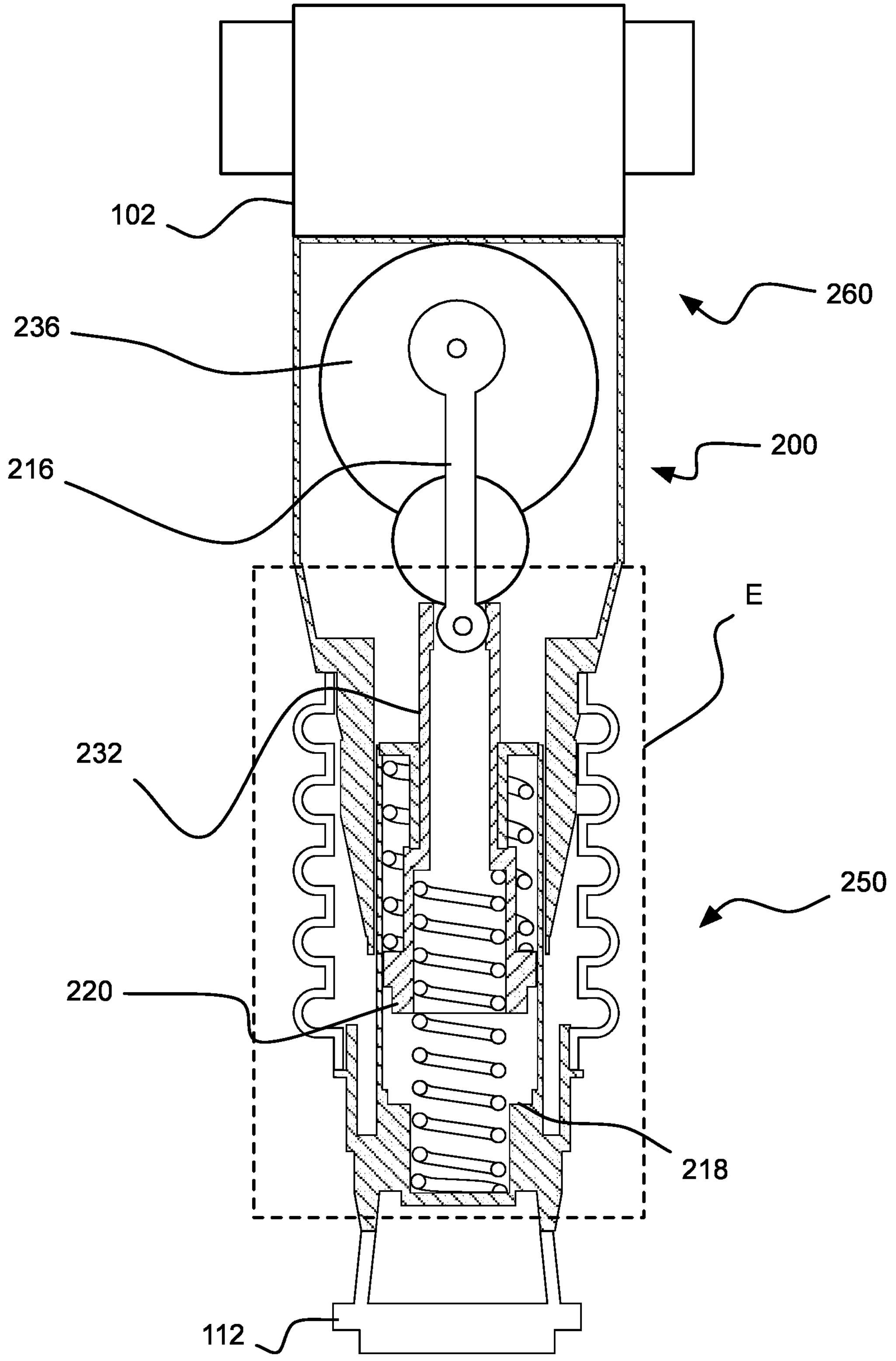

Discussion of the reciprocating mechanism 200 will now be made in reference to FIGS. 2, 19 and 20. FIGS. 19 and 20 which shows a cross-sectional side view of the rammer 100 according to an example across the longitudinal axis A-A. FIGS. 19 and 20 more clearly show the reciprocating mechanism 200. FIG. 19 shows a close-up of FIG. 20 as indicated by dotted box labelled E. The reciprocating mechanism 200 comprises a connecting rod 216 which is connected between an eccentric drive wheel 236 and a reciprocating piston 232 (best seen in FIGS. 19 and 20). The connecting rod 216 is configured to move the reciprocating piston 232 between a retracted position where a first end 220 of the reciprocating piston 232 is moved towards the primary housing 102 (best seen from FIGS. 19 and 20) and an extended position where the first end 220 of the reciprocating piston 232 is moved away from the primary housing 102. When the reciprocating piston 232 is in the extended position, the first end 220 of the reciprocating piston 232 is adjacent with the shoulder portion 218. In some examples, the first end 220 of the reciprocating piston 232 is in contact with the shoulder portion 218 in the extended position. In some other examples, the first end 220 of the reciprocating piston 232 is not contact with the shoulder portion 218 in the extended position.

The connecting rod 216 and the reciprocating piston 232 are configured to move in the direction of the longitudinal axis A-A as indicated by the double ended arrow in FIG. 19.

In some examples, the reciprocating piston 232 is coupled to a first spring 1904 and a second spring 1906. The reciprocating piston 232 is arranged to move along the longitudinal axis A-A within a piston cylinder 1908. The piston cylinder 1908 receives and guides the movement of the reciprocating piston 232 when moving along the longitudinal axis A-A.

When the rammer 100 is not operational, the reciprocating mechanism 200 rests in the position as shown in FIG. 20. This position is dependent on the weight of the rammer and the balance of the upper and lower springs 1904 and 1906 of the spring assembly.

The first spring 1904 engages first and second spring surfaces 1910, 1912. The first spring 1904 exerts a force against the first and second spring surfaces 1910, 1912 when the reciprocating piston 232 moves away from the compacting foot 112 and towards the retracted position. In this way, the first spring 1904 urges the reciprocating piston 232 to towards the compacting foot 112 and the extended position.

The second spring 1906 engages third and fourth spring surfaces 1914, 1916. The second spring 1906 exerts a force against the third and fourth spring surfaces 1914, 1916 when the reciprocating piston 232 moves towards the compacting foot 112 and towards the extended position. In this way, the second spring 1906 urges the reciprocating piston 232 to away from the compacting foot 112 and towards the retracted position.

As mentioned above, the first and second springs 1904, 1906 engage with the first, second, third and fourth surfaces 1910, 1912, 1914, 1916 in order to urge the reciprocating piston 232 in a direction along the longitudinal axis A-A. The first and second springs 1904, 1906 can be mounted an any position or orientation with respect to the reciprocating piston 232. In some other examples, the first and second springs 1904, 1906 can be any suitable biasing element to urge the reciprocating piston 232 in a direction along the longitudinal axis A-A.

As shown in FIGS. 19 and 20, the first spring 1904 and the second spring 1906 are aligned along the longitudinal axis A-A. In some examples, both the first spring 1904 and the second spring 1906 are coaxial with the longitudinal axis A-A.

The up and down movement of the reciprocating piston 232 e.g. the movement of the reciprocating piston 232 between the retracted position and the extended position causes the first and second springs 1904, 1906 alternately expand and compress. Accordingly, the reciprocating leg portion 110 and the compacting foot 112 can be arranged in an oscillating upward and downward movement. The reciprocating leg portion 110, the compacting foot 112 and the first and second springs 1904, 1906 form a lower mass assembly 250 which oscillates with respect to an upper mass assembly 260. The upper mass assembly 260 is formed by the remaining components of the rammer 100 in the primary housing 102. The upper mass assembly 260 in some examples is all the other components which are not part of the lower mass assembly 250.

Since the first spring 1904 and the second spring 1906 are mounted between the compacting foot 112 and the drive mechanism 224, the direct force from the compacting foot 112 during operation is not transmitted to the drive mechanism 224. This means that the first and second springs 1904, 1906 absorb impact forces of the compacting foot 112 and protect the drive mechanism 224. In some other examples, the springs may be arranged differently, e.g., one on top of the other instead of slightly overlapping as shown in the figures.

In this way, this causes the compacting foot 112 to reciprocate and flatten the surface S to be compacted.

As mentioned above and as shown in FIG. 2 and FIG. 20, the connecting rod 216 is connected between the reciprocating piston 232 and the eccentric drive wheel 236. The eccentric drive wheel 236 is part of a drive mechanism 224 arranged to generate the oscillating movement of the lower mass assembly 250 with respect to the upper mass assembly 260. The drive mechanism 224 is rotatably coupled to a drive shaft 226 of the motor 204. In some examples, the eccentric drive wheel 236 is coupled to the drive shaft 226 of the motor 204 via a pinion 234 mounted on the drive shaft 226. In this way, the eccentric drive wheel 236 comprises a toothed outer surface (not shown) which engages with reciprocal teeth (not shown) of the pinion 234 mounted on the drive shaft 226.

Additionally, a gearbox (not shown) can be mounted between the drive shaft 226 and the eccentric drive wheel 236. In some examples, this may provide an inline arrangement of gears e.g. planetary gears. Alternatively, the eccentric drive wheel 236 is coupled to the drive shaft 226 via a chain (not shown). In other examples, any suitable drive mechanism can be coupled between the motor 204 and the eccentric drive wheel 236.

Figures 7A, 7B:
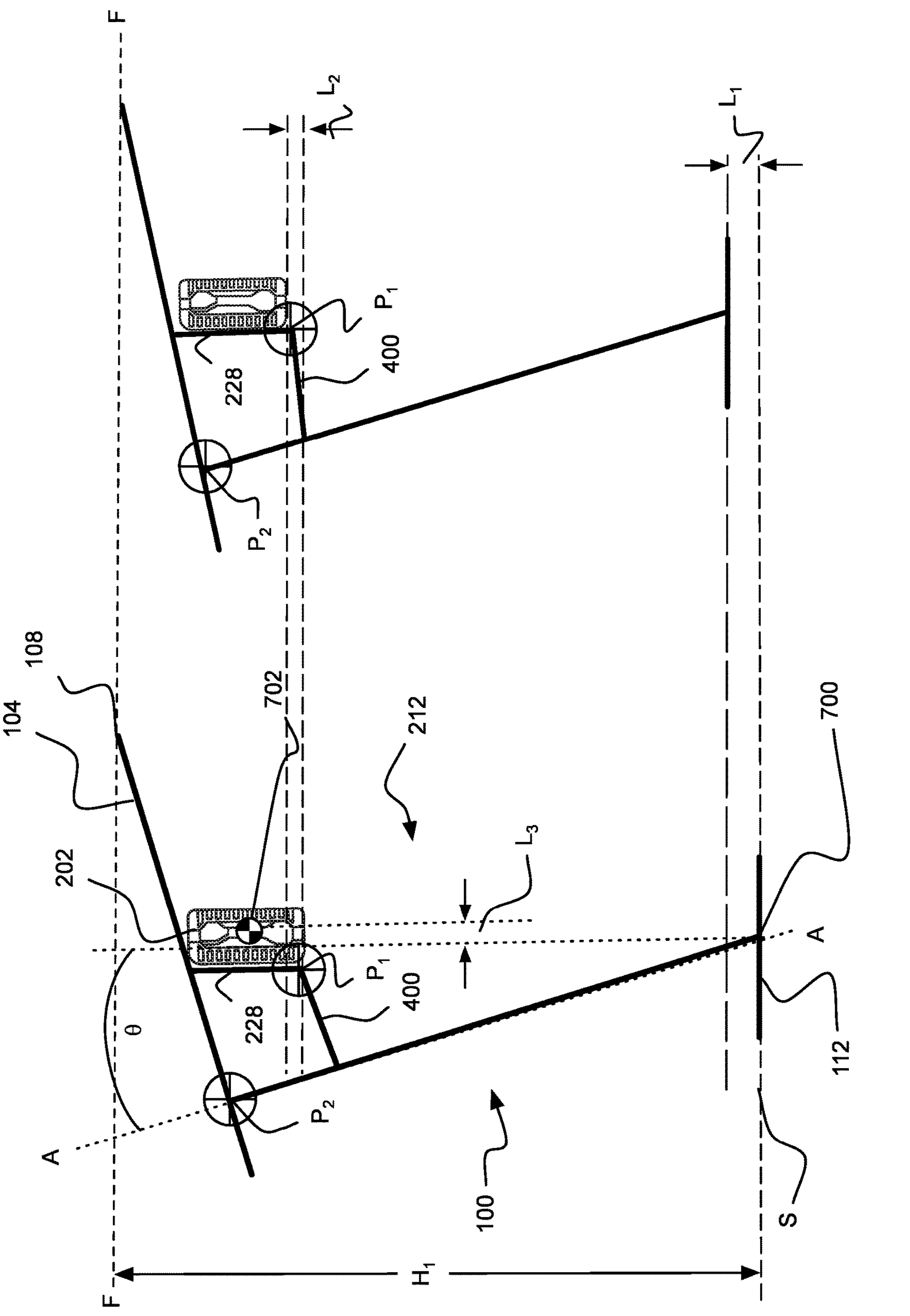
FIGS. 7*a* and 7*b* show schematic side views of a rammer according to an example.

The reciprocating leg portion 110 extends along the longitudinal axis A-A as shown in FIG. 2. In some examples, the longitudinal axis A-A is inclined at an angle θ to the vertical as shown in FIG. 7*a*. In some examples, the longitudinal axis A-A is inclined away from the primary gripping portion 108 of the handle 104. This means that the primary housing 102 and the reciprocating leg portion 110 are leaning forwards and away from the user.

In some examples the angle of inclination θ of the longitudinal axis A-A is between 0° and 20°. In some examples, the angle of inclination θ of the longitudinal axis A-A is between 2.5° and 17.5°. In some examples, the angle of inclination θ of the longitudinal axis A-A is between 5° and 15°. In some examples, the angle of inclination θ of the longitudinal axis A-A is 13°, 14°, 15°, 16°, 17°, 18°, 19°, or 20°.

Accordingly, this means that when the reciprocating leg portion 110 is reciprocating, the compacting foot 112 exerts a force on the surface S to be compacted in a direction along the longitudinal axis. Accordingly, the rammer 100 is urged in a direction away from the user when gripping the primary gripping portion 108. This means that the rammer 100 makes a short forward hop each time the reciprocating piston 232 moves between the extended position and the retracted position. This can assist the user moving the rammer 100 during operation. For example, the rammer 100 makes small hops in a forwards direction e.g. in a direction away from the primary gripping portion 108. Furthermore, by angling the longitudinal axis A-A of the rammer 100 in a forwards direction, the rammer 100 can be more compact and less tall which means the rammer 100 can be more easily used in tight spaces.

In some examples, the substantially flat plate 114 of the compacting foot 112 lies in plane B-B. Plane B-B is substantially horizontal during use, or alternatively, plane B-B is substantially parallel with the surface S to be compacted if the surface S to be compacted is on an incline. In some examples, the intersection 700 between the longitudinal axis A-A and the plane B-B is inclined with respect to a normal of the plane B-B.

As shown in FIG. 2, both the motor 204 and the battery pack 202 are mounted on the rear side 212 of the housing between the longitudinal axis A-A and the handle 104. This means the centre of mass of the rammer 100 is moved away from the longitudinal axis A-A towards the handle 104 as well. Accordingly, in some examples, the turning moment of the motor 204 and the battery pack 202 about the compacting foot 112 is substantially equal to the turning moment of the rammer 100 caused by the longitudinal axis A-A inclined forwards. In some examples, the rammer 100 is stable on the compacting foot 112 when not in use.

In some other examples, the battery pack 202 is mounted on a front side 238 of the housing opposite the rear side 212 of the primary housing 102 facing the handle 104. In some other examples, the battery pack 202 is mounted on any other side of the primary housing 102 below the top 214 of the rammer 100. For example, the battery pack 202 can be mounted on, e.g., a left lateral side 124 or right lateral side 304 of the rammer 100. In some examples, there are a plurality of battery packs 202*a*, 202*b* and each battery pack 202*a*, 202*b* is located in a different position on the rear and front sides 212, 238 of the rammer 100.

The rammer 100 comprises an inherent directionality. As mentioned above, the handle 104 is mounted to the top 214 of the rammer 100. The handle 104 extends rearwardly from the rear side 212 of the rammer 100. The rear side 212 of the rammer 100 is a surface of the rammer 100 which faces the user when the user grips the handle 104 in the primary gripping portion 108. The front side 238 of the rammer 100 is opposite the rear side 212 of the rammer 100. The front side 238 of the rammer 100 is the surface of the rammer 100 that faces the curved toe portion 116 projecting from the compacting foot 112. The primary housing 102 comprises the left lateral side 124 and the right lateral side 304 which extend between the front side 238 and the rear side 212.

Vibration Dampened Battery Pack

In order to protect the battery pack 202 (or a plurality of battery packs 202*a*, 202*b*, as described further below) during operation, the battery pack 202 is coupled to a vibration compensation mechanism 230. In some examples, the vibration compensation mechanism 230 is moveably mounted on the rear side 212 of the primary housing 102. In this way, the battery pack 202 is decoupled from the primary housing 102 by virtue of the vibration compensation mechanism 230.

In some examples, the vibration compensation mechanism 230 is coupled to a carrier 228. The carrier 228 is configured to couple to the battery pack 202. In some examples, the carrier 228 is coupled to the vibration compensation mechanism 230 and the carrier 228 and vibration compensation mechanism 230 are separate elements. In other examples, the carrier 228 is mounted to the vibration compensation mechanism 230 and the carrier 228 and vibration compensation mechanism 230 are integral. For example, the carrier 228 and vibration compensation mechanism 230 are a unitary element. The carrier 228 is moveable relative to the primary housing 102 and moves together with the battery pack 202 when the primary housing 102 is moving during operation of the rammer 100.

In this way, the battery pack 202 is arranged to move relative to the primary housing 102 when the rammer 100 is in operation. In some examples, the battery pack 202 and carrier 228 are configured to move in a direction substantially parallel to the longitudinal axis A-A when the battery pack 202 and carrier 228 move relative to the primary housing 102. In some other examples, the battery pack 202 and the carrier 228 are configured to move in a direction not parallel to the longitudinal axis A-A. In some examples, the battery pack 202 and the carrier 228 are constrained to move linearly along a single direction e.g. a path along an axis parallel to the longitudinal axis A-A. However, in other examples, the battery pack 202 and the carrier 228 are able to move relative to the primary housing 102 by rotating and translating with respect to the primary housing 102.

Figure 3:
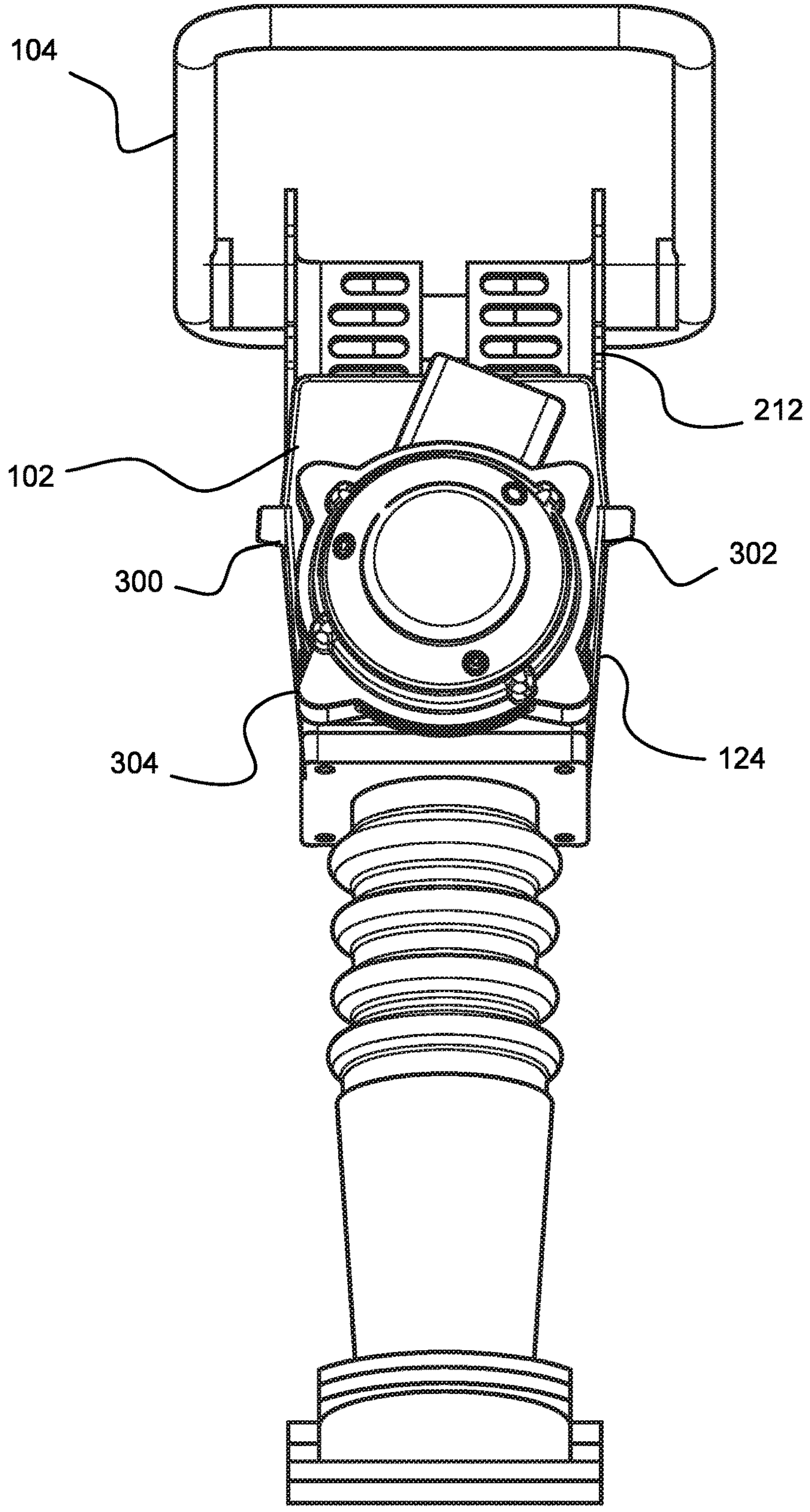
FIG. 3 shows rear view a rammer according to an example.
Figure 4B:
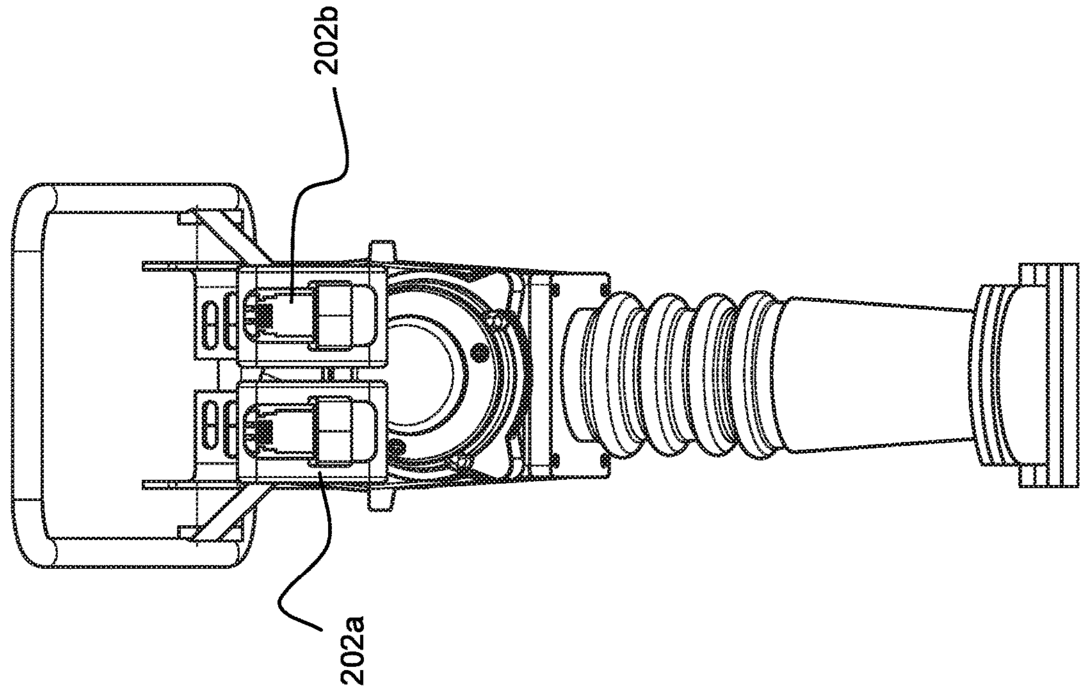
FIGS. 4*a* and 4*b* show a rear view of a rammer according to an example with a vibration dampening mechanism.
Figure 4A:
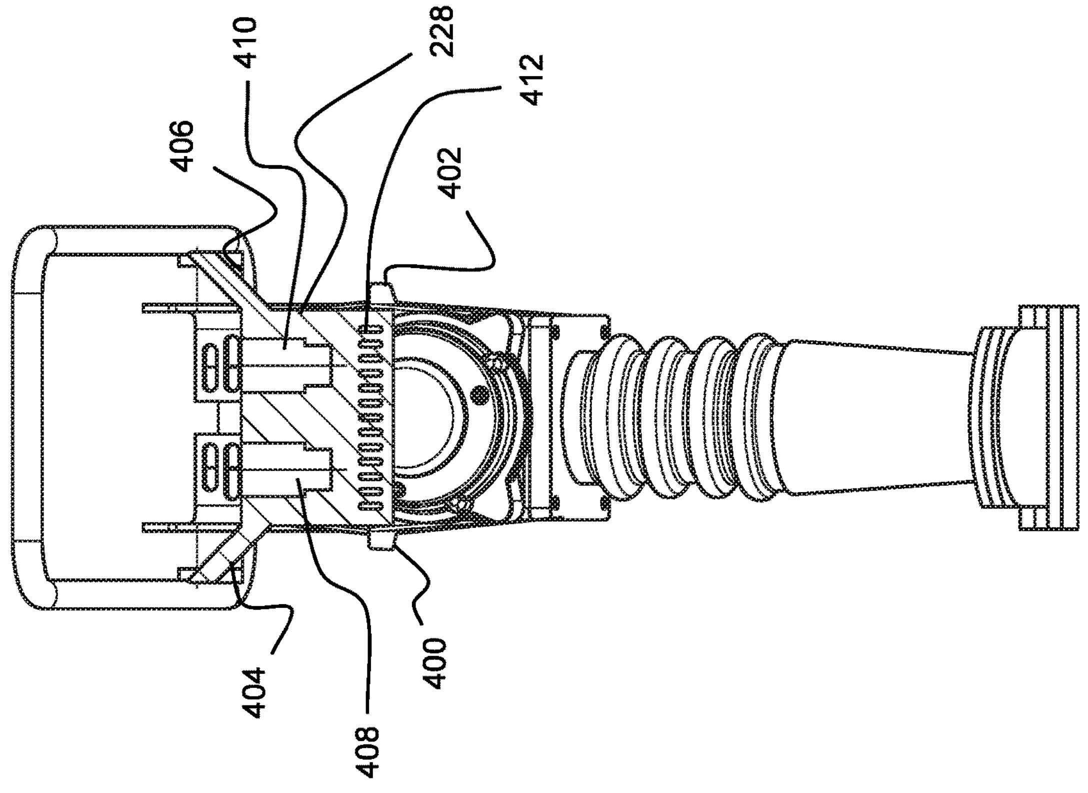
Figure 5:
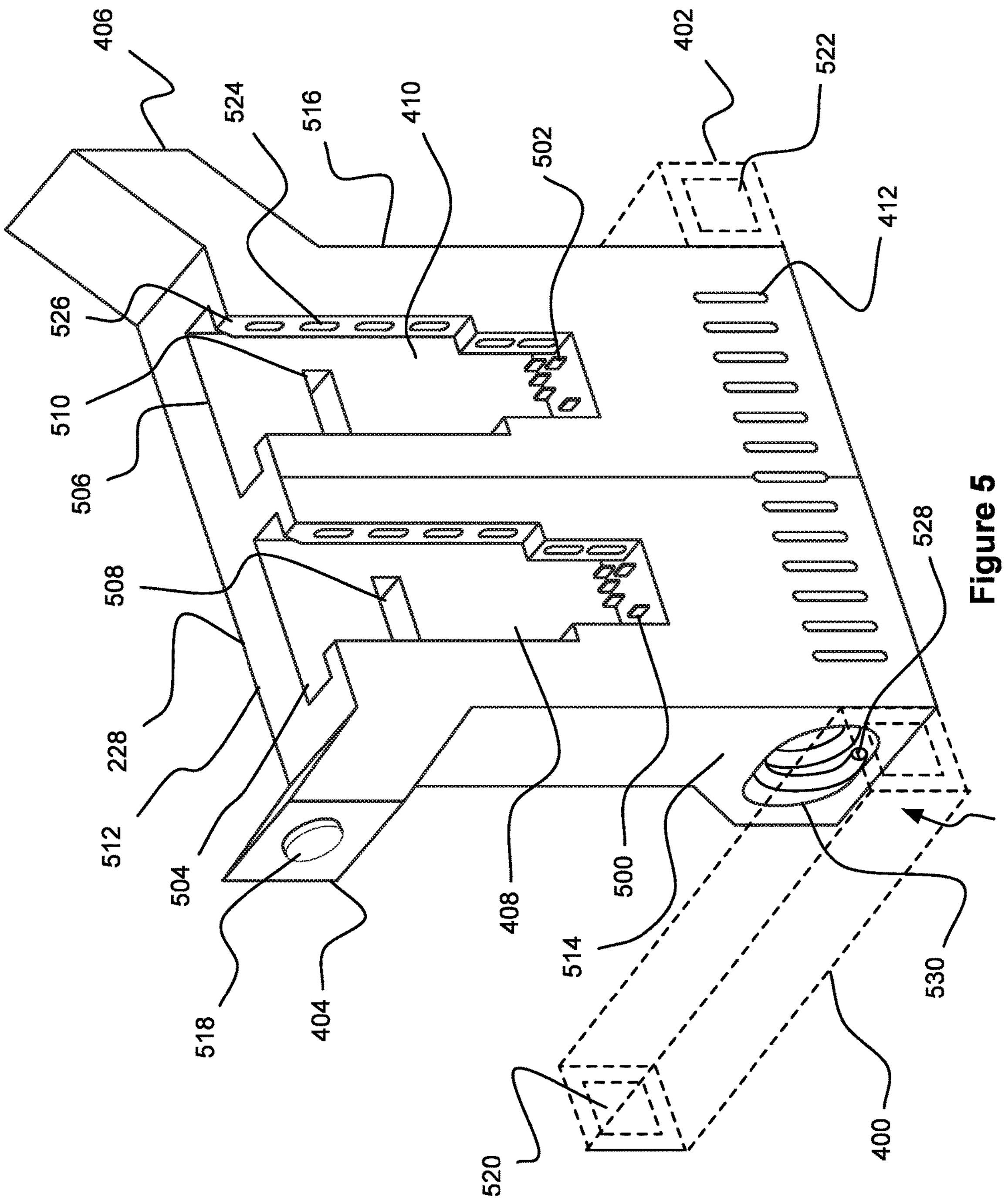
FIG. 5 shows a perspective close-up view of a rammer according to an example with a vibration dampening mechanism.

The vibration compensation mechanism 230 will now be discussed in further detail with reference to FIGS. 3, 4*a*, 4*b* and 5. FIG. 3 shows a rear view of the rammer 100 without the motor 204 or the battery pack 202. FIGS. 4*a* and 4*b* show a rear view of the rammer 100 with and without the battery pack(s) 202 mounted on the carrier 228. FIG. 5 shows a perspective close-up view of the carrier 228.

FIG. 3 does not show the carrier 228 or the battery pack 202 for the purposes of clarity. As mentioned previously, the battery pack 202 is mounted to an external surface of the primary housing 102. This means that the vibration compensation mechanism 230 and the carrier 228 are mounted to the exterior of the primary housing 102. Accordingly, the primary housing 102 comprises a first housing mounting 300 and second housing mounting 302 for moveably mounting the carrier 228 to the housing. The first housing mounting 300 and the second housing mounting 302 are on the left and right lateral sides 124, 304 of the primary housing 102. The first and second housing mountings 300, 302 can comprise a hole (not shown) in the primary housing 102 arranged to receive a fastening such as a bolt (not shown) for coupling with a portion of the carrier 228. In some examples the first and second housing mountings 300, 302 are arranged to be pivotally connected respectively to a first supporting arms 400, 402 (as best shown in FIGS. 4 and 5). In some other examples the first and second housing mountings 300, 302 are arranged to be fixed to the first supporting arms 400, 402

In some examples, the carrier 228 is only mounted to the rammer 100 via the first and second housing mountings 300, 302 and first pair of supporting arms 400, 402. However, in other examples, the carrier 228 is mounted to the rammer 100 with further supports.

In one such example, the carrier 228 is fixed to the handle 104 at a first handle bracket and a second handle bracket (not shown) respectively to second supporting arms 404, 406 (as best shown in FIGS. 4 and 5). The second support arms 404, 406 as shown in FIGS. 4 and 5 are fixed to the handle 104.

In another example, the carrier 228 is mounted solely to the handle 104. In this example, the carrier 228 can be rigidly fixed to the handle (e.g., directly mounted to the handle or via one or more brackets) or the carrier can be mounted to the handle via a vibration compensation mechanism 230 (e.g., any one of the vibration compensation or dampening mechanisms described herein). In this way, two battery packs, a first battery pack 202*a* and a second battery pack 202*b* (as described further below) can be removably mounted to the handle 104.

Relative movement of the battery pack 202 and the carrier 228 will be discussed later in further detail below with respect to FIGS. 6*a*, 6*b*, 7*a* and 7*b* below.

Turning back to FIGS. 4*a*, 4*b*, the structure of the carrier 228 will be described in more detail. In some examples, the carrier 228 is configured to electrically and mechanically couple to the battery pack 202. As shown in FIGS. 4*a*, and 4*b*, the carrier 228 comprises a first battery connection 408 and a second battery connection 410. The first battery connection 408 and the second battery connection 410 are configured to receive a first battery pack 202*a* and a second battery pack 202*b*. As mentioned above, the first and second battery packs 202*a*, 202*b* can be removed and separately charged from the rammer 100.

Whilst FIG. 4*b* shows first and second battery packs 202*a*, 202*b* being connected to the carrier 228 and the rammer 100, there can be further additional battery packs (not shown) mechanically and electrically connected to the carrier 228 and the rammer 100. For example there can be other examples with three, four or any number of battery packs 202 connected to the carrier 228 and the rammer 100. Alternatively, in some examples, there is only one battery pack 202 mounted on the carrier 228 e.g. as shown in FIG. 2.

As shown in FIGS. 4*a*, 4*b* the first and second battery packs 202*a*, 202*b* are generally orientated so that the first and second battery packs 202*a*, 202*b* slide into the first battery connection 408 and the second battery connection 410 in a direction parallel with the longitudinal axis A-A. To remove the first and second battery packs 202*a*, 202*b* from the first battery connection 408 and the second battery connection 410, the user slides the first and second battery packs 202*a*, 202*b* in an upward direction. The user can reach through the handle 104 to carry out the removal and replacement of the first and second battery packs 202*a*, 202*b*.

However, in other examples the first and second battery packs 202*a*, 202*b* can be orientated in any direction with respect to the rammer 100.

FIG. 5 more clearly shows the first battery connection 408 and the second battery connection 410. The first and second battery connections 408, 410 respectively comprise first and second electrical connections 500, 502 for electrically connecting to the first and second battery packs 202*a*, 202*b*. The electrical connections 500, 502 between the first and second battery packs 202*a*, 202*b* are known and will not be discussed any further. The first and second battery connections 408, 410 respectively comprise first and second mechanical connections 504, 506 for fixing the first and second battery packs 202*a*, 202*b* to the carrier 228. In some examples, the first and second mechanical connections 504, 506 comprises slots for receiving rails (not shown) on the first and second battery packs 202*a*, 202*b*. Furthermore each of the first battery connection 408 and the second battery connection 410 in the carrier 228 may optionally comprise a latch slot 508, 510 for receiving a latch mechanism (not shown) respectively mounted on the battery packs 202*a*, 202*b*. The first and second electrical connections 500, 502 between the first and second battery packs 202*a*, 202*b* are known and will not be discussed any further.

Once the electrical and mechanical connections of the carrier 228 are coupled to the first and second battery packs 202*a*, 202*b*, the first and second battery packs 202*a*, 202*b* move in unison with the carrier 228. Optionally further mechanical connections (not shown) may be provided to lock the first and second battery packs 202*a*, 202*b* to the carrier 228. For example a moveable gate (not shown) mounted on the carrier 228 may be moved over the top surface 512 of the carrier 228 once the first and second battery packs 202*a*, 202*b* are mounted to the carrier 228. One or more additional mechanical connections may be desirable or required since the carrier 228 will experience some vibrations from the rammer 100 during operation. In other examples, only the first and second mechanical connections 504, 506 are provided and will securely fixed the first and second battery packs 202*a*, 202*b* to the carrier 228 during operation.

FIG. 5 shows first supporting arms 400, 402 in more detail. As mentioned above, first supporting arms 400, 402 are mounted on each side 514, 516 of the carrier 228. In one example, the first supporting arms 400, 402 are pivotally mounted to first and second housing mountings 300, 302 on the housing. Alternatively, the first supporting arms 400, 402 may be respectively pivotally mounted to sides 514, 516 of the carrier 228. In this case, the first supporting arms 400, 402 can be fixed to the primary housing 102 but pivotally mounted to the sides 514, 516 of the carrier 228.

In some examples, the second support arms 404, 406 comprise fixed connections 518 for fixing the second support arms 404, 406 to the first handle 104. Only one fixed connection 518 is shown in FIG. 5, but both the second support arms 404, 406 may comprise fixed connections 518.

In some examples, the carrier 228 comprises at least one airhole 412 configured to provide airflow around the first and second battery packs 202*a*, 202*b*. In some examples, the airhole 412 is a plurality of airholes 412 arranged along the width of the carrier 228. For the purposes of clarity only one airhole 412 has been labelled in FIGS. 4*a*, and 5. FIG. 4*a* and FIG. 5 show the airholes 412 arranging in line across the carrier 228.

The airholes 412 will be discussed in further detail with respect to FIG. 5. In some examples, the airholes 412 allow air convection in the vicinity of the first and second battery packs 202*a*, 202*b*. In some examples, the airflow is passive and the airflow around the first and second battery packs 202*a*, 202*b* from the airholes 412 is due to convection. In other examples, the airholes 412 provide an airflow from a positive pressure created by the rammer 100. In some examples, the airholes 412 are in fluid connection with a fan (not shown) providing a cooling airflow. In some examples the fan is coupled to the motor 204 and mounted within or adjacent to the motor housing 106. In this way the cooling airflow generated by the fan for cooling the motor 204 can also be used to cool the first and second battery packs 202*a*, 202*b*. For example, the cooling airflow passed over the motor 204 comprises an airflow path via the first and second battery packs 202*a*, 202*b* and can be exhaust via the airholes 412. Advantageously, by locating the carrier 228 and the first and second battery packs 202*a*, 202*b* near the motor 204, the first and second battery packs 202*a*, 202*b* can be more easily cooled.

In some examples, the first supporting arms 400, 402 comprise an airflow conduit 520 such that they are hollow and are configured to comprise the airflow path for cooling air from the motor 204 to the first and second battery packs 202*a*, 202*b*. The first supporting arms 400, 402 are illustrated as being square in cross section with a square airflow conduit 520. However, the first supporting arms 400, 402 can comprise any cross-sectional shape and configuration. In some examples one first supporting arm 400 comprises the airflow conduit 520. In some examples another first supporting arm 402 comprises a component conduit 522 for placing components such as electrical wires connecting the first and second battery packs 202*a*, 202*b* to the motor 204 and/or the rammer 100 electrical circuit 914 (as best shown in FIG. 9).

The carrier 228 additionally or alternatively comprises further auxiliary airholes 524 along the periphery 526 of the first battery connection 408 and the second battery connection 410. The further auxiliary airholes 524 are also in fluid communication with the airflow conduit 520. The carrier 228 comprises one or more internal conduits (not shown) between the airholes 412 and/or the further auxiliary airholes 524. In some examples, there are no airholes 412 on the front of the carrier 228, but rather only the auxiliary airholes 524 on the carrier 228. In yet further examples, there can any number of further additional or alternative airholes (not shown) for cooling the first or second battery packs 202*a*, 202*b*.

In some examples the vibration compensation mechanism 230 optionally comprises a vibration dampening mechanism 540. In some examples, the vibration dampening mechanism 540 comprises at least one vibration dampening element 528. In some examples, the vibration dampening element 528 is a torsion spring 528 mounted in the carrier 228 and coupled to one or both of the first supporting arms 400, 402. The torsion spring 528 is arranged to sit within a carrier conduit 530. The carrier conduit 530 can also be used for the airflow path. Movement of the primary housing 102 causes the torsion spring 528 to twist and compress and the vibration dampening mechanism 540 absorbs at least some of the vibrations of the rammer 100 during operation. In some other examples, the torsion spring 528 can be any other suitable component for dampening the vibrations and shocks. Furthermore, the vibration dampening element 528 can be mounted in any suitable location on the carrier 228 for absorbing the vibrations and shocks from the rammer 100.

Alternatively, the torsion spring 528 can additionally or alternatively be mounted in the primary housing 102. For example the torsion spring 528 can be mounted at the first and second housing mountings 300, 302 in the primary housing 102 and connected between the primary housing 102 and the first supporting arms 400, 402.

FIG. 5 shows a single vibration compensation mechanism 230, however, in some examples there can be a plurality of vibration compensation mechanism 230. For example, instead of the carrier 228 being connected to a single vibration compensation mechanism 230, each of the first and second battery packs 202*a*, 202*b* can be individually connected to a separate vibration compensation system (not shown).

Furthermore, each of the separate vibration compensation mechanisms 230 can comprise a separate vibration dampening mechanism 540. For example, the first battery connection 408 and the second battery connection 410 may comprise a slidable plate (not shown) moveably mounted to the carrier 228. A first battery pack 202*a* may then be fixed with respect to the first battery connection 408, but the first battery pack 202*a*, may slide together with the first battery connection 408 with respect to the carrier 228. Similarly, a second battery pack 202*b* may then be fixed with respect to the second battery connection 410, but the second battery pack 202*b*, may slide together with the second battery connection 410 with respect to the carrier 228. A first vibration compensation system (not shown) may then be coupled between the first battery connection 408 and the carrier 228 and a second vibration compensation system (not shown) the second battery connection 410 and the carrier 228.

In some examples, there can be two first vibration compensation mechanisms 230 on the carrier 228 e.g. one for each of the first and second battery packs 202*a*, 202*b*.

In some examples as shown in FIG. 5, the vibration dampening mechanism 540 comprises a torsion spring 528 arranged to absorb vibrations from the rammer 100. In some examples, the vibration dampening elements 528 is one or more of a compression spring, a leaf spring, a tension spring, a foam pad, a rubber pad, silicone pad or any other suitable resiliently deformable material or component for absorbing shocks and vibrations from the rammer 100. For example the carrier 228 can be further connected to the handle 104 via a compression spring (not shown) for dampening vibrations to the carrier 228 and the battery pack 202.

Figure 6B:
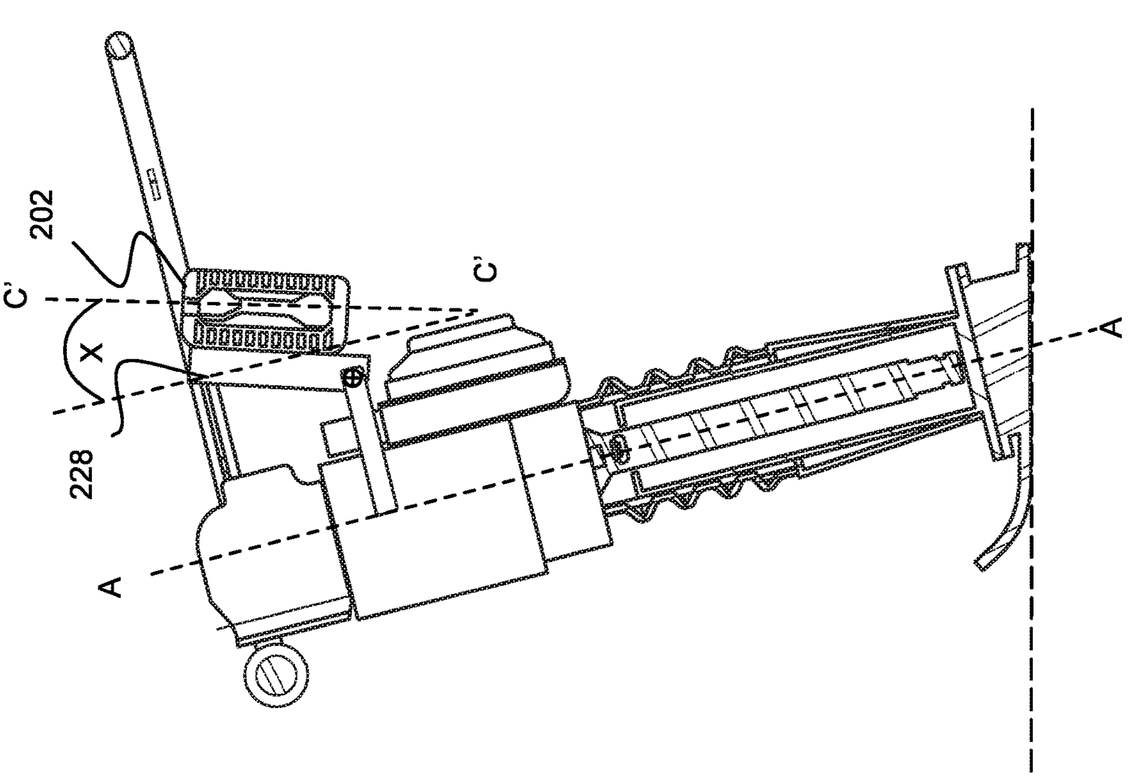
FIGS. 6*a* and 6*b* show cross-sectional side views of a rammer according to an example.
Figure 6A:
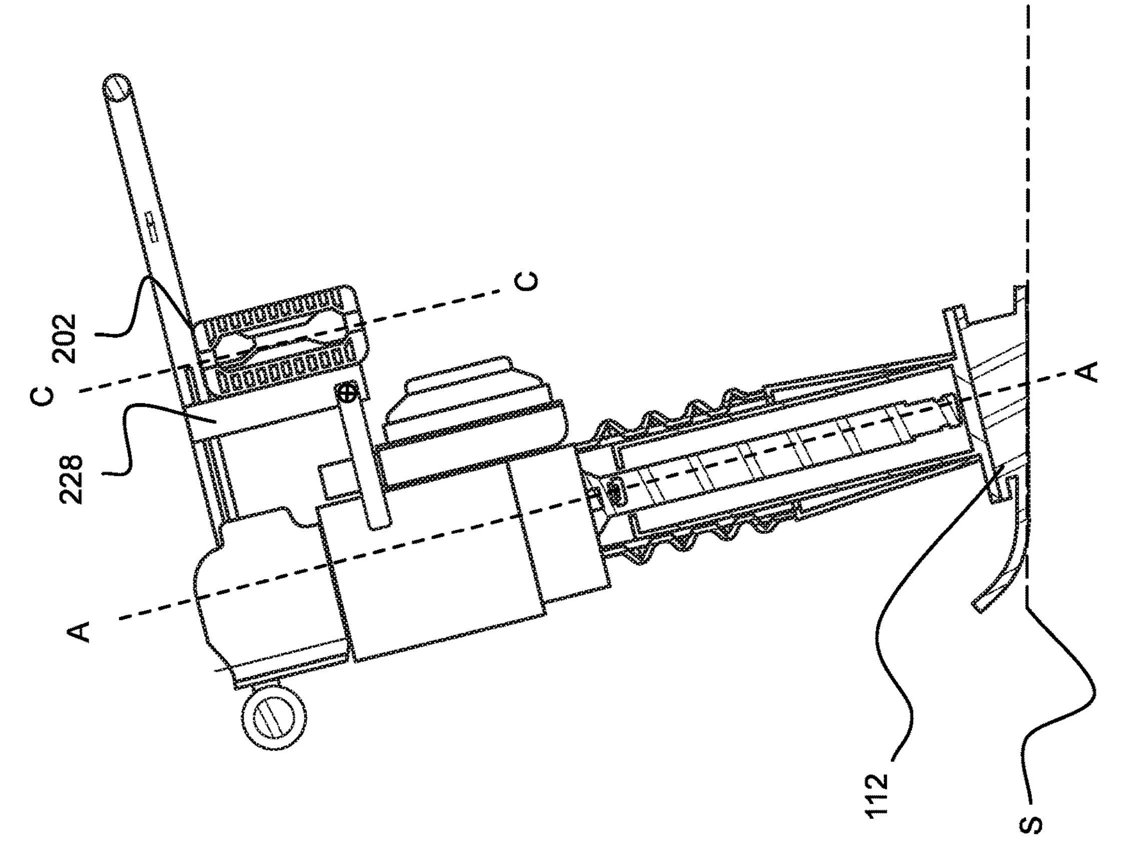

Relative movement of the battery pack 202 and the carrier 228 will now be discussed in further detail with respect to FIGS. 6*a*, 6*b*, 7*a* and 7*b*. FIGS. 6*a*, 6*b* show cross-sectional side views of the rammer 100 with different arrangements of the vibration compensation mechanism 230. FIGS. 7*a*, 7*b* show schematic side views of the rammer 100 in different stages of the rammer 100 operational cycle.

As mentioned above, the rammer 100 comprises a reciprocating mechanism 200 which moves between a retracted position where the reciprocating piston 232 is moved towards the primary housing 102 and an extended position where the reciprocating piston 232 is moved away from the primary housing 102. The retracted position and the extended position of the reciprocating mechanism 200 comprise the limits of movement of the reciprocating mechanism 200 during a cycle of operation. A cycle of operation can be considered to be one full revolution of the reciprocating mechanism 200. For example, a cycle of operation is the eccentric drive wheel 236 completing one revolution.

FIGS. 6*a* and 6*b* show the vibration compensation mechanism 230 being mounted in a different orientation on the rammer 100. In FIG. 6*a*, the carrier 228 and the battery pack 202 have been mounted to the handle 104 substantially parallel to the longitudinal axis A-A. In FIG. 6*b*, the carrier 228 and the battery pack 202 have been mounted to the handle 104 inclined to the longitudinal axis A-A.

The battery axis C'-C' as shown in FIG. 6*b* is inclined by angle x to the battery axis C-C shown in FIG. 6*a*. In some examples, the angle of inclination x of the battery axis C'-C' is between 0° and 20°. In some examples, the angle of inclination x of the battery axis C'-C' is between 2.5° and 17.5°. In some examples, the angle of inclination x of the battery axis C'-C' is between 5° and 15°. In some examples, the angle of inclination x of the battery axis C'-C' is 13°, 14°, 15°, 16°, 17°, 18°, 19°, or 20°. In some examples, the battery axis C'-C' in FIG. 6*b* is substantially vertical.

FIG. 7*a* and FIG. 7*b* respectively correspond to the reciprocating mechanism 200 of the rammer 100 being fully extended and in the extended position and fully retracted in the retracted position.

As can be seen between FIGS. 7*a* and 7*b*, the compacting foot 112 moves a distance of $L_1$ as the reciprocating mechanism 200 moves between the retracted position and the extended position. The distance $L_1$ is the stroke length of the reciprocating mechanism 200. However, the vibration compensation mechanism 230 decouples the battery pack 202 from the rammer 100.

During operation, the primary gripping portion 108 remains at the same height. This is indicated in FIGS. 7*a* and 7*b* by dotted line F-F. This represents the height at which the user places their hands on the handle 104 at the primary gripping portion 108. In some examples, during operation, the primary gripping portion 108 remains substantially as a fixed height $H_1$ above the surface S to be compacted.

The vibration of the rammer 100 experienced by the battery pack 202 due to the oscillating movement of the compacting foot 112 during operation is reduced by the vibration compensation mechanism 230. The vibration compensation mechanism 230 achieves this by modifying the kinematics of the battery pack 202 with respect to the primary housing 102 by providing at least one pivoting connection between the primary housing 102 and the battery pack 202. For example, as mentioned above, the carrier 228 is pivotally mounted to the first supporting arms 400, 402. This is represented in FIGS. 7*a*, 7*b* as pivot point $P_1$. The first supporting arms 400, 402 are pivotally mounted to the primary housing 102, as represented in FIGS. 7*a*, 7*b* as pivot point $P_3$. The carrier 228 is also pivotally mounted to the handle 104, as represented in FIGS. 7*a*, 7*b* as pivot point $P_4$.

In order to keep the primary gripping portion 108 at the same height, the handle 104 is moveable with respect to the primary housing 102. In some examples, the handle 104 is pivotable about the primary housing 102 at pivot point $P_2$ as shown in FIGS. 7*a*, 7*b*. The pivot point $P_2$ in some examples is the pivotal mounting 126 and the pivot point $P_2$ pivots about pivotal axis G-G as shown in FIG. 1.

As the reciprocating mechanism 200 oscillates during operation of the rammer 100, the vibration compensation mechanism 230 moves the battery pack 202 with respect to the primary housing 102. This means that the handle 104 pivots with respect to the primary housing 102 about pivot point $P_2$, the carrier 228 pivots with respect to the first supporting arms 400, 402 about pivot point $P_1$ and the handle 104 about pivot point $P_4$, and the first supporting arms 400, 402 pivot with respect to the primary housing 102.

This means that the battery pack 202 moves a distance $L_2$ due to forced movement. However, the stroke distance $L_1$ is greater than the battery pack force movement distance $L_2$. In some examples, the distance the battery pack 202 moves during operation is eliminated e.g., $L_2$ is Ocm. In this case, the battery pack 202 remains the same height above the surface S to be compacted during operation of the rammer 100. In other words, the battery pack 202 moves much less with respect to the surface S to be compacted than the other parts of the rammer 100 during operation. In some examples the ratio of the stroke distance $L_1$ to the battery pack forced movement distance $L_2$ is 50:1, 20:1, 10:1, 5:1, or 3:1. Although the carrier 228 is shown as vertical in FIG. 7*b*, it may tilt slightly as the carrier 228 pivots about points $P_1$ and $P_4$.

At the same time, the optional vibration dampening mechanism 540 can reduce the high frequency vibrations experienced by the battery pack 202 during operation of the rammer 100.

In some examples, the battery pack 202 is mounted on the vibration compensation mechanism 230 at a position between an intersection 700 of the longitudinal axis A-A of the rammer 100 and the plane B-B of the compacting foot 112 and the handle 104. As shown in FIG. 7*a*, the centre of mass 702 of the battery pack 202 is separated from the intersection 700 by distance $L_3$. At least a portion of the vibration compensation mechanism 230 is mounted on the rear side 212 of the primary housing 102 between the motor 204 and the handle 104 or the primary gripping portion 108 on the handle 104.

Figure 8:
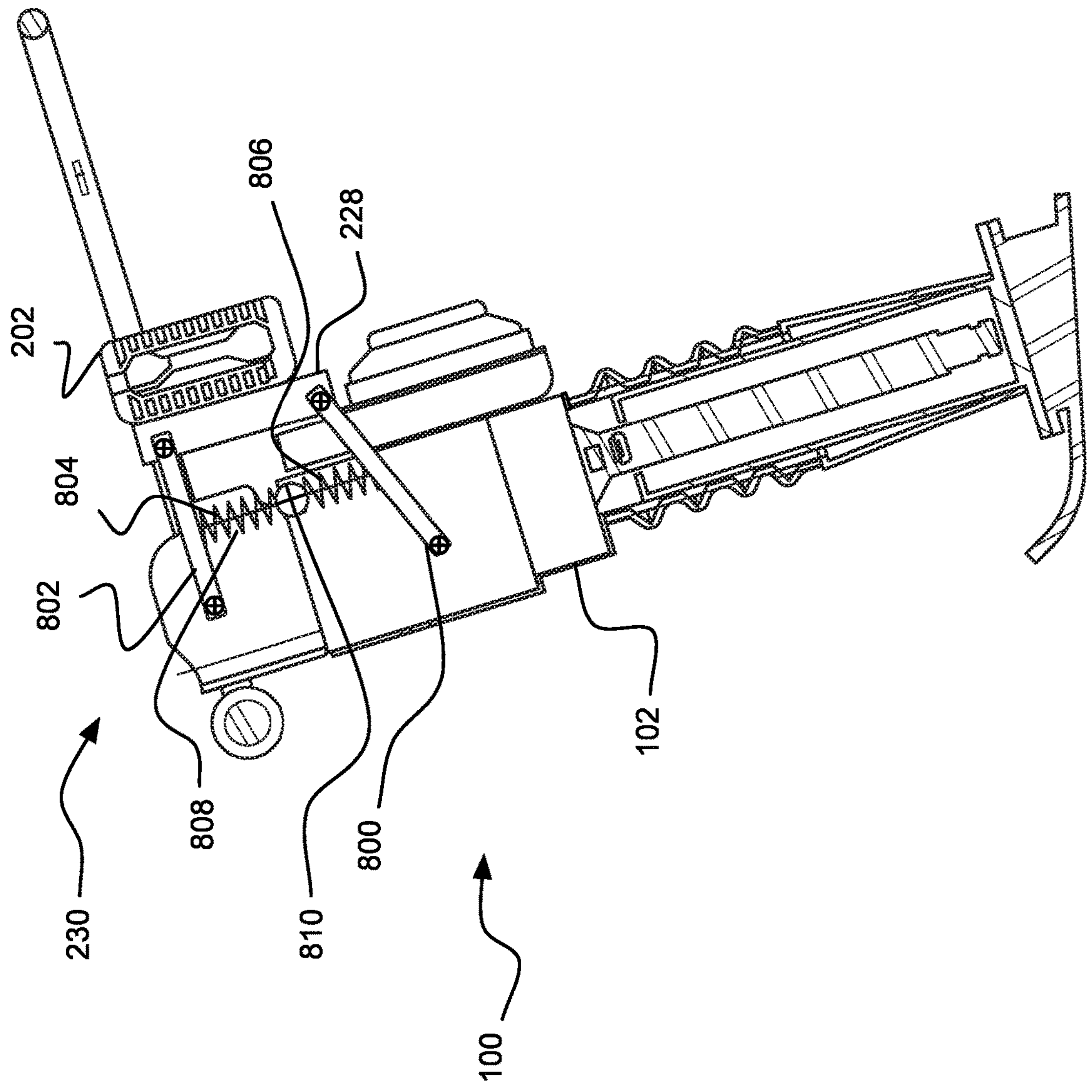
FIG. 8 shows cross-sectional side view of a rammer according to an example.

Another example will now be discussed in reference to FIG. 8. FIG. 8 shows a cross-sectional side view of the rammer 100. The rammer 100 as shown in FIG. 8 is the same as the previous examples as described with reference to the previously described Figures except that the vibration compensation mechanism 230 is mounted with an alternative arrangement.

The carrier 228 is mounted to the primary housing 102 with lower support arms 800 and upper support arms 802. Both the lower support arms 800 and upper support arms 802 are pivotally mounted to both the primary housing 102 and the carrier 228. The lower support arms 800 and upper support arms 802 are pivotally mounted to both the primary housing 102 and the carrier 228 on the left and/or right lateral sides 124, 304 of the housing below the top 214 of the primary housing 102. In other words in some examples both the lower support arms 800 and upper support arms 802 are pivotally mounted to both the primary housing 102 and the carrier 228 approximately at a midpoint of the left and/or right lateral sides 124, 304 of the housing.

The vibration compensation mechanism 230 comprises a tuneable vibration dampening element 804. The tuneable vibration dampening element 804 comprises at least one compression or tension spring connected between the lower support arms 800 and upper support arms 802. In some examples as shown in FIG. 8, the tuneable vibration dampening element 804 comprises a first tension spring 806 connected to the lower support arms 800 and a second tension spring 808 connected to the upper support arms 802. The first and second tension springs 806, 808 are connected to a primary housing connection 810. In some examples, the primary housing connection 810 is a screw, clip, clamp, hook, or any other suitable fastening mechanism to fix the first and second tension springs 806, 808 to the primary housing 102. The arrangement of the first tension spring 806, the second tension spring 808 and the primary housing connection 810 can be adjusted to tune the response frequency of the vibration compensation mechanism 230 to the operational vibration frequency of the rammer 100. In some examples, the vibration compensation mechanism 230 has a response frequency which is substantially equal to the driven frequency of the rammer 100 such that the vibration compensation mechanism 230 substantially or completely dampens the vibrations to the carrier 228 and the battery pack 202. In some examples, the tuneable vibration dampening element 804 can be manually adjusted by the user. Alternatively, the tuneable vibration dampening element 804 can be pre-set during a factory calibration.

There may lower support arms 800 and upper support arms 802 on both the left lateral side 124 and the right lateral side 304 of the rammer 100 connecting the carrier 228 to the primary housing 102, similar to the previously discussed examples. However, in some examples, the lower support arms 800 and the upper support arms 802 are pivotally mounted to the primary housing 102 and the carrier 228. At the same time there may be the arrangement of the first tension spring 806, the second tension spring 808 and the primary housing connection 810 as shown in FIG. 8 on both the left and right lateral sides 124, 304 of the rammer 100.

The vibration compensation mechanism 230 can be mounted inside the primary housing 102. Alternatively, the vibration compensation mechanism 230 can be mounted on the exterior of the primary housing 102. The vibration compensation mechanism 230 may be shrouded in a sheath (not shown) or other protective shield (not shown) to protect the vibration compensation mechanism 230 from dirt and debris.

Fall/Lift Detection

Another example of the disclosure will now be described in reference to FIGS. 9, 10, 11, 12, 13*a*, 13*b* and 13*c*.

The rammer 100 as shown in FIGS. 9, 10, 11, 12, 13*a*, 13*b* and 13*c* in some examples is the same as shown in FIGS. 1 to 8. That is, the rammer 100 comprises a vibration compensation mechanism 230 as described in reference to FIGS. 1 to 8. However in the examples described in reference to FIGS. 9, 10, 11, 12, 13*a*, 13*b* and 13*c*, the vibration compensation mechanism 230 is optional. Accordingly, FIGS. 9, 10, 11, 12, 13*a*, 13*b* and 13*c* do not show a vibration compensation mechanism 230.

Furthermore, the rammer 100 as shown in FIGS. 9, 10, 11, 12, 13*a*, 13*b* and 13*c* can be battery operated or alternatively mains powered. This means that the rammer 100 as shown in FIGS. 9, 10, 11, 12, 13*a*, 13*b* and 13*c* optionally does not need a battery pack 202. Additionally or alternatively the rammer 100 may be powered from a combination of a battery pack 202 and mains power.

FIGS. 9, 10, 11, 12, 13*a*, 13*b* and 13*c* show a rammer 100. However, in other examples any other type of surface compacting power tool 100 can be used. For example, the power tool 100 can be a tamper, a soil compactor, a compactor, a jumping jack compactor, a plate compactor, a vibratory plate. or a jumping jack tamper.

FIG. 9 shows a schematic diagram of a controller 910 and the rammer 100. As shown in FIG. 9, in some examples, the rammer 100 optionally comprises a control panel 900 having one or more actuators 902 (e.g., a control knob) operable to control the operational parameters of the device. For example, the control panel 900 is configured to control the power (ON/OFF) with a main ON/OFF switch (not shown) and the speed of the motor 204 with a motor control speed dial (not shown). In some examples the handle 104 comprises an ON/OFF switch. The electrical components of the rammer 100 may be controlled via a circuit board or a controller 910 mounted in the primary housing 102. FIG. 9 shows a schematic representation of the circuit 914 of the rammer 100 including the controller 910.

In another example, the controller 910 is mounted within the motor housing 106 e.g. inside a motor can housing (not shown). In this way, the motor 204 and the controller 910 are optionally a unitary component.

In some other examples, the controller 910 is mounted to the interior surface of the control panel 900. In some other examples, the controller 910 is mounted in any other location within the primary housing 102. Optionally, the controller 910 and other electronic components can be mounted in the carrier 228 such that they are decoupled from the vibrations of the rammer 100 by the vibration compensation mechanism 230. Additionally or alternatively, the controller 910 and other electronic components are mounted in a secondary vibration dampening mechanism (not shown) which is similar in construction to the vibration compensation mechanism 230 as shown in e.g. FIG. 2.

The controller 910 may be implemented on hardware, firmware or software operating on one or more processors or computers. A single processor can operate the different functionalities or separate individual processors, or separate groups of processors can operate each functionality.

The controller 910 is configured to control the motor 204 to change the torque on the rotatable motor shaft 226 and the speed of the reciprocating mechanism 200 as discussed hereinafter.

The controller 910 is connected to one or more sensors configured to detect one or more operating electrical parameters and variables of the motor 204. In some examples, the controller 910 is connected to a voltage sensor 904 and a current sensor 906 for respectively detecting the voltage across the motor 204 and the current through the rammer 100. In some example, the current sensor 906 may one or more currents, such as phase currents in the motor 204 and bus current. In some examples, the voltage sensor 904 and the current sensor 906 are mounted within the housing of the motor 204 e.g. inside the motor can housing. In this way, the motor 204 and the voltage sensor 904 and the current sensor 906 are a unitary component.

Figure 10:
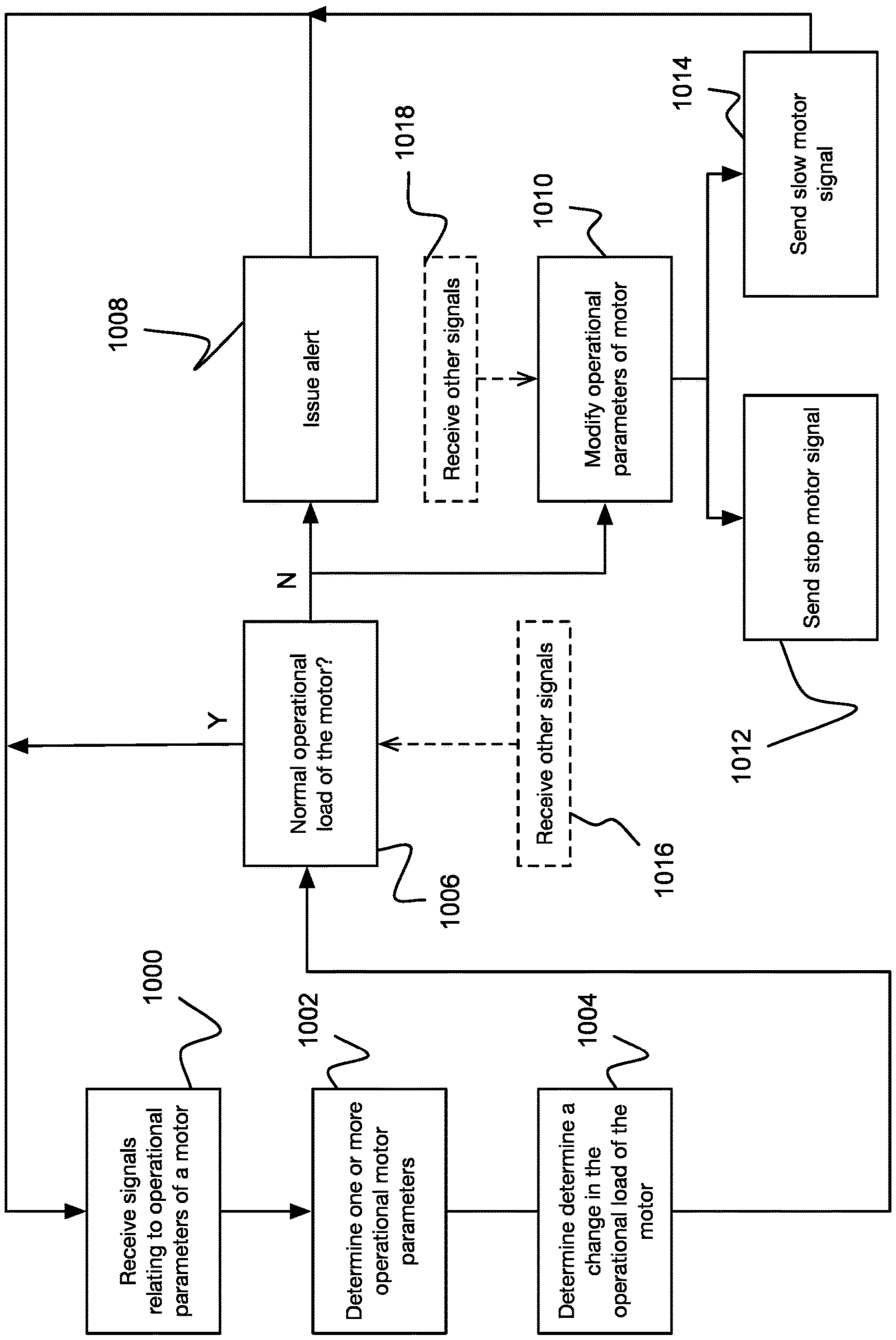
FIG. 10 shows a flow diagram of a control process for a rammer according to an example.

The controller 910 is configured to receive at least one signal relating to one or more operational parameters and/or variables of the motor 204 during operation of the rammer 100 as shown in step 1000 of FIG. 10. FIG. 10 shows a flow diagram of a control process implemented in the controller 910 of the rammer 100.

In some examples, the controller 910 is configured to receive a plurality of signals relating to one or more operational parameters and/or variables of the motor 204 during operation of the rammer 100. For example, the controller 910 determines one or more operational electrical parameters and/or variables of the motor 204 based on the received signals as shown in step 1002 of FIG. 10. For example, the controller 910 determines the voltage and/or the current respectively from the received signals from the voltage sensor 904 and the current sensor 906.

In this way, the controller 910 receives a signal from the voltage sensor 904 and a signal from the current sensor 906 during operation of the motor 204. In some examples, the voltage sensor 904 and the current sensor 906 periodically send the signals to the controller 910. In other examples, the voltage sensor 904 and the current sensor 906 constantly send the signals to the controller 910. The voltage sensor 904 is configured to send information relating to the voltage across the motor 204 during operation to the controller 910. The current sensor 906 is configured to send information relating to the current through the rammer 100 during operation to the controller 910.

In some examples, the controller 910 is configured to determine one or more other operational parameters and/or variables of the motor 204. The other operational parameters and/or variables of the motor 204 can be any parameters of the motor 204 that can affect the functionality of the motor 204 during operation. For example, the controller 910 is configured to determine the torque of the motor 204 based on one or more received signals from the sensors.

In some examples, the controller 910 is optionally connected to a speed sensor 908. In some examples the speed sensor 908 is a hall sensor configured to detect each revolution of the motor 204. In some alternative examples, the speed sensor 908 can be an optical sensor or any other suitable sensor configured to detect rotation of the motor 204, the rotatable motor shaft 226, or any other parts of the reciprocating mechanism 200 such as the eccentric drive wheel 236. The speed sensor 908 is configured to send a signal to the controller 910. The controller 910 is configured to determine the rotational speed of the motor 204 in dependence of the received signal from the speed sensor 908.

In some examples, the controller 910 is not connected to a speed sensor 908 and instead, the controller 910 receives information from a look-up table stored in memory (not shown) relating to the speed of the motor 204. For example, the controller 910 can receive estimated speed information based on the voltage and current signals during operation.

In some examples, the controller 910 is configured to determine the efficiency of the motor 204. In some examples, the controller 910 receives information from a look-up table stored in memory (not shown) relating to the efficiency of the motor 204. For example, the controller 910 determines the phase angle of the motor 204 during operation and receives information relating to the efficiency of the motor 204 based on the determined phase angle.

Alternatively, the controller 910 is configured to determine the efficiency of the motor 204 during a calibration operation based on operational parameters and/or variables of the motor 204. In some examples, the phase angle of the motor 204 is determined by the controller 910. Alternatively, the information relating to the phase angle (° phase) of the motor 204 is sent from the motor 204 to the controller 910.

In some examples, the rammer 100 is powered by an AC voltage and/or a DC voltage. Since the grid voltage $U_{grid}$ follows a sine wave, the controller 910 may determine the phase angle of the voltage in order to determine the electrical power $P_{elec}$. For example, the phase angle is the angle or the moment of the sin-wave of the voltage where the triac switches (not shown) on. The controller 910 determines the ° phase such that the controller 910 can control the power and speed of the motor 204.

The controller 910 is configured to determine the phase angle for every half of the sine wave of the grid voltage $U_{grid}$ in order to determine how much power is delivered to the motor 204. Furthermore, the controller 910 determines the phase angle because this affects the power of the motor 204 and in turn the operation point of the motor 204.

The operation point of the motor 204 is specific point within the operation characteristic of the motor 204 combined with the reciprocating mechanism 200.

The efficiency factor μ depends on the operation point of the motor 204 and therefore the efficiency factor μ depends indirectly on the phase angle for AC applications. In some examples, the phase angle is calculated by a motor control part (not shown) of the motor 204. In this way, the controller 910 can be configured to receive information relating to the phase angle during operation of the motor 204. In some other examples, the controller 910 is configured to measure and determine the phase angle.

In contrast, in some examples the motor 204 is powered by a DC power source, e.g. a battery pack 202. In this case, the efficiency factor is a DC efficiency parameter. In some examples, the DC efficiency parameter may be a constant. In some other examples, the DC efficiency parameter may vary due to one or more parameters of the rammer 100.

In some examples, the controller 910 is configured to determine the operational electrical parameters and/or variables of the motor 204 as shown in step 1002 as follows.

The mechanical power $P_{mec}$ is equal to the electrical power $P_{elec}$ multiplied by an efficiency factor μ.

$$P_{mec}=\mu P_{elec} \quad [1]$$

The average electrical power $P_{elec}$ is determined by the product of the current I(i) and voltage U(i) which are sampled discretely at time intervals i. The controller 910 is configured to control the frequency of sampling the current and/or the voltage. In some examples, the controller 910 receives signals from the voltage sensor 904 and the current sensor 906 at a predetermined frequency. In some examples, the controller 910 receives signals from the voltage sensor 904 and the current sensor 906 at 50 times a second.

$$P_{elec}=\frac{1}{k}\sum_{i=1}^{k}U(i)\cdot I(i) \quad [2]$$

The mechanical power $P_{mech}$ is determined by the torque M on the rotatable motor shaft 226 multiplied by the angular velocity ω of the rotatable motor shaft 226. As mentioned above, n can be determined from the speed sensor 908.

$$P_{mech}=M\omega=M2\pi n \quad [3]$$

Accordingly, when equation [1] is combined with equation [3], for an AC power source 916:

$$M2\pi n=\mu(P_{elec,}\,°\text{phase})P_{elec}=\mu(P_{elec,}\,°\text{phase})\frac{1}{k}\sum_{i=1}^{k}U_i\cdot I_i \quad [4a]$$

In contrast, if a DC power source 916, e.g. a battery pack 202 is alternatively used, then the efficiency μ is DC efficiency parameter. In some examples, the DC efficiency parameter may be a constant. In some other examples, the DC efficiency parameter may vary due to one or more parameters of the rammer 100. The DC efficiency parameter may vary due to the operation point of the motor 204, electronics or the controls. In some examples, the controller 910 determines the DC efficiency parameter from look-up tables based on predetermined operational parameters of the motor 204. In other examples, the DC efficiency parameter can be determined by the controller 910 by one or more other methods such as observers or a Kalman-Filter. For example, the following equation may be used:

$$M 2\pi n = \mu P_{elec} = \mu \frac{1}{k} \sum_{i=1}^{k} U_i \cdot I_i \quad [4b]$$

As mentioned above, the controller 910 either determines or receives a signal relating to the phase angle of the voltage across the motor 204.

$$U_{grid} = \frac{U_{ADC} \cdot U_{ref}}{128} \frac{R_1}{R_2} = \frac{U_{ADC} \cdot U_{ref}}{128} \frac{390k\Omega}{5.1\Omega} = A \cdot U_{ADC} \quad [5]$$

Where $U_{grid}$ is the voltage of the mains power source 916, $U_{ADC}$ is the voltage across an analog to digital converter (ADC) (not shown) and $U_{ref}$ is the reference voltage used by the ADC. $R_1$ and $R_2$ are the circuit resistances. Accordingly, $U_{grid}$ can be simplified to $U_{ADC}$ multiplied by a factor A which corresponds to the specific characteristics of the circuit 914 of the rammer 100. The factor A can be calculated during factory setting or a calibration process of the rammer 100.

$$I = \frac{I_{ADC} / 128 \cdot U_{ref} - U_{off}}{V_{Op} \cdot R_{shunt}} = B \cdot I_{ADC} - b \quad [6]$$

Where I is the current through the rammer 100, $I_{ADC}$ is the current through the ADC, $U_{off}$ is the voltage in the Opamp (not shown) in the rammer 100 when the Opamp is off, $V_{Op}$ is the voltage in the Opamp, $R_{shunt}$ is the resistance of the shunt in the circuit 914. Accordingly, I can be simplified to $I_{ADC}$ multiplied by a factor B minus an offset factor b which corresponds to the specific characteristics of the circuit 914 of the rammer 100. The factors B, b can be calculated during a factory setting or a calibration process of the rammer 100.

Rearranging [2] with [5] and [6] the following can be calculated by the controller 910.

$$P_{elec} = \frac{1}{k} \sum_{i=1}^{k} A \cdot U_{ADCi} \cdot (B \cdot I_{ADCi} - b) = \frac{A \cdot B}{k} \left( \sum_{i=1}^{k} U_{ADCi} \cdot I_{ADCi} - \frac{b}{B} \sum_{i=1}^{k} U_{ADCi} \right) \quad [7]$$

In this way using [7] and [4], the torque M can be determined by the controller 910 as shown in step 1002 of FIG. 10. In some examples, the controller 910 is arranged to use the following equation for the AC power source 916:

$$M = \frac{\mu \sum_{i=1}^{k} U(i) \cdot I(i)}{k 2\pi n} = \frac{\mu \cdot \frac{A \cdot B}{k} \left( \sum_{i=1}^{k} U_{ADCi} \cdot I_{ADCi} - \frac{b}{B} \sum_{i=1}^{k} U_{ADCi} \right)}{k 2\pi n} \quad [8a]$$

Alternatively, the controller 910 can use the following equation for the DC power source 916 e.g. a battery pack 202:

$$M = \frac{\mu \sum_{i=1}^{k} U(i) \cdot I(i)}{k 2\pi n} \quad [8b]$$

Accordingly, the controller 910 is configured to determine the torque on the motor drive shaft 226 and therefore the operational load of the motor 204.

Figure 11:
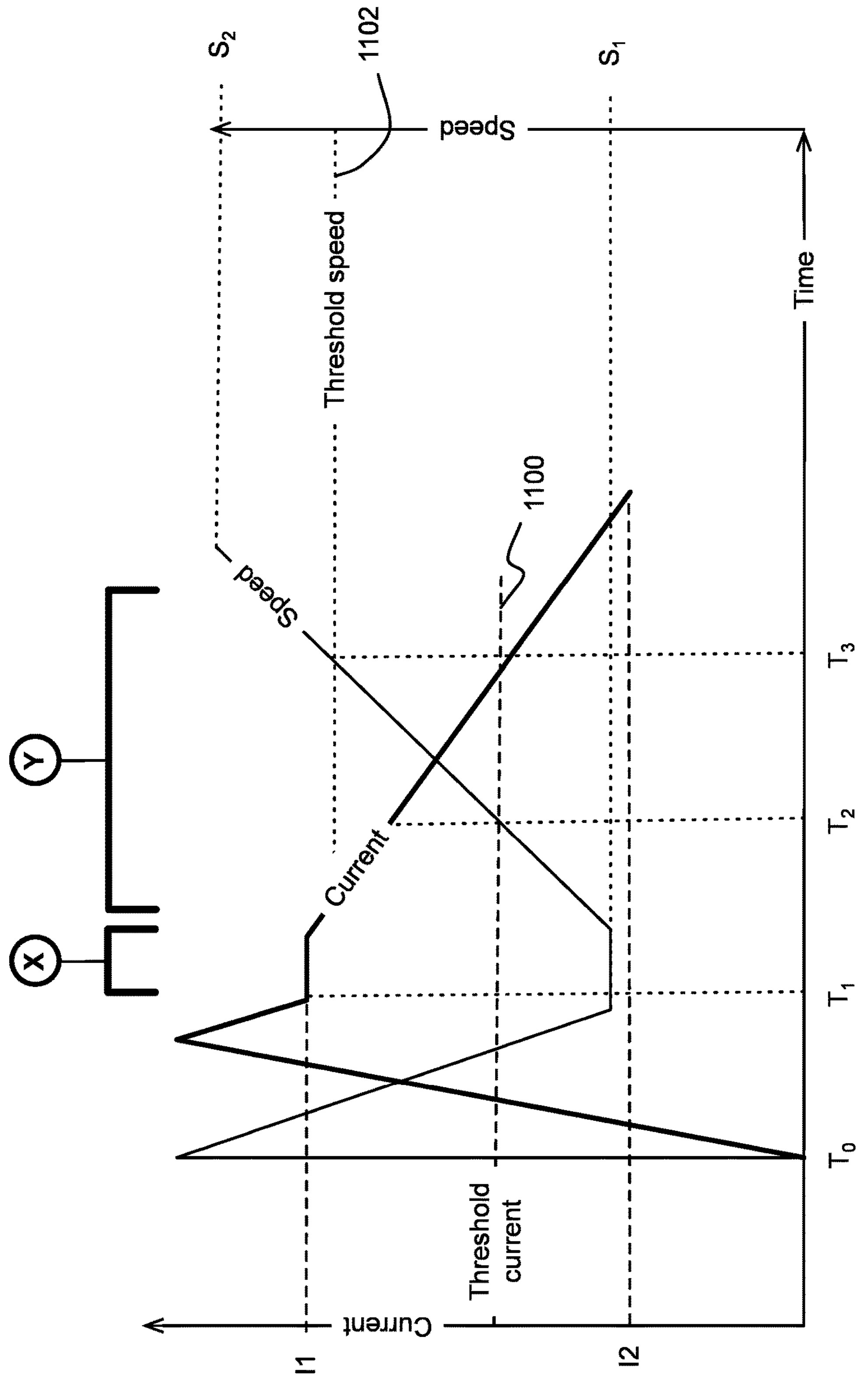
FIG. 11 shows a graph of current/speed versus time for a rammer according to an example.
Figure 12:
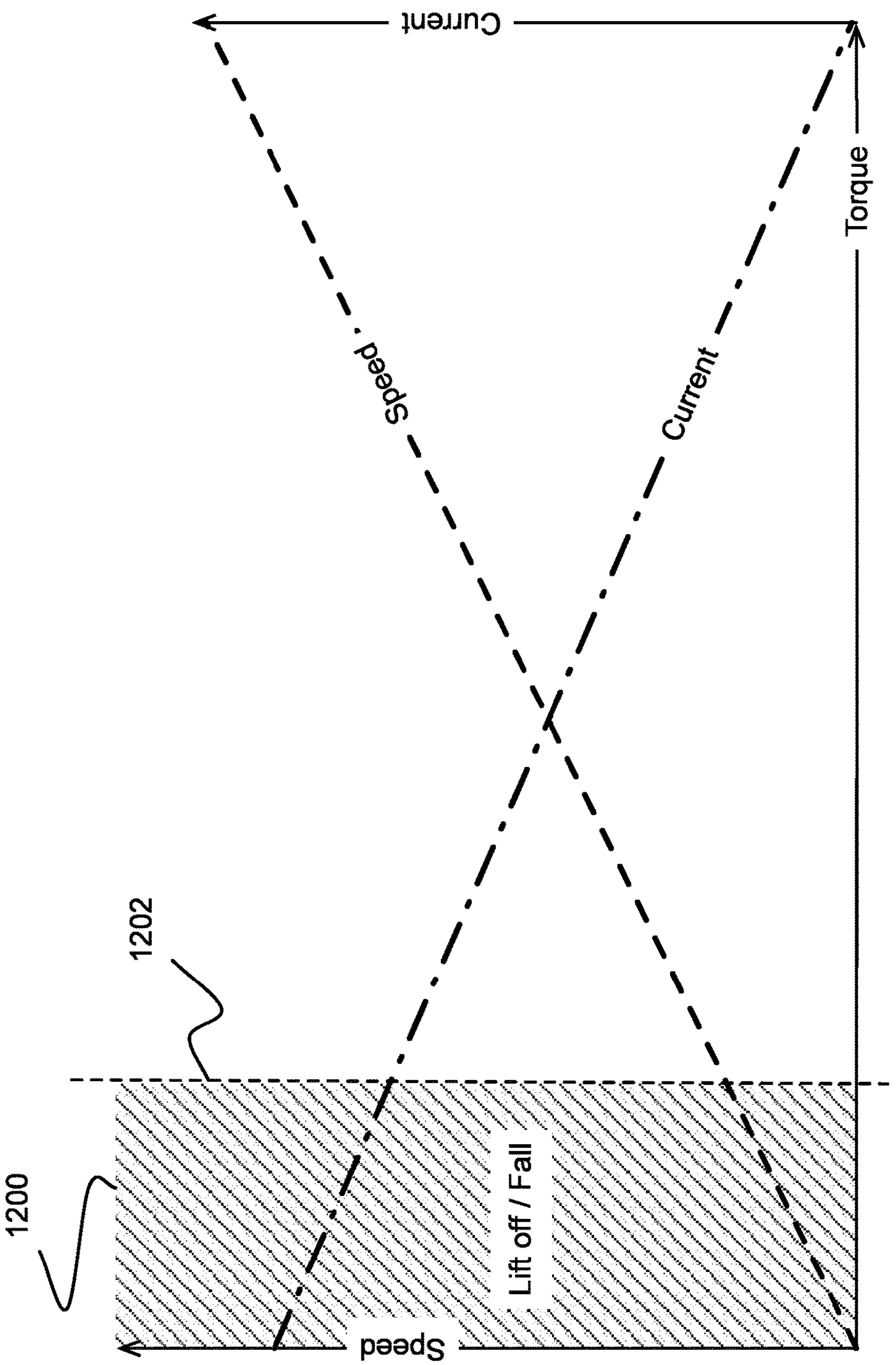
FIG. 12 shows a graph of current/speed versus torque for a rammer according to an example.

Turning now to FIGS. 11 and 12, a specific optional operation of the rammer 100 and the controller 910 will now be discussed. FIG. 11 shows an exemplary, simplified representative graph of current and speed of a rammer 100 over time representing different operational scenarios of the rammer 100. FIG. 12 shows an exemplary, simplified representative speed/torque and a current/torque graph for the rammer 100. A more generalised operation of the rammer 100 and the controller 910 will be discussed in reference to FIG. 21 below.

FIG. 11 shows a scenario of the rammer 100 when the operational load of the rammer 100 is reduced.

For example, the compacting foot 112 is not engaging the surface S to be compacted. This may because the rammer 100 has been lifted upwards e.g. by a winch or a crane and the compacting foot 112 is no longer engaging the surface to be compacted S. Alternatively, the rammer 100 has toppled over on its side and the compacting foot 112 of the rammer 100 is no longer in contact with the surface S to be contacted.

In FIG. 11, the scenario labelled "X" in a circle represents a time period whereby the rammer 100 is operating normally. At time $t=T_0$, the motor 204 of the rammer 100 is actuated and the motor 204 spins up to an operating speed. The current may spike during start-up until the motor 204 reaches a steady running current. The speed of the motor 204 may rotate faster at the start because the motor 204 may not be under load.

At $T=T_1$, the rammer 100 and the motor 204 are operating under normal conditions. In this case, the motor 204 is operating under a load because the compacting foot 112 is engaging the surface S to be contacted. Accordingly, the motor 204 during normal operation draws a first current $I_1$. The first current $I_1$ is above a threshold current 1100. The current drawn by the rammer 100 is shown in FIG. 11 as a thick line and is also labelled "current". At the same time, the motor 204 during normal operation rotates a first speed $S_1$. The first speed $S_1$ is below a threshold speed 1102. The speed of the motor 204 is shown in FIG. 11 as a thin line and is also labelled "current".

In FIG. 11, the scenario labelled "Y" in a circle represents a time period whereby the rammer 100 is not operating normally. Instead, the rammer 100 has fallen over or has been lifted up so that the compacting foot 112 is no longer in contact with the surface S to be compacted.

In some examples, the rammer 100 operates during normal operation with the motor 204 drawing a predetermined current and rotating at a predetermined speed. The motor 204 is configured to vary during operation in terms of the speed rotation and the current draw. However, if the motor 204 is able to rotate above a certain speed and does not draw a certain current, then the controller 910 is able to determine that the rammer 100 is no longer under load. For example, the rammer 100 is no longer standing upright and the compacting foot 112 is not in contact with the surface S to be compacted. In this way, the controller 910 determines that if the speed of the motor 204 is below the threshold speed 1102 then the rammer 100 is operating normally (and upright). Similarly, the controller 910 determines that if the current draw of the motor 204 is above the threshold current 1100 then the rammer 100 is operating normally (and upright).

In scenario Y in FIG. 11, the controller 910 is configured to determined that there is a change in the operational load of the motor 204 based on the received at least one motor parameter and/or variable signal as shown in step 1004.

The controller 910 determines that speed and the current are not within the normal operating parameters of the motor 204. The controller 910 determines that the speed of the motor 204 has exceeded the threshold speed 1102 and that the current draw of the motor 204 has fallen below the threshold current 1100. FIG. 10 shows the controller 910 making this determination in step 1006. In some examples, the controller 910 can determine whether the operational load of the motor 204 is normal. The controller 910 can determine the operational load of the motor 204 from the speed and current thresholds 1100, 1102 as shown in FIG. 11. Additionally or alternatively, the controller 910 can determine whether the torque on the motor 204 is above or below a predetermined torque threshold 1202 corresponding respectively to a load or no load on the motor 204.

FIG. 12 shows an issue zone 1200 in the simplified speed/torque and current/torque graphs. The issue zone 1200 indicates a torque profile of the rammer 100 when the rammer 100 has been lifted off or fallen over. If the controller 910 determines that the torque M determined from the speed, current and other motor parameters and/or variables, of the motor 204 is low, then the controller 910 can determine there is an issue with the rammer 100. In this way, the controller 910 determines that the rammer 100 is operating under normal load or operating within the issue zone 1200 as shown in step 1006 in FIG. 10.

In step 1006, the controller 910 may determine that the motor 204 is operating under normal load e.g. as shown in scenario X in FIG. 11. In this case, the controller 910 takes no action based on the determined operational motor parameters and/or variables e.g. the torque M of the motor 204. Accordingly, the method returns to step 1000 and controller 910 continues receiving signals and monitoring the operation of the motor 204.

Figures 13A, 13B, 13C:
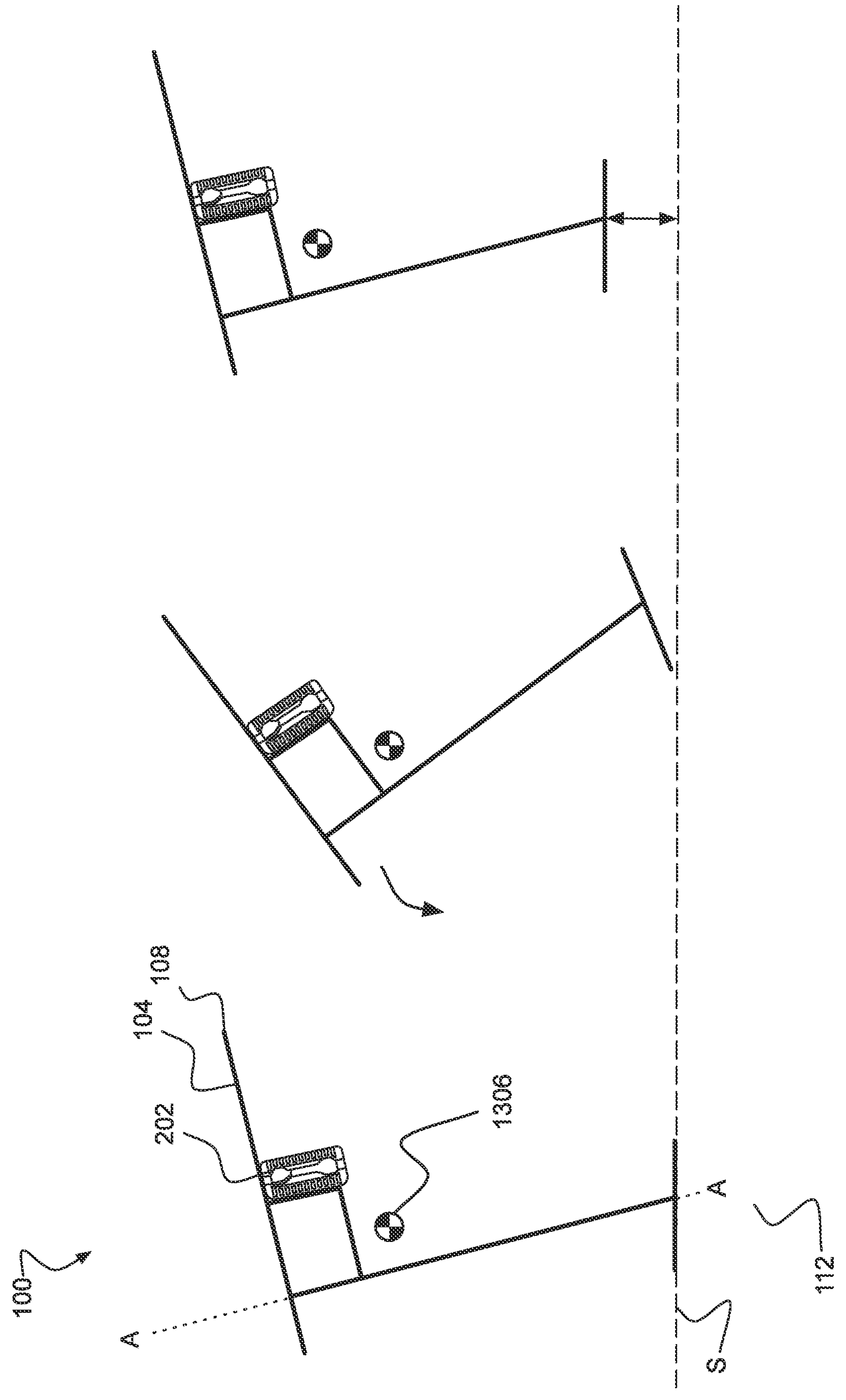
FIGS. 13*a*, 13*b* and 13*c* show schematic side views of a rammer according to an example.

However, in some examples the rammer 100 is determined to cease operating with a normal load. An example of the rammer 100 being used with a normal load is shown in FIG. 13*a*. FIG. 13*a* is a schematic side view of the rammer 100 being used with a normal load. The centre of mass 1306 of the rammer 100 is over the compacting foot 112 and there is no turning moment about the compacting foot 112 to cause the rammer 100 to topple.

Accordingly, when the controller 910 determines that the motor 204 is not operating with a normal load as shown in step 1006, for example, torque M has fallen below the torque threshold 1202 in step 1006, the controller 910 can take one or more actions.

In some examples, the controller 910 can issue an alert to the user as shown in step 1008 FIG. 10. The controller 910 can display the alert in the form of a visual signal such as an LED (not shown) indicating operational status on the rammer 100. Alternatively, the controller 910 can issue a display message (not shown) on the control panel 900. Additionally, or alternatively, the controller 910 can send a signal to a loudspeaker to issue an audible warning. In this way, the user can receive information warning that the rammer 100 is not operating under normal load and has lifted up or toppled over.

An example of the rammer 100 being used without a normal load is shown in FIG. 13*b* and FIG. 13*c*. FIG. 13*b* is a schematic view of the rammer 100 being used when the rammer 100 is toppling over and FIG. 13*c* is a schematic view of the rammer 100 being used when the rammer 100 has been lifted up. In FIG. 13*b* the centre of mass 1300 of the rammer 100 is no longer over the compacting foot 112 and there is now a turning moment about the compacting foot 112 which causes the rammer 100 to topple. In FIG. 13*c* the compacting foot 112 is no longer in contact with the surface S to be compacted.

If the user has turned their back on the rammer 100, once the user receives the alert, the user can perform maintenance on the rammer 100 to clear the alert.

In some examples, once the controller 910 has determined that the motor 204 is not operating under a normal load, the controller 910 can optionally issue a control signal to modify the operational parameters and/or variables of the motor 204 as shown in step 1010 of FIG. 10.

In some examples, the controller 910 is configured to send a stop control signal to stop the motor 204 as shown in step 1012 in FIG. 10. Additionally or alternatively, the controller 910 is configured to send a slow motor control signal to slow the speed of the motor 204 as shown in step 1014 in FIG. 10. In this way, the controller 910 is able to detect if the rammer 100 is lifted up from the ground or if the rammer 100 falls over and put the rammer 100 in to a safe mode. The safe mode can either be a complete shutdown of the rammer 100 or slowing the motor 204 down to an idling speed.

As discussed in reference to FIGS. 11 and 12, optionally the controller 910 determines that the motor 204 is not operating under a normal load based on operational parameters and/or variables such as voltage, speed, current and torque of the motor 204. In some examples, this works for straightforward operating conditions. However, in some examples determination based on a representative function of speed versus torque may not be sufficient. For example, complex environmental conditions and/or operation conditions may mean that the controller 910 cannot determine a change in the status of the rammer 100 with sufficient certainty. In some examples, the controller 910 may optionally makes a multi-parameter and/or variable determination based on one or more further parameters and/or variables which is discussed in further detail with respect to FIG. 21 below.

In some examples, the controller 910 can optionally carry out one or more steps in the method as shown in FIG. 10 with additional received signals from the rammer 100. For example, the controller 910 can optionally receive other signals as shown in step 1016 when carrying out step 1006. Additionally or alternatively, the controller 910 can optionally receive other signals as shown in step 1018 when carrying out step 1010.

In some examples, the handle 104 comprises a user operated switch 902. The user operated switch 902 is some examples is configured to send a signal to the controller 910. For example, during use of the rammer 100, the user grips the user operated switch 902 and the controller 910 can determine whether the user is gripping the handle 104. In this way, the controller 910 can determine if the user is gripping the handle 104 of the rammer 100 whilst the controller 910 also determines that rammer 100 is falling over or lifting up. Accordingly, the controller 910 can send a control instruction to shut off the motor 204 according to step 1012 if the user is also gripping the handle 104 and the user operated switch 902.

In some examples, the user operated switch 902 is a use-to-hold switch and the controller 910 will not let the motor 204 operate without the user actuating the user operated switch 902. In this way, the controller 910 detects if the user operated switch 902 is released and shuts down the motor 204.

In some examples, the controller 910 is configured to periodically detect whether the user operated switch 902 is periodically actuated. For examples the controller 910 determines whether the user operated switch 902 is actuated within a timer period e.g. 60 seconds. In some examples, controller 910 issues a stop signal to the motor 204 if controller 910 does not detect actuation of the user operated switch 902 within a predetermined timer period. This means that the user must stay alert when using the rammer 100 and keep actuating the user operated switch 902 to prove to the controller 910 that the user is able to control and use the rammer 100.

Optionally, the controller 910 is connected to a tilt sensor 912. In some examples, the tilt sensor 912 an accelerometer or an inclinometer. In some examples, the tilt sensor 912 is a dual axis tilt sensor 912 to detect whether the rammer 100 is inclining in a lateral sideways direction and/or a forwards direction. The controller 910 is configured to receive a tilt signal from the tilt sensor 912.

Accordingly, the controller 910 can send a control instruction to shut off the motor 204 according to step 1012 if the tilt sensor 912 sends a signal indicating that the rammer 100 is tilted too much.

The controller 910 can then determine whether the rammer 100 is actually falling over by using the received tilt signal and the determined operational parameters and/or variables of the motor 204. By using both the tilt sensor 912 and the determined parameters and/or variables of the motor 204, the controller 910 is less likely to falsely detect that the rammer 100 is falling over.

In some examples, the controller 910 can use a signal received from a user operated switch 902, the tilt sensor 912 and the determined operational parameters and/or variables of the motor 204. For example the controller 910 may determine that the rammer 100 is being used on an inclined surface rather than falling over, if the user is gripping the user operated switch 902 and the motor 204 is determined by the controller 910 to be under a normal load, if the tilt sensor 912 sends a signal indicating that the rammer 100 is inclined at an angle.

Figure 21:
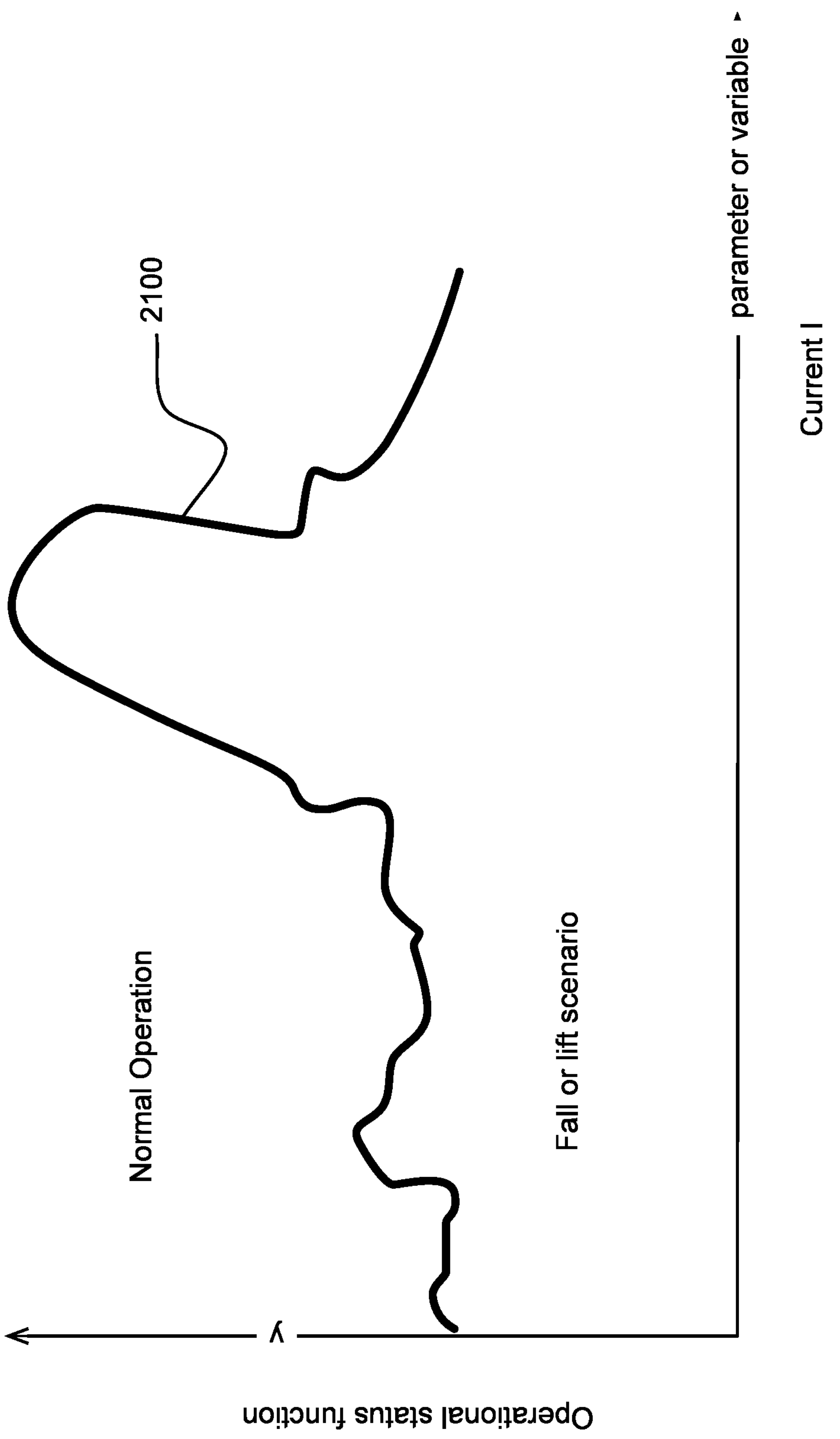
FIG. 21 shows a graph of a function for determining status of a rammer according to an example.
Figure 22:
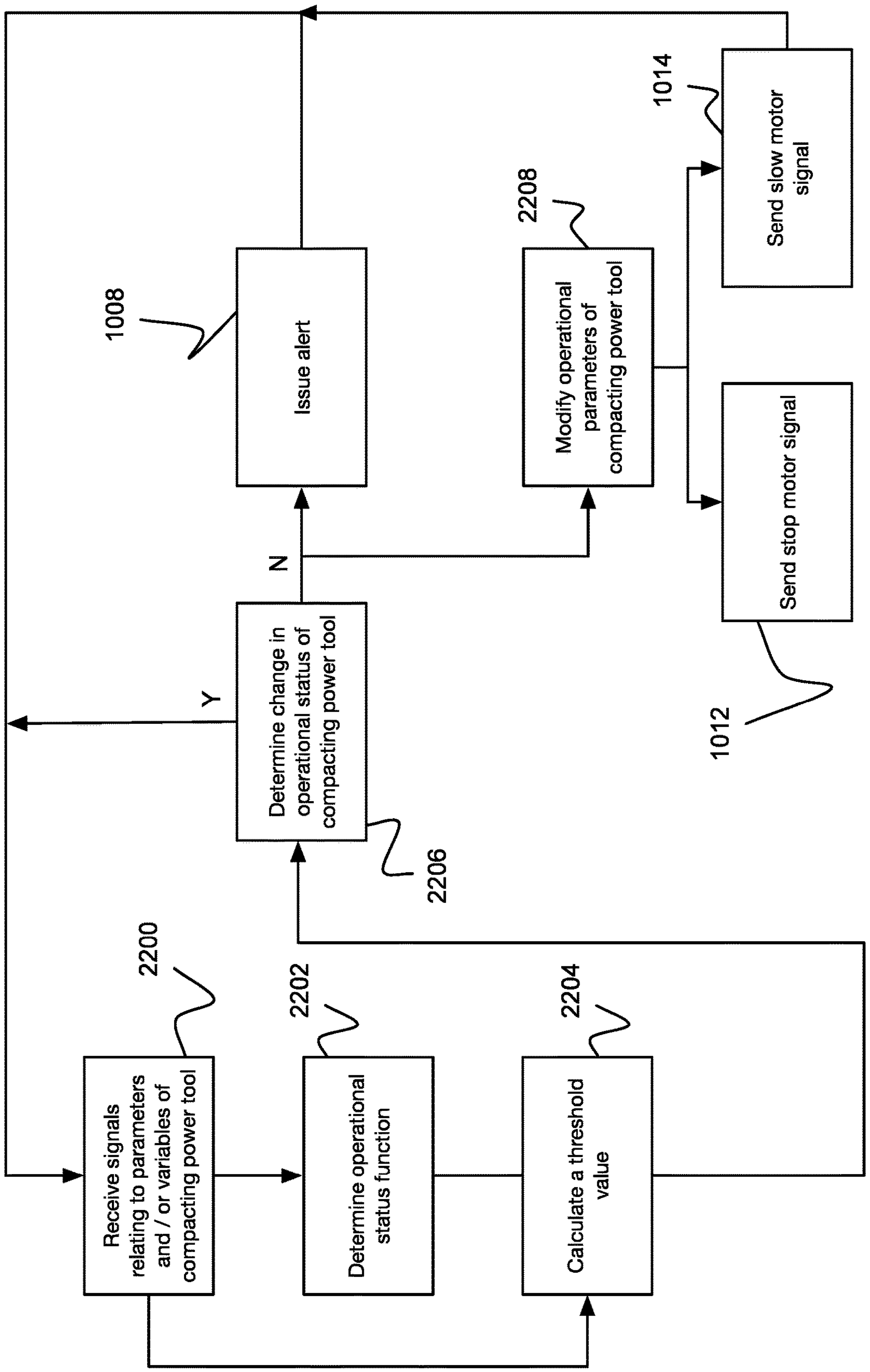
FIG. 22 shows a flow diagram of a control process for a rammer according to an example.

Turning to FIGS. 21 and 22 a more generalised operation of the rammer 100 and the controller 910 will now be discussed. FIG. 21 shows a graph of a function for determining status of the rammer 100 according to an example. FIG. 22 shows a flow diagram of a control process for the rammer according to an example The examples as described in reference to FIGS. 11 and 12 are specific to a particular use case. However, in other examples the controller 910 is configured to determine a status of the rammer 100 based on a multi-parameter and/or multi-variable function.

Since the operation of the rammer 100 may depend on a plurality of external factors and operating conditions of the rammer 100, the controller 910 can determine a change in the status of the rammer 100 based on a plurality of rammer parameters and/or variables. In other words, the controller 910 may need more than just one rammer parameter and/or variable to determine a change in the status e.g. lift status or a fall status of the rammer 100.

As shown in step 2200 the controller 910 is configured to receive signals relating to parameters and/or variables of the rammer 100. This step is similar to step 1000 as shown in FIG. 10. However, step 2200 can further include receiving information relating to the rammer 100 in addition to the motor 204. For example, the controller 910 can receive one or more rammer parameters received from a look up table stored in memory (not shown). Alternatively, the controller 910 can receive other sensor information different from the voltage sensor 904, the current sensor 906 or the speed sensor 908.

In step 2200, the controller 910 may receive a signal comprising information relating to other rammer variables or parameters and/or a controller output. The controller output can be information relating to the status of the rammer 100.

In some examples, the parameters and/or the variables of the rammer 100 include but are not limited to voltage U, current, I, speed rpm, torque M, efficiency, a conduction band signal CB, or any other controller output.

Therefore, optionally, the controller 910 is configured to determine an operational status function y of the rammer 100 as shown in step 2202 of FIG. 22:

$$y=f(U,I,rpm,M,\mu,CB,\mathrm{Rammer}_{var},\mathrm{Controller}_{output})$$

The operational status function y is used the determine whether the rammer 100 is operating in a normal mode of operation or whether the rammer 100 is in a lift up status or a fall over status. The operational status function y of the rammer 100 is a multi-variable function using information about the rammer 100 from a plurality signals, sensors, look-up tables, stored information, user input, controller output or any other input.

The controller 910 is configured to calculate a threshold value 2100 (as shown in Figure) for indicating the operational change of the rammer 100 when the operational status function y changes. The controller 910 is configured to calculate the threshold value 2100 based on the received at least one signal as shown in step 2204. Step 2204 of calculating the threshold value can be carried out after the step 2202. Alternatively, the step 2204 of calculating the threshold value can be carried out in parallel with the step 2202. In some examples, the controller 910 is configured to calculate the threshold value 2100 from a threshold function Tf.

$$Tf=f(U,I,rpm,M,\mu,CB,\mathrm{Rammer}_{var},\mathrm{Controller}_{output})$$

Accordingly, the calculated threshold value 2100 is dynamic and may change depending on one or more changes in the input parameters and/or variables of the rammer 100 during operation. In some examples, the calculated threshold value 2100 can be calculated from the same input parameters and/variables for the operational status function y. In some other examples, the calculated threshold value 2100 can be calculated from a sub-set or a different set of input parameters and/variables for the operational status function y.

An exemplary dynamic threshold value 2100 is shown in FIG. 21 varying as a function of a rammer 100 variable, e.g. current I. However, whilst current/is shown in FIG. 21 on the x axis, this is representative for the purposes of clarity. In other examples, the calculated threshold value 2100 varies as a function of a plurality of rammer parameters and/or variables.

The step 2204 of calculating the threshold value 2100 can be carried out at any discrete time. For example, step 2204 can be carried out periodically e.g. every 20 ms. Additionally or alternatively, the controller 910 can continuously calculate the threshold value 2100. The calculated threshold value 2100 can be filtered or weighted depending on one or more conditions e.g. a tool mode. In some examples, the controller 910 can weight the parameters and/or the variables based on a weighting factor or any other exponent.

The controller 910 is then configured to determine the change in the operational status function y when the operational status function exceeds or drops below the calculated threshold value 2100 as shown in step 2206. If the controller 910 determines that the operational status function y exceeds the calculated threshold value 2100 for a given set of rammer parameters/and or variables, then the controller 910 determines that the rammer 100 is operating normally. In this case, the controller 910 returns back to step 2200.

However, if the controller 910 determines that the operational status function y drops below the calculated threshold value 2100 for a given set of rammer parameters/and or variables, then the controller 910 determines that the rammer 100 is undergoing a lift up status or a fall over status. In this way, the operational status function y being below the threshold value 2100 corresponds to the scenario when the compacting foot 112 is not engaging the surface S to be compacted either because the rammer 100 has fallen over or has lifted up.

When the controller 910 determines that the operational status function y drops below the calculated threshold value 2100, the controller 910 may take one or more actions. Steps 1008, 1012, 1014, are the same as described with respect to FIG. 10. Additionally or alternatively, the controller 910 may issue a control signal for modifying one or more operational parameters and/or variables of the rammer 100 as shown in step 2208. The controller 910 can therefore take remedial action to make the rammer 100 as previously discussed.

In general, the various examples of the disclosure may be implemented in hardware or special purpose circuits, software, logic, or any combination thereof. For example, some aspects may be implemented in hardware, while other aspects may be implemented in firmware or software which may be executed by a controller 910, microprocessor, or other computing device, although the disclosure is not limited thereto. While various aspects of the disclosure may be illustrated and described as block diagrams, flow charts, or using some other pictorial representation, it is well understood that these blocks, apparatus, systems, techniques, or methods described herein may be implemented in, as non-limiting examples, hardware, software, firmware, special purpose circuits or logic, general purpose hardware or controller 910 or other computing devices, or some combination thereof.

The examples of this disclosure may be implemented by computer software executable by a data processor, such as in the processor entity, or by hardware, or by a combination of software and hardware. The data processing may be provided by means of one or more data processors. Further in this regard it should be noted that any blocks of the logic flow as in the Figures may represent program steps, or interconnected logic circuits, blocks and functions, or a combination of program steps and logic circuits, blocks, and functions.

Appropriately adapted computer program code product may be used for implementing the examples, when loaded to a computer. The program code product for providing the operation may be stored on and provided by means of a carrier medium such as a carrier disc, card, or tape.

The controller 910 in some examples may comprise a memory. The memory may be of any type suitable to the local technical environment and may be implemented using any suitable data storage technology, such as semiconductor based memory devices, magnetic memory devices and systems, optical memory devices and systems, fixed memory, and removable memory. The data processors may be of any type suitable to the local technical environment, and may include one or more of general purpose computers, special purpose computers, microprocessors, digital signal processors (DSPs) and processors based on multi core processor architecture, as non-limiting examples.

Some examples of the disclosure may be implemented as a chipset, in other words a series of integrated circuits communicating among each other. The chipset may comprise microprocessors arranged to run code, application specific integrated circuits (ASICs), or programmable digital signal processors for performing the operations described above.

Energy Capture

Another example of the disclosure will now be described in reference to FIGS. 14, 15*a*, 15*b*, 16, 17*a*, and 17*b*.

The rammer 100 as shown in FIGS. 14, 15*a*, 15*b*, 16, 17*a*, and 17*b* in some examples is the same as shown the previous Figures. That is, the rammer 100 comprises a vibration compensation mechanism 230 as described in reference to FIGS. 1 to 8. Also the rammer 100 detects whether the motor 204 is operating under a normal load as described in reference to FIGS. 9, 10, 11, 12, 13*a*, 13*b* and 13*c*.

However in the examples described in reference 14, 15*a*, 15*b*, 16, 17*a*, and 17*b* the vibration compensation mechanism 230 is optional. Furthermore the controller 910 detecting whether the motor 204 is operating under a normal load is optional. Accordingly, FIGS. 14, 15*a*, 15*b*, 16, 17*a*, and 17*b* do not show a vibration compensation mechanism 230 or a controller 910 that detects whether the motor 204 is operating under a normal load.

FIGS. 14, 15*a*, 15*b*, 16, 17*a*, and 17*b* show a rammer 100. However, in other examples any other type of surface compacting power tool 100 can be used. For example, the power tool 100 can be a tamper, a soil compactor, a compactor, a jumping jack compactor, a plate compactor, a vibratory plate. or a jumping jack tamper.

Figure 14:
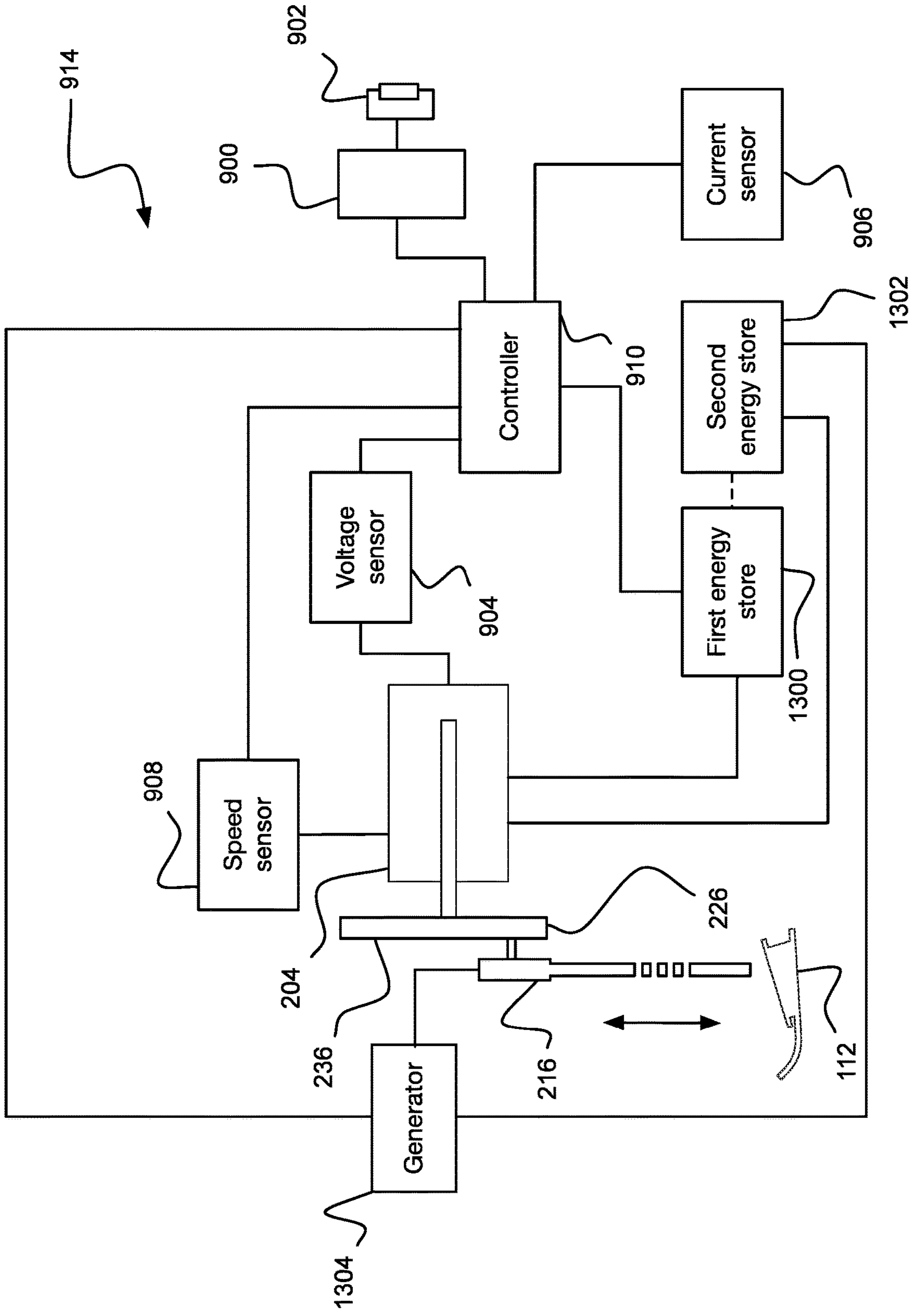
FIG. 14 shows a schematic view of a rammer according to an example.

FIG. 14 shows a schematic diagram of a circuit 914 for a rammer 100. The controller 910 has a similar functionality as previously described with respect to FIG. 9.

In some examples, the rammer 100 comprises a first energy store 1300. The first energy store 1300 is electrically connected to the motor 204 and the first energy store 1300 is configured to supply electrical power to the motor 204. The controller 910 is configured to selectively control the voltage and current to the motor 204 from the first energy store 1300. In some examples, the first energy store 1300 is a first battery pack 202*a* as described with reference to the previous examples.

In some examples, the rammer 100 comprises a second energy store 1302. The second energy store 1302 is electrically connected to the motor 204 and the second energy store 1302 is configured to supply electrical power to the motor 204. The controller 910 is configured to selectively control the voltage and current to the motor 204 from the second energy store 1302. In some examples, the second energy store 1302 is a second battery pack 202*b* as described with reference to the previous examples.

In some examples, the first energy store 1300 is the first battery pack 202*a* and the second energy store 1302 is the second battery pack 202*b*. In some examples, the first and second energy stores 1300, 1302 are mounted within the same battery pack 202. For example, the first energy store 1300 is one or more first battery cells 208 and the second energy store 1302 is one or more second battery cells 208 within the same battery pack 202. In some example, the first energy store 1300 is the first and second battery packs 202*a* and 202*b*.

In some examples, the second energy store 1302 can be a supercapacitor (not shown) instead of a second battery pack 202*b*. In other examples, the second energy store 1302 can be any suitable device for storing electrical energy.

In some examples the first energy store 1300 and the second energy store 1302 can be electrically connected to each other. The controller 910 in some examples is configured to selectively connect the first energy store 1300 and the second energy store 1302. For example, the controller 910 can selectively charge the first energy store 1300 from the second energy store 1302.

In some examples, the controller 910 is configured to selectively connect the first energy store 1300 to the motor 204. In some examples, the controller 910 is configured to selectively connect the second energy store 1302 to the motor 204. Furthermore, the controller 910 is configured to selectively connect both the first and second energy stores 1300, 1302 to the motor 204 at the same time. This means that both the first and second energy stores 1300, 1302 can supply the motor 204 during high current demand operations. This can protect the first energy store 1300 from overloading because the first energy store 1300 does not have as high current demand.

The rammer circuit 914 comprises a generator 1304 electrically connected to the second energy store 1302. In an example, the generator 1304 is mechanically coupled to the reciprocating mechanism 200. In some examples, the generator 1304 is coupled to the reciprocating piston 232. In this way, as the reciprocating piston 232 moves, kinetic energy stored in the reciprocating piston 232 is converted to electrical energy which is stored in the second energy store 1302. In order to ensure that the generator 1304 does not reduce the efficiency of the motor 204 during operation of the motor 204, the generator 1304 does not capture energy from the reciprocating mechanism 200 throughout an entire cycle of the reciprocating mechanism 200. This will be discussed in further detail below.

In another example, the generator 1304 is not coupled to the reciprocating mechanism 200 or the motor 204 but is coupled to one or more other parts of the rammer 100 that move during operation, for example, due to unwanted vibrations. For example, the generator 1304 may be synchronous machine to convert mechanical energy into electrical energy which is stored in the second energy store 1302. In some examples, the generator 1304 is a linear generator 1700 with a magnet 1702 that movable relative to one or more coils 1708. The sliding magnet 1702 may be coupled to a moving part of the vibration compensation mechanism 230 (described above) such as the support arms 800 and 802 that are coupled to the carrier 228. The coils 1708 may be fixed to the primary housing 102. In another example, the magnet 1702 may be fixed to the primary housing 102 and the coils 1708 may be movable due to the vibrations. As the magnet 1702 moves relative to the coils 1708 a current is induced and the electrical energy is stored. Furthermore, a braking effect is created as the kinetic energy is converted into electrical energy. This braking effect can be used to supplement the vibration dampening of the vibration compensation mechanism 230. In other examples, piezoelectric elements may be coupled to parts that have undesired vibrations, e.g., in the primary housing 102. The piezoelectric elements convert the mechanical energy from the vibrations into electrical energy, which can be stored in the second energy store 1302. In this way, waste energy generated in the rammer 100 can be recovered and stored when it is needed.

Figure 18:
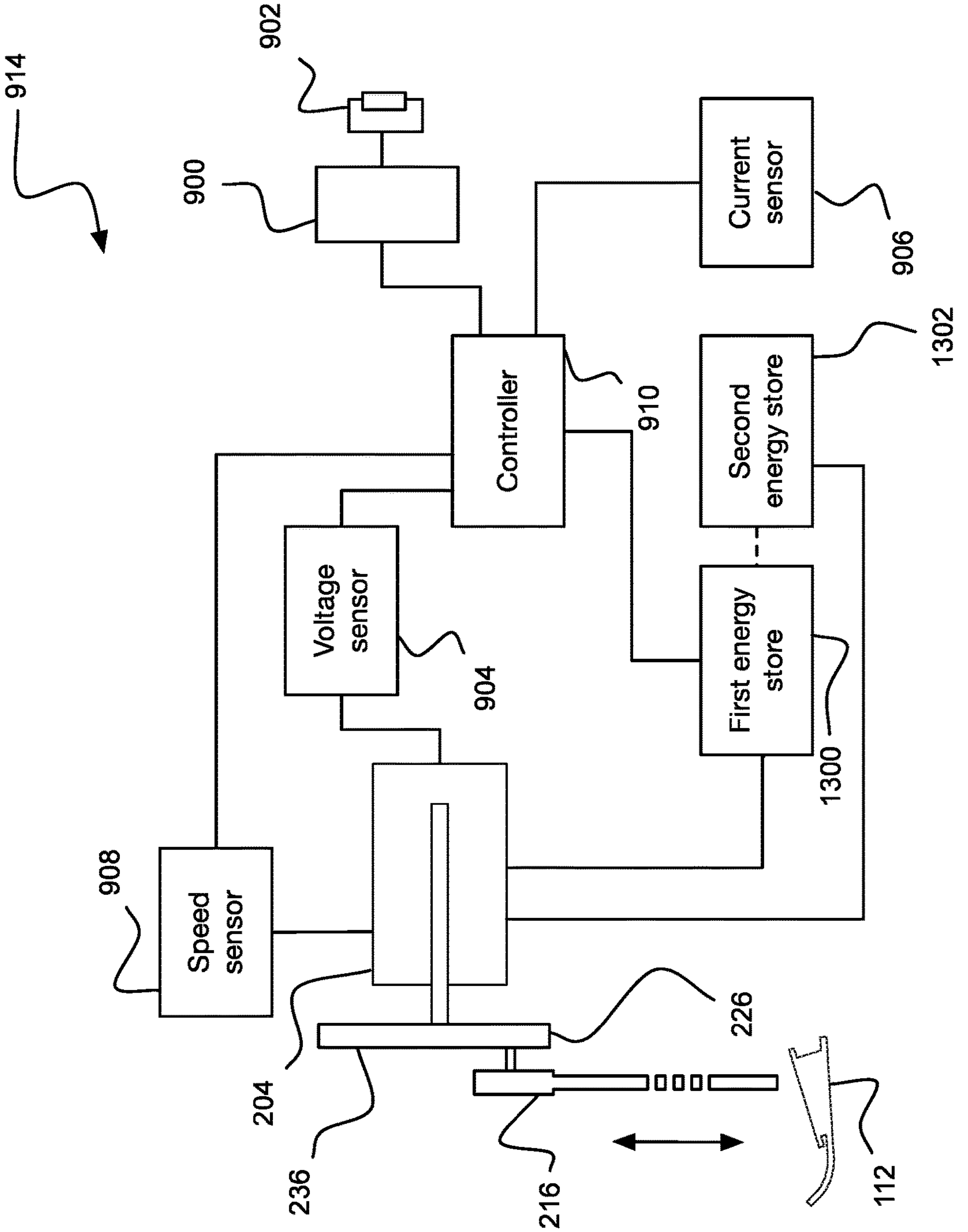
FIG. 18 shows a schematic view of a rammer according to an example.

In the example shown in FIG. 14, the generator 1304 is separate from the motor 204. However, in some examples, the motor 204 is also configured to generate electrical energy. FIG. 18 shows another schematic view of the rammer 100 with a motor 204 that is both a motor 204 and a generator 1304. When the rammer 100 is operating, there may be occasions in the oscillation of the rammer 100 where a torque is applied to the motor shaft (rather than the motor 204 providing the torque) via the reciprocating mechanism 200. These occasions occur due to the oscillation of the spring assembly and the mass of the rammer 100 under gravity. In these occasions the motor 204 can convert mechanical energy (the torque received via the reciprocating mechanism 200) into electrical energy. The controller 910 may be configured to determine when the electrical energy being generated by the motor 204 is greater than the electrical energy being supplied to the motor 204. For example, the controller 910 may determine (e.g., via voltage sensor 904) when the back electromotive force (EMF) generated by the motor 204 is greater than a certain voltage such as the bus voltage. The controller 910 may then activate a switch (e.g., one or more MOSFETs (not shown)) to electrically couple the motor 204 to the second energy store 1302 instead of the first energy store 1300 to store the energy generated by the motor 204. When the controller 910 determines that the back EMF falls below the bus voltage, the controller 910 then switches the motor 204 connection back to the first energy store 1300 so that the motor 204 can drive the reciprocating mechanism 200. This switching between the first and second energy stores 1300, 1302 for providing and receiving energy respectively may occur a plurality of times in a single cycle of operation (i.e., a single revolution of the eccentric drive wheel 236).

Figure 15B:
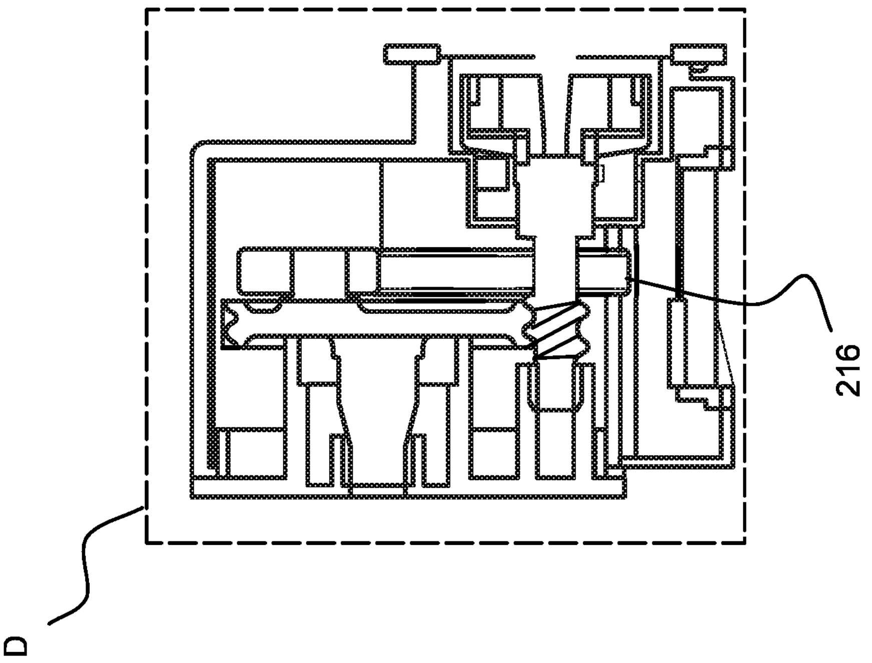
FIGS. 15*a* and 15*b* show close-up partial cross-sectional side views of a rammer according to an example.
Figure 15A:
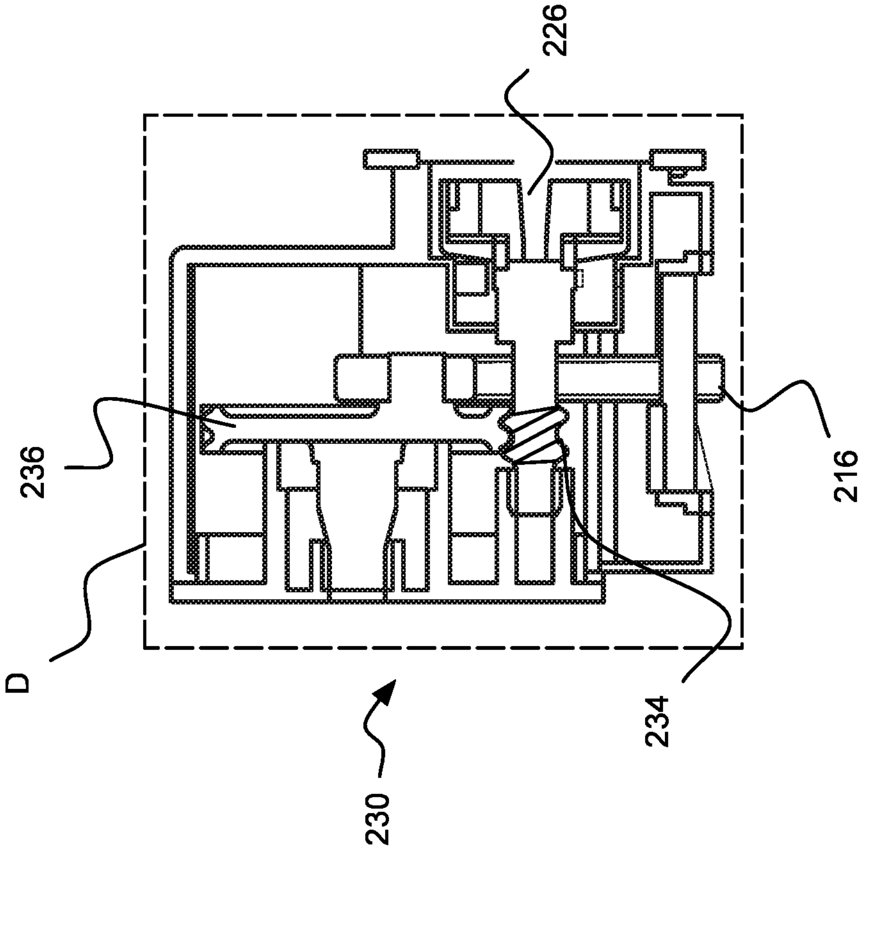

The process and mechanism for energy capture will now be discussed in further detail with respect to FIGS. 15*a*, 15*b*, 16 and 17*a*, 17*b*. FIGS. 15*a* and 15*b* show close-up partial cross-sectional side views of the rammer 100 in different parts of the cycle of the reciprocating mechanism 200. The dotted line in FIGS. 15*a* and 15*b* corresponds to the dotted box labelled D as shown in FIG. 2.

FIG. 15*a* shows the reciprocating mechanism 200 in the part of the cycle where the reciprocating piston 232 is fully extended and in the extended position where the reciprocating piston 232 is in a position furthest from the primary housing 102.

FIG. 15*b* shows the reciprocating mechanism 200 in the part of the cycle where the reciprocating piston 232 is fully retracted and in the retracted position where the reciprocating piston 232 is moved into a position closest to the primary housing 102.

In one example, in order to move the reciprocating piston 232 between the retracted position as shown in FIG. 15*b* and the extended position as shown in FIG. 15*a*, the reciprocating piston 232 can move due to the weight of the rammer 100 falling under the force of gravity. In some examples, the reciprocating piston 232 can move due to the weight of the rammer 100 falling under the force of gravity whilst being assisted by the motor 204. However as the rammer 100 falls, the motor 204 does not need to input as much energy into the reciprocating mechanism 200.

When the rammer 100 is operating and is oscillating under the spring assembly and the movement of the reciprocating piston 232, the reciprocating piston 232 is pushed upwards due to the weight of the rammer 100 (and any driven assistance by the motor 204).

In this way, there is a different amount of energy required to move the reciprocating piston 232 in different parts of the cycle of the reciprocating mechanism 200. This means that the voltage from the first energy store 1300 to the motor 204 can in some examples be selectively connected during the cycle of the reciprocating mechanism 200 to drive the motor 204.

Accordingly, when the reciprocating piston 232 moves upwards under the weight of the rammer, the controller 910 is configured to reduce or stop the voltage to the motor 204. During the part of the cycle of the reciprocating mechanism 200 when the motor 204 is not powered, the generator 1304 is configured to covert the kinetic energy of the reciprocating piston 232 to electrical energy. The generated electrical energy is stored in the second energy store 1302 in some examples.

Figure 16:
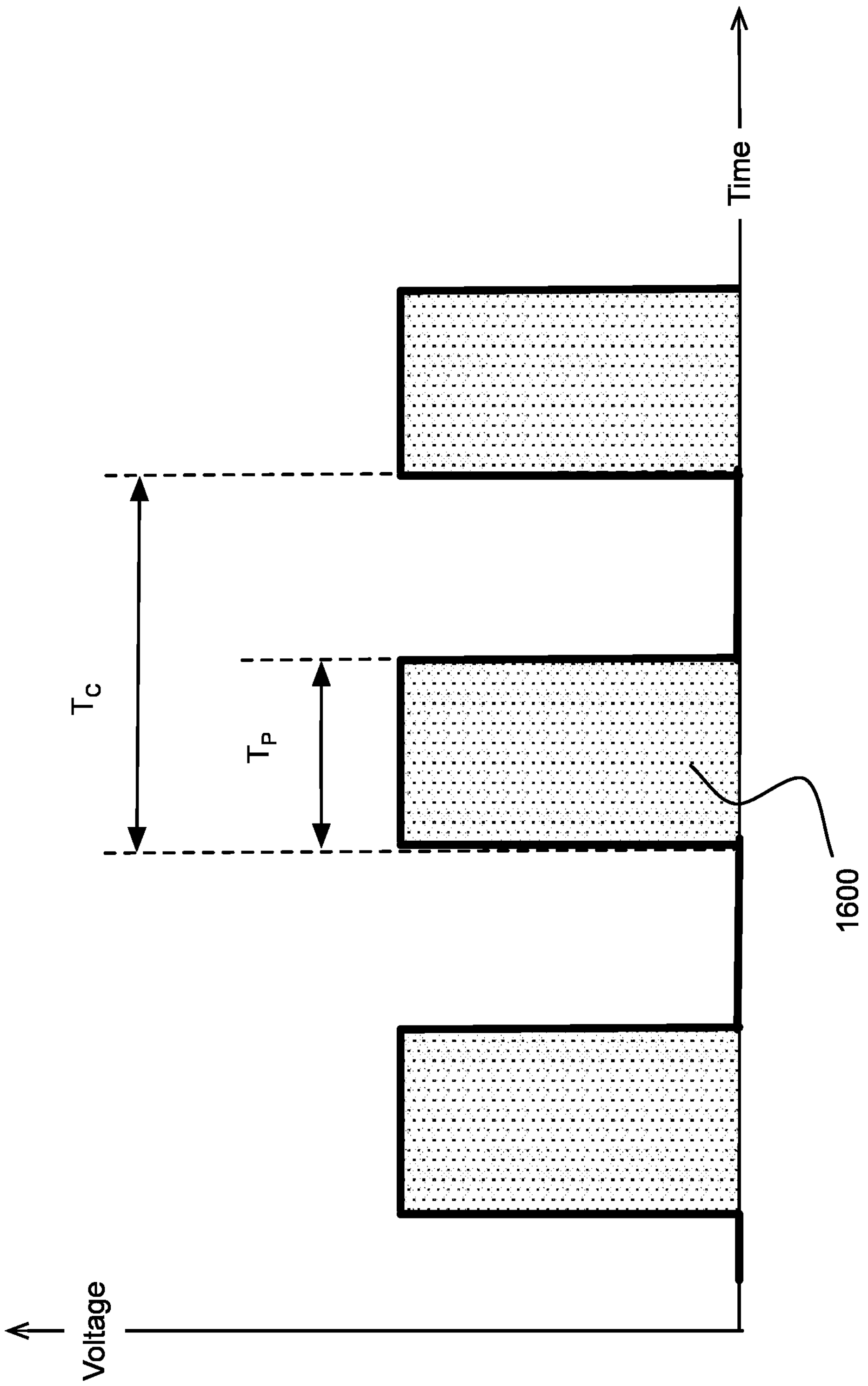
FIG. 16 shows a graph of voltage versus time for a rammer according to an example.

FIG. 16 shows a simplified graph of voltage versus time for the motor 204. The graph represents pulse width modulation of the voltage to the motor 204 in the examples where the motor 204 is powered by a DC voltage. The controller 910 is configured to control the width of each pulse. The width $T_P$ of the pulse 1600 is selectively controlled by the controller 910 to power the motor 204 in order to the move the reciprocating mass 216 from the retracted position as shown in FIG. 15*b* to the extended position as shown in FIG. 15*a*. The width $T_C$ of the cycle of the reciprocating mechanism 200 is shown in FIG. 16. It can be seen that the pulse width when the motor 204 receives the voltage is for only part of the cycle of the reciprocating mechanism 200.

The width of the pulse $T_P$ as shown in FIG. 16 is 50% of the width of the cycle $T_P$ of the reciprocating mechanism 200. This would be the case where the motor 204 is powered for half of cycle of the reciprocating mechanism 200. In this case, the other half of the cycle, the reciprocating piston 232 moves due to the rammer 100 falling under the force of gravity and the generator 1304 is able to generate electrical energy. However, in other examples, the width of the pulse $T_P$ can be a greater or smaller proportion of the cycle $T_C$ of the reciprocating mechanism 200.

The generator 1304 will not capture all the kinetic energy from the reciprocating mechanism 200. Furthermore, the generator 1304 will create a braking effect on the reciprocating mechanism 200 as kinetic energy is converted into electrical energy. In this way, the generator 1304 will capture a proportion of the kinetic energy in the reciprocating mechanism 200. The proportion will depend on the gearing between the drive shaft 226 of the motor 204 and the eccentric drive wheel 236.

Figures 17A, 17B:
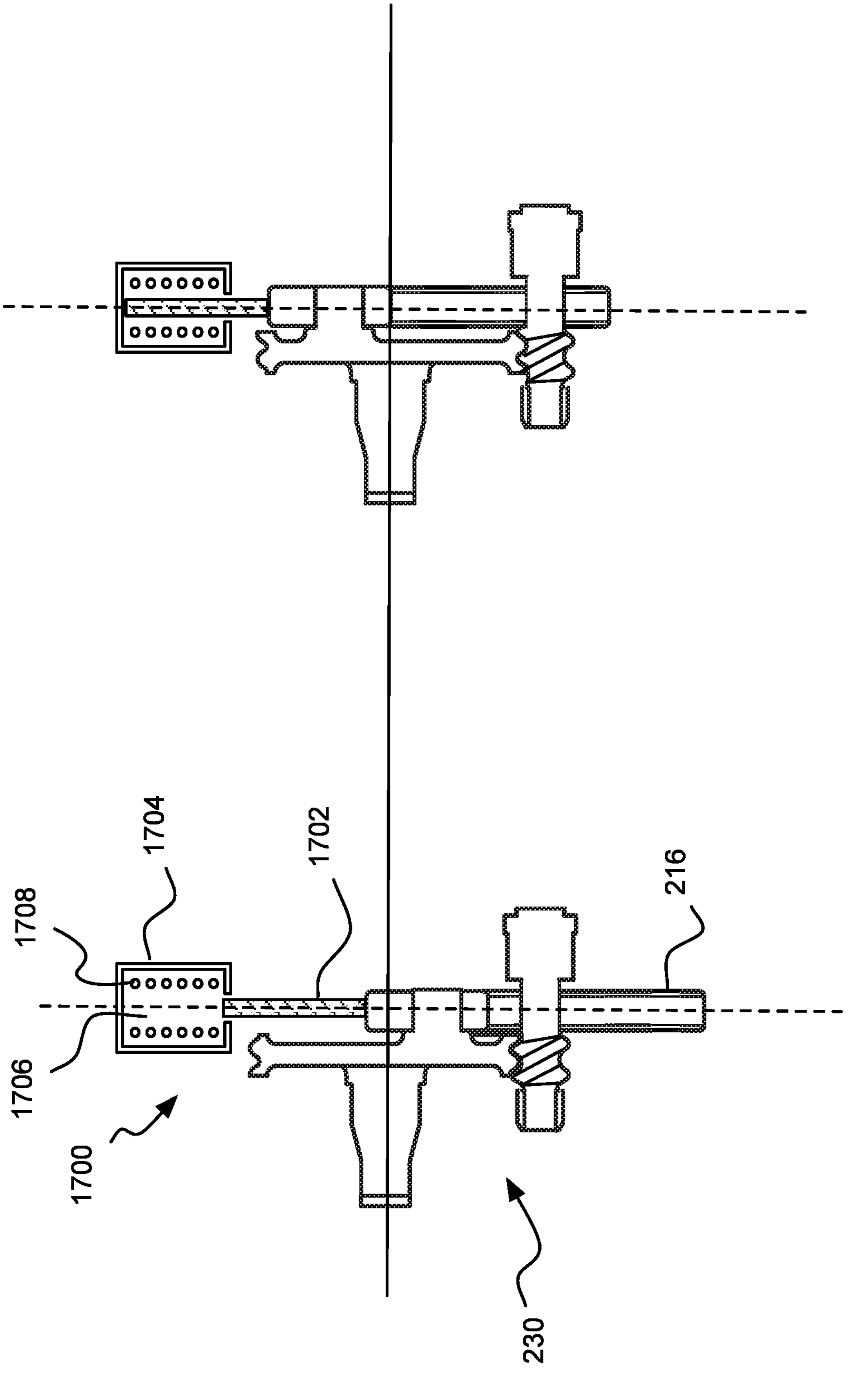
FIGS. 17*a* and 17*b* show close-up partial cross-sectional side views of a rammer according to an example.

Turning to FIGS. 17*a*, 17*b*, the rammer 100 will be described in more detail. FIGS. 17*a* and 17*b* show close-up partial cross-sectional side views of part of the reciprocating mechanism 200 in different parts of the cycle of the reciprocating mechanism 200.

FIG. 17*a* shows the reciprocating mechanism 200 in the part of the cycle where the reciprocating piston 232 is in the extended position. FIG. 17*b* shows the reciprocating mechanism 200 in the part of the cycle where the reciprocating piston 232 is fully retracted and in the retracted position.

The rammer 100 as shown in FIGS. 17*a* and 17*b* is the same as shown with respect to the previous Figures, except that the reciprocating mechanism 200 is coupled to a linear generator 1700. The linear generator 1700 comprises a moveable slider 1702 for sliding in and out of a generator housing 1704. The moveable slider 1702 is a permanent magnet 1702 and is configured to slide into a reciprocal recess 1706 within the generator housing 1704. One or more coils 1708 are wrapped around the reciprocal recess 1706 and are configured to generate a current when the moveable slider 1702 moves with respect to the coils 1708. The coils 1708 are connected to the second energy store 1302 and the second energy store 1302 stores electrical energy generated by the linear generator 1700.

In some examples, linear generator 1700 only generates current in the coils 1708 when the reciprocating piston 232 moves from the extended position as shown in FIG. 17*a* to the retracted position as shown in FIG. 17*a*. In other words, linear generator 1700 only generates electrical energy when the reciprocating piston 232 is moved due to the rammer 100 falling under the force of gravity. In some examples the controller 910 selectively connects the coils 1708 to the second energy store 1302 when the reciprocating piston 232 moves from the extended position to the retracted position. This means that the current does not flow from the coils 1708 to the second energy store 1302 when electrically disconnected.

In other examples the generator 1304 does not generate electrical energy during normal operation of the rammer 100. Instead, the controller 910 determines when the rammer 100 is being switched off or reducing the speed of the motor 204 and generates electrical energy as the motor 204 is slowing down from an operating speed.

For example, the controller 910 issues an instruction to the motor 204 to stop or slow down. This could be for example, the controller 910 has issued a stop control signal to the motor 204 as shown in step 1012 or a slow control signal to the motor 204 as shown in step 1014. Alternatively, the controller 910 may detect that the user is no longer gripping the handle 104 or actuating the user operated switch 902.

In this case, the controller 910 instructs the motor 204 and/or the generator 1304 to generate electrical energy from the reciprocating mechanism 200. In this way. The generator 1304 can provide additional braking to the reciprocating mechanism 200 as the generator 1304 or the motor 204 converts kinetic energy to electrical energy.

In some examples, the generator 1304 captures electrical energy both during normal operation as described in reference to FIGS. 14, 15*a*, 15*b*, 16, 17*a* and 17*b* and also captures electrical energy when the motor 204 slows down from an operating speed.

In some example, the generator 1304 may comprise more than one generator 1304 that captures electrical energy. For example, the generator 1304 may comprise the above described linear generator 1700 and the above described piezoelectric element, wherein both means provide electrical energy to the second energy store 1302. In some examples, the generator 1304 may be a combination of two or more of any of the above described means for converting mechanical energy to electrical energy for storage in the second energy store 1302.

In some examples, the electrical energy is stored in the second energy store 1302 such as a supercapacitor (not shown). The controller 910 is configured to discharge the supercapacitor to the motor 204 when needed. This can help to relieve the load on the first energy store 1300 e.g. the battery pack 202. Accordingly by using a supercapacitor to reduce the load on the battery pack 202, this can prevent overloading of the battery pack 202 and to increase lifetime of the battery pack 202. This is because the battery pack 202 will experience lower current peaks and current ripples.

Soft Start

Another example of the disclosure will now be described in reference to FIG. 23.

Figure 23:
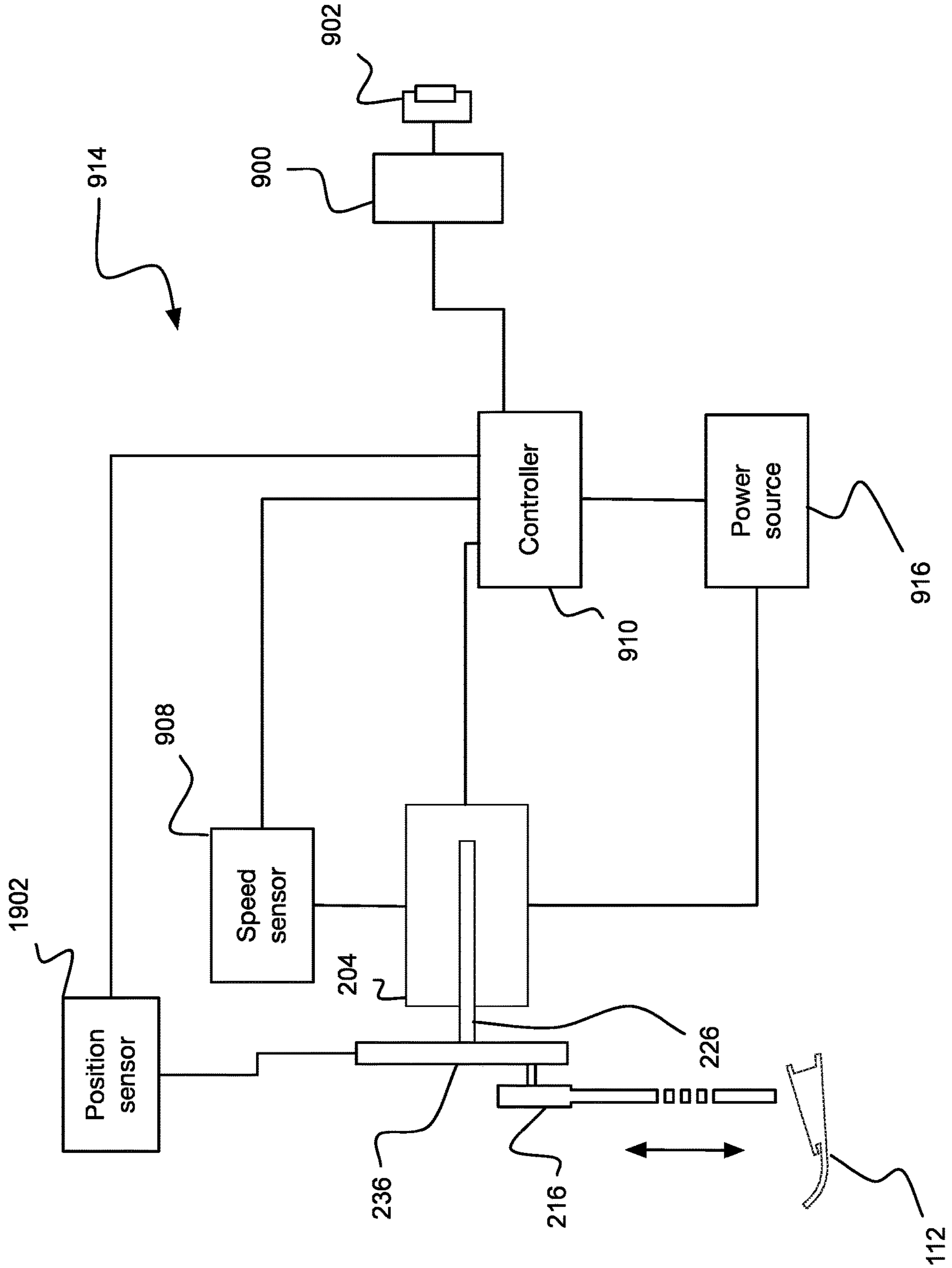
FIG. 23 shows a schematic view of a rammer according to an example.

The rammer 100 as described in reference to FIG. 23 is the same as shown the previous Figures. That is, the rammer 100 comprises a vibration compensation mechanism 230 as described in reference to FIGS. 1 to 8. Also, the rammer 100 detects whether the motor 204 is operating under a normal load as described in reference to FIGS. 9, 10, 11, 12, 13*a*, 13*b*, 13*c* and 21 and 22. Also, the rammer 100 captures energy as described in reference to FIGS. 14, 15*a*, 15*b*, 16, 17*a*, 17*b* and 18.

However, in the example described in reference to FIG. 23, the vibration compensation mechanism 230 is optional. Furthermore, the controller 910 detecting whether the motor 204 is operating under a normal load is optional. Also, the generator 1304 for capturing energy and the first and second energy stores 1300 and 1302 are optional.

FIG. 23 shows a circuit diagram for a rammer 100. However, in other examples any other type of surface compacting power tool 100 can be used. For example, the compacting power tool 100 can be a tamper, a soil compactor, a compactor, a jumping jack compactor, a plate compactor, a vibratory plate, a jumping jack tamper, a concrete vibrator, or a concrete screed.

As mentioned above, rammers conventionally use a centrifugal clutch in the transmission between the motor 204 and the reciprocating mechanism 200. The clutch engages when the motor 204 or engine reaches a certain speed. This results in an aggressive start for the rammer 100 as it suddenly starts reciprocating at a high speed when the clutch engages. This makes the handling of the rammer 100 more difficult. In this present disclosure, a rammer 100 with a "soft start" is provided. The rammer 100 comprises an electric motor 204 that is coupled (directly or via a transmission) to the reciprocating mechanism 200 without a centrifugal clutch.

The motor 204 may be a brushless direct current (BLDC) motor 204. The motor 204 may be an outer-rotor or external rotor BLDC motor 204, where the rotor on the outside of the stator. An outer rotor also provides higher magnetic flux and is also capable of producing more torque than a comparable inner rotor motor.

FIG. 23 shows a schematic diagram of a circuit 914 for a rammer 100. The controller 910 has a similar functionality as previously described with respect to FIGS. 9, 14 and 18.

The controller 910 is configured to control the speed and torque of motor 204, thereby controlling the speed of the reciprocating mechanism 200.

In some examples, the controller 910 is optionally connected to a speed sensor 908. In some examples the speed sensor 908 is a hall sensor configured to detect each revolution of the motor 204. In some alternative examples, the speed sensor 908 can be an optical sensor or any other suitable sensor configured to detect rotation of the motor 204, the rotatable motor shaft 226, or any other parts of the reciprocating mechanism 200 such as the eccentric drive wheel 236. The speed sensor 908 is configured to send a signal to the controller 910. The controller 910 is configured to determine the rotational speed of the motor 204 in dependence of the received signal from the speed sensor 908.

In some examples, the controller 910 is not connected to a speed sensor 908 and instead, the controller 910 receives information from a look-up table stored in memory (not shown) relating to the speed of the motor 204. For example, the controller 910 can receive estimated speed information based on voltage and current signals during operation.

In the example of FIG. 23, the motor shaft 226 is directly coupled to the eccentric drive wheel 236, which is connected to the reciprocating mass 216. In other examples, the motor shaft 226 may be coupled to the eccentric drive wheel 236 via a gear box, as mentioned above.

As mentioned above, the rammer 100 comprises a reciprocating mechanism 200 which moves between a first and second position. In one example, the first position may be a retracted position in which the reciprocating piston 232 is at its upper most position and closest position to the primary housing 102. The second position may be an extended position in which the reciprocating piston 232 is at its lower most position and its furthest position from the primary housing 102. The retracted position and the extended position of the reciprocating mechanism 200 comprise the limits of movement of the reciprocating mechanism 200 during a cycle of operation. A cycle of operation can be considered to be one full revolution of the reciprocating mechanism 200. For example, a cycle of operation is the eccentric drive wheel 236 completing one revolution or the reciprocating piston 232 moving from the retracted position to the extended position and then back to the retracted position.

The rammer 100 may comprise a position sensor 1902 to determine the position of the reciprocating piston 232. In some examples the position sensor 1902 is a hall sensor configured to detect the position of a magnetic element (not shown) located on the reciprocating piston 232, the connecting rod 216 or the eccentric drive wheel 236 or any other suitable part of the transmission. In some alternative examples, the position sensor 1902 can be an optical sensor or any other suitable sensor configured to detect the position of the piston 232. The position sensor 1902 is configured to send a signal to the controller 910. The controller 910 is configured to determine the position of the reciprocating piston 232 in dependence of the received signal from the position sensor 1902. In other examples, the position of the reciprocating piston 232 may be determined in a sensorless manner by inferring its position from motor parameters such as the position of the motor shaft 226 or the motor load or back EMF.

When the rammer 100 is not operating, the reciprocating mechanism 200, which comprises the eccentric drive wheel 236, the connecting rod 216 and the piston 232, is in a rest position. This position is dependent on the weight of the rammer 100 and the balance of the upper and lower springs 1904 and 1906 of the spring assembly. In an example, the rest position for the reciprocating mechanism 200 is shown in FIG. 20. As shown, the pin on the eccentric drive wheel 236 is at its upper most point and so the piston 232 (coupled to the pin via connecting rod 216) is also at its upper most position (also referred to herein as the retracted position). When operation of the rammer 100 is to start, the motor 204 needs to provide enough torque to push the piston 232 down to its lower most position (also referred to herein as the extended position) which, via the spring assembly, lifts the weight of the rammer 100 up. This requires a large amount of torque as there is no oscillating movement at start up to help move the weight of the rammer.

At start-up, to move the reciprocating piston 232 from the rest position, the controller 910 is configured to cause the motor 204 to operate at a high torque for the first half cycle. During the initial lift, the motor torque and speed can be kept constant (and so the motor power is kept constant) until the reciprocating piston 232 is at the extended position. Alternatively, during the initial half-cycle, the motor power is increased in a predefined manner up to the extended position. This allows the speed of the motor 204 to increase whilst maintaining the amount of torque applied.

Once at the extended position, the reciprocating piston 232 can move back to the retracted position for the subsequent half-cycle due to the weight of the rammer 100 falling under the force of gravity. In one example, the reciprocating piston 232 can move due to the force of gravity acting on the rammer 100 alone and so the motor 204 does not need to input any power for that half-cycle. In another example, the reciprocating piston 232 can move due to gravity acting on the rammer 100 whilst being assisted by the motor 204 for that half-cycle. However, as the reciprocating piston 232 moves in this half-cycle, the motor 204 does not need to input as much power due to the assistance from gravity. Thus, when the controller 910 determines that the reciprocating piston 232 is at the extended position (e.g., via position sensor 1902), the controller 910 is configured to cause the motor 204 to operate at no or low power when the piston 232 is moving from the extended position to the retracted position. Thus, during a single cycle of operation, the controller 910 controls the motor 204 such that it switches between a high torque/power mode and a no/low power mode based on the determined position of the mass 216.

In a subsequent cycle, the motor 204 can use the momentum generated and the oscillation from the spring assembly to increase the speed of the motor 204 from the initial cycle. As the piston 232 moves from the retracted position to the extended position, the controller 910 may increase the power from the motor 204 so as to maintain or increase the speed of the piston 232 as it moves against gravity. This process of increasing the speed to be faster than the previous cycle continues until the motor 204 speed is up to a target operating speed. Increasing the speed of the motor 204 in this way from start-up provides a relatively slow and gradual increase in the reciprocation of the rammer 100, which is easier for the user to handle. Once the motor 204 has reached the target operating speed, the controller 910 is configured to switch the operating mode of the motor 204 to a constant speed mode in which the motor 204 is controlled maintain a target speed.

Mass Dampener

Figure 24:
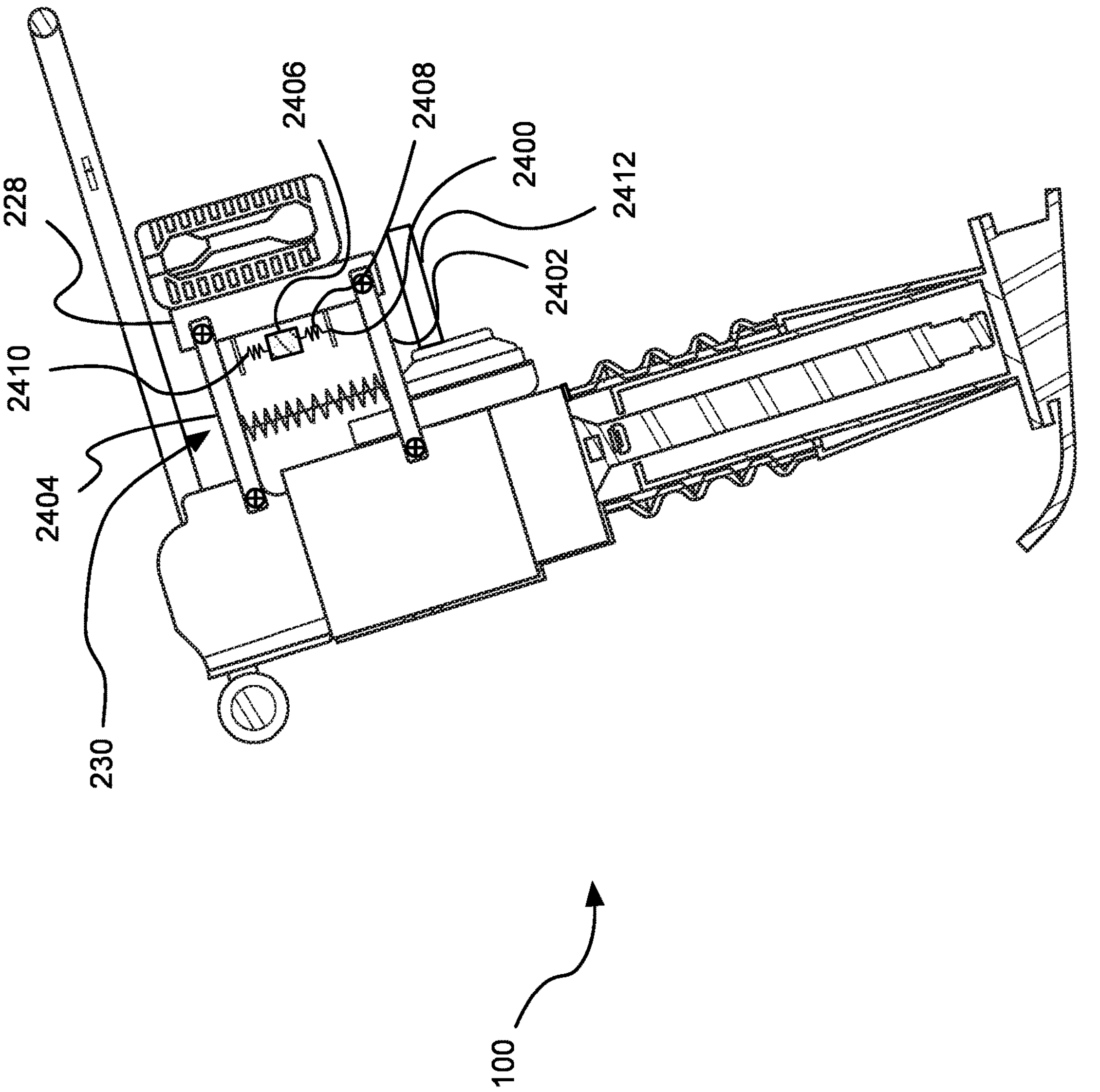
FIG. 24 shows cross-sectional side view of a rammer according to an example.

Turning to FIG. 24, another example will now be described. FIG. 24 shows cross-sectional side view of the rammer 100 according to an example. The rammer 100 as shown in FIG. 24 is the same as the previous examples as described with reference to the previously described Figures e.g. FIG. 8, except that the vibration compensation mechanism 230 is mounted with an alternative arrangement.

The vibration compensation mechanism 230 optionally comprises a mass dampening mechanism 2400. The mass dampening mechanism 2400 is configured to dampen vibrations in the battery carrier 228.

The carrier 228 is mounted to the primary housing 102 with lower parallel support arms 2402 and upper parallel support arms 2404. Similar to the arrangement as shown in FIG. 8, both the lower parallel support arms 2402 and the upper parallel support arms 2404 are pivotally mounted to both the primary housing 102 and the carrier 228. This means that the carrier 228 is decoupled from the primary housing 102 via the lower parallel support arms 2402 and the upper parallel support arms 2404. Furthermore, the lower parallel support arms 2402 and the upper parallel support arms 2404 are pivotally mounted to both the primary housing 102 and the carrier 228 on the left and/or right lateral sides 124, 304 of the housing below the top 214 of the primary housing 102.

The mass dampening mechanism 2400 comprises an anti-vibration mass 2406 mounted on a first spring 2408 and a second spring 2410. The anti-vibration mass 2406, the first spring 2408 and the second spring 2410 are mounted to the carrier 228. In some examples, the anti-vibration mass 2406, the first spring 2408 and the second spring 2410 are suspended in a mass dampening mechanism frame 2412 as shown in FIG. 24. The mass dampening mechanism 2400 is shown in FIG. 24 schematically, and the mounting arrangement of the anti-vibration mass 2406, the first spring 2408 and the second spring 2410 can be achieved in different ways.

The anti-vibration mass 2406 is configured to move when the rammer 100 is operational. In some examples, the mass dampening mechanism 2400 comprises a natural frequency which is the same or similar to the rammer frequency. This means that the mass dampening mechanism 2400 prevents or limits vibrations transmitted to the carrier 228. In some examples, the mass dampening mechanism 2400 is tuneable to a rammer frequency. The natural frequency of the mass dampening mechanism 2400 is tuned to the rammer frequency during calibration or manufacture.

Any of the other examples described in reference to any of the other Figures can be combined with the mass dampening mechanism 2400 as shown in FIG. 24. Accordingly any of the other examples can comprise the mass dampening mechanism 2400 in addition to other vibration dampening features.

Indeed, in some other examples, any suitable mounting arrangement can be used to mount the carrier 228 to the primary housing 102 to decouple the carrier 228 from the primary housing 102. This means that any suitable decoupling mounting arrangement can be used to mount the carrier 228 to the primary housing 102. Independent from the specific decoupling mounting arrangement used to mount the carrier 228 to the primary housing 102, the mass dampening mechanism 2400 can also be attached to prevent or limit vibrations transmitted to the carrier 228.

In some examples, the vibration compensation mechanism 230 as shown in FIG. 24 optionally comprises a limit stop 2412 underneath the lower parallel support arms 2402. The limit stop 2412 is mounted to the rear side 212 of the primary housing 102 and projects towards the carrier 228. The limit stop 2412 extends into the path of the carrier 228 and is configured to limit the extent of the movement of the carrier 228 and the battery pack 202. Any of the other examples described in reference to any of the other Figures can be combined with the limit stop 2412 as shown in FIG. 24.

Figure 25:
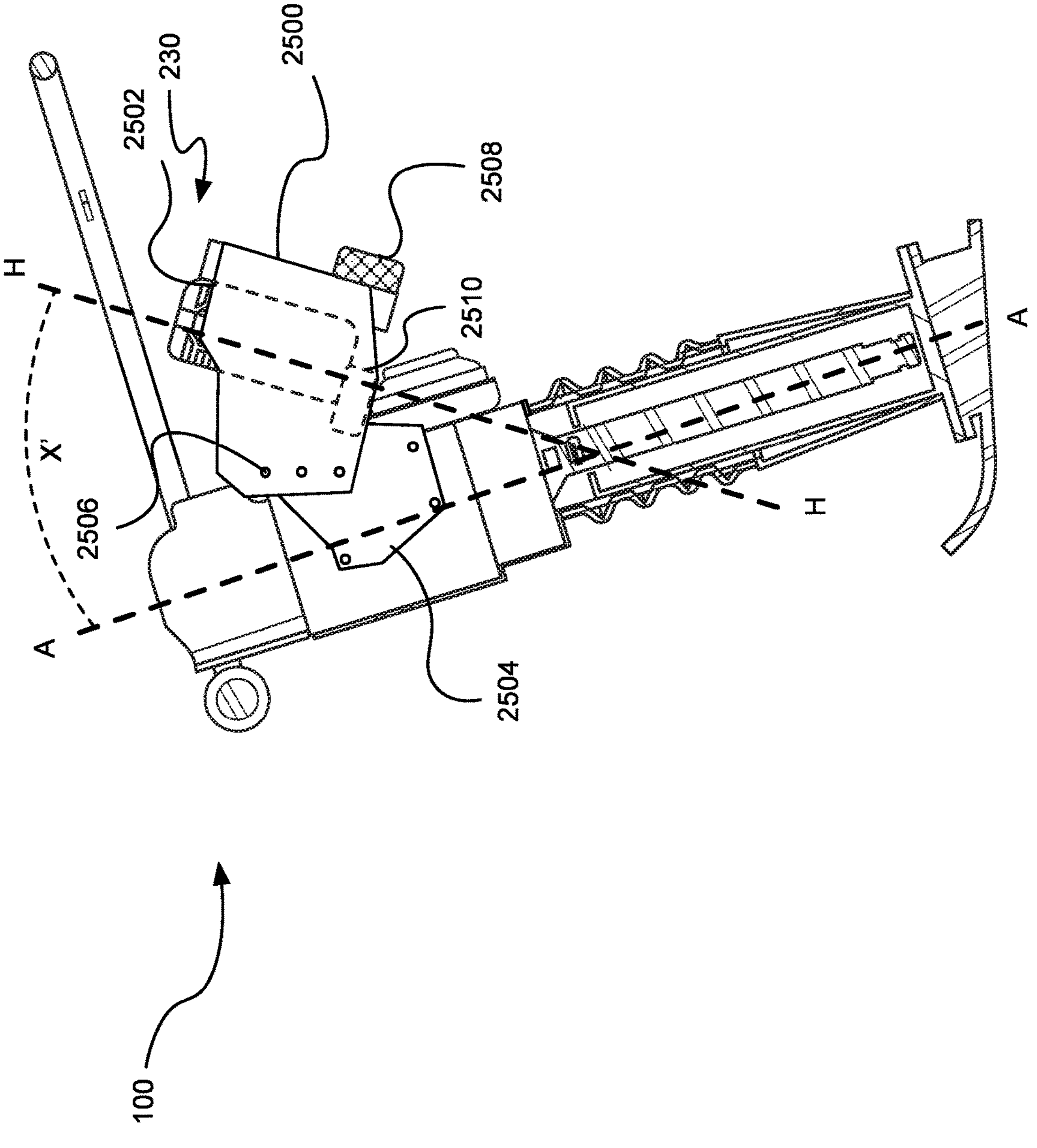
FIG. 25 shows cross-sectional side view of a rammer according to an example.

Another example will now be described in reference to FIG. 25. FIG. 25 shows cross-sectional side view of the rammer 100 according to an example. The rammer 100 as shown in FIG. 25 is the same as the previous examples as described with reference to the previously described Figures e.g. FIG. 8, except that the vibration compensation mechanism 230 is mounted with an alternative arrangement.

The lower parallel support arms 2402 and upper parallel support arms 2404 as shown in FIG. 24 have been replaced with a mounting frame 2500 comprising at least one mounting plate 2502. The battery pack 202 and the carrier 228 are mounted to the mounting plate 2502. The mounting frame 2500 in some examples comprises a plurality of mounting plates 2502 to enclose the battery pack 202 and the carrier 228. In some examples, the battery carrier 228 is fixed to the mounting frame 2500 by screws or any other suitable fastening means. In other examples, the battery carrier 228 is integral to the mounting frame 2500. The mounting frame 2500 is configured to move with respect to the primary housing 102 when the rammer 100 is operational.

The mounting frame 2500 can be mounted to the primary housing 102 via a housing plate 2504. The housing plate 2504 is a plate element fixed to the primary housing 102 and configured to receive the mounting frame 2500. A plurality of dampening elements, such as torsional dampeners 2506, are mounted between the inside surface of the mounting frame 2500 and the housing plate 2504. The torsional dampeners 2506 in some examples are rubber and cylindrical dampening elements. The torsional dampeners 2506 allow the mounting frame 2500 to move in any direction with respect to the housing plate 2504. One torsional dampener 2506 is labelled in FIG. 25 but there can be any number of torsional dampeners 2506 mounted between the mounting frame 2500 and the housing plate 2504. In other examples, the mounting frame 2500 is mounted directed to the primary housing 102 and the dampening elements are mounted between the mounting frame 2500 and the primary housing 102.

Whilst FIG. 25 only shows one side of the rammer 100, the primary housing 102 comprises a housing plate 2504 on both the left lateral side 124 and the right lateral side 304 of the rammer 100. The mounting frame 2500 is connected to the housing plates 2504 via torsional dampeners 2506 on both the left lateral side 124 and the right lateral side 304 of the primary housing 102.

Optionally, the carrier 228 and battery pack 202 is mounted along a longitudinal battery axis H-H. Similar to examples shown in FIG. 6*b*, the battery axis H-H as shown in FIG. 25 is inclined by angle x' to the longitudinal axis A-A of the rammer 100. In some examples, the angle of inclination x' of the longitudinal battery axis H-H is between 00 and 400. In some examples, the angle of inclination x' of the longitudinal battery axis H-H is between 250 and 300. In some examples, the angle of inclination x' of the longitudinal battery axis H-H is 300. In some examples, the angle of inclination x' of the longitudinal battery axis H-H is 25°, 26°, 27°, 28°, 29°, 30°, 310, 32°, 330, 340 or 350.

Optionally one or more electronic components of the circuit 914 e.g. the controller 910 are mounted to the carrier 228. In this way an electronics module is mounted to the carrier 228. The electronics module comprises one or more components for controlling the compacting power tool 100 e.g. the circuit 914 and the controller 910. As shown in FIG. 25, the electronics module is mounted in an electronics housing 2508 mounted to the side of the carrier 228. For example, FIG. 25 shows that the electronics housing 2508 is mounted to back of the carrier 228. In some other examples, the electronics housing 2508 is mounted to the mounting plate 2500. For example, the electronics housing 2508 can be positioned underneath the battery pack 202 as shown by the dotted electronics housing box labelled 2510. This means that the electronics housing 2508 is decoupled together with the battery pack 202 and the carrier 228 from the primary housing 102 via the vibration compensation mechanism 230. Accordingly, the vibration compensation mechanism 230 can limit vibrations transmitted to the circuit 914 mounted in the electronics housing 2508.

Dual Battery Compactor and Battery Control

Figure 26:
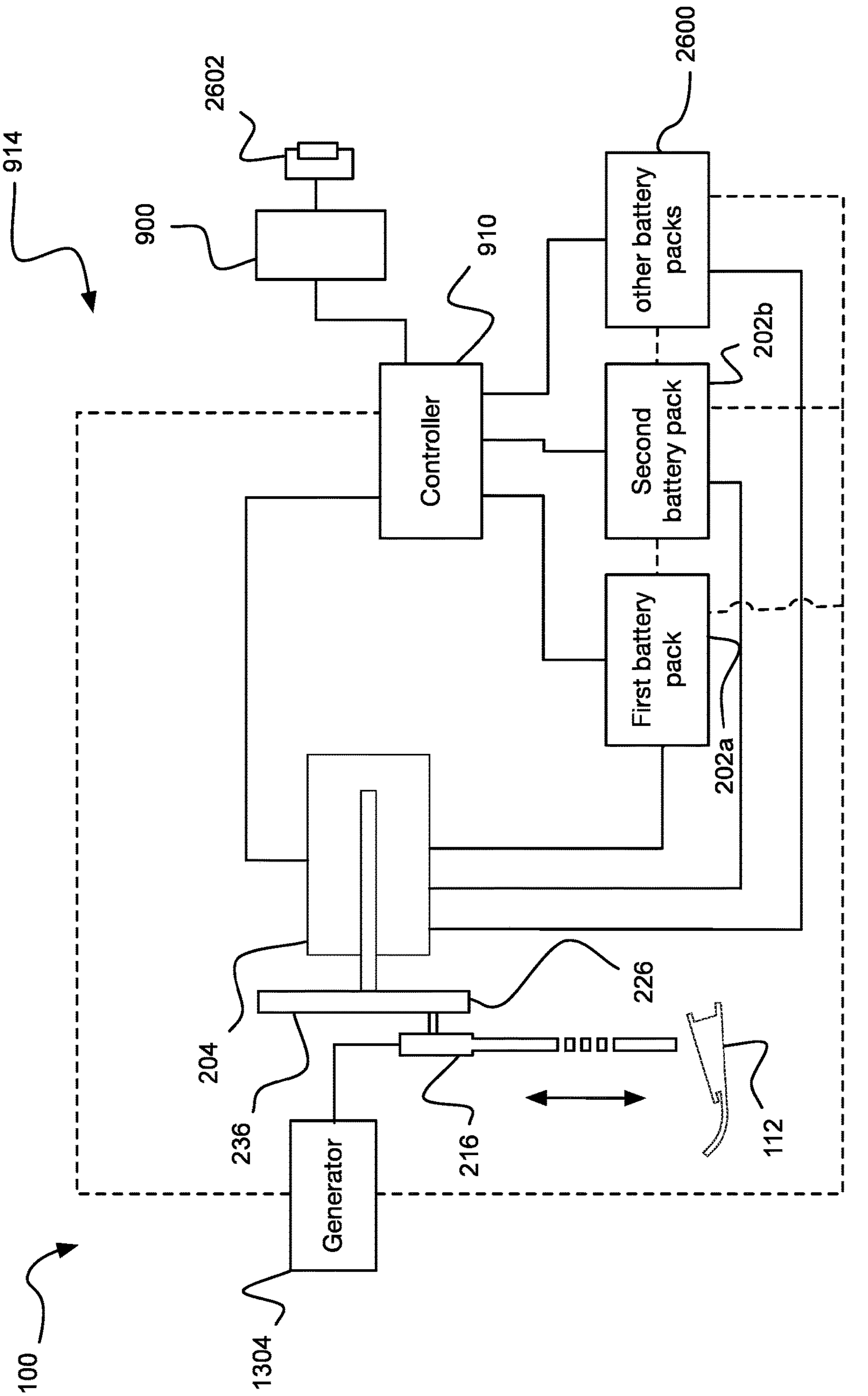
FIG. 26 shows a schematic view of a rammer according to an example.
Figure 27:
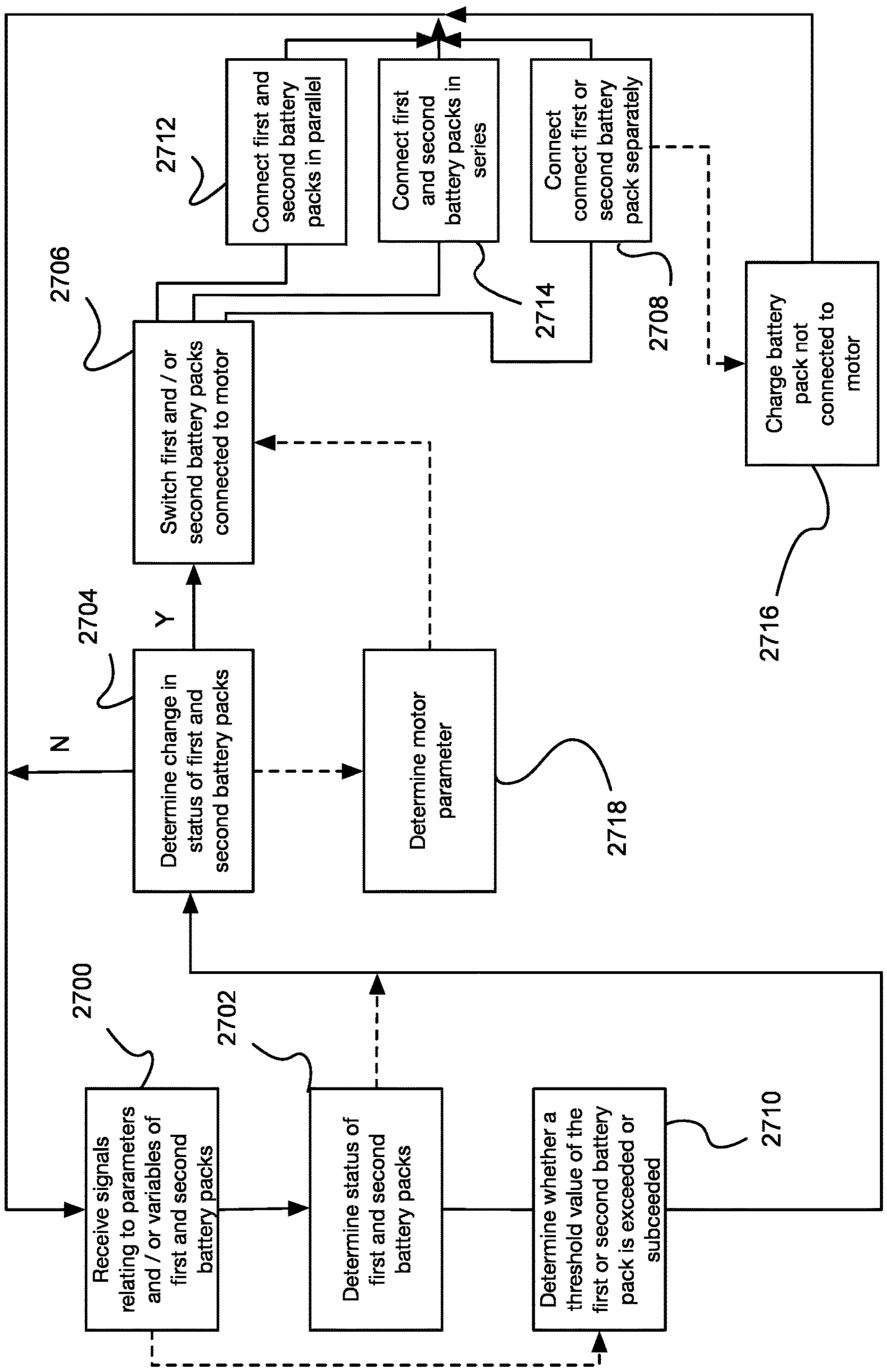
FIG. 27 shows a flow diagram of a control process for a rammer according to an example.

Another example of the rammer 100 will now be discussed in reference to FIGS. 26 and 27. FIG. 26 shows a schematic view of the rammer 100 according to an example and FIG. 27 shows a flow diagram of a control process for the rammer 100 according to an example. The examples as shown in FIG. 26 are identical to e.g. the examples as shown in FIG. 14 except that there may be different arrangement of components.

In some examples the first and second battery packs 202*a*, 202*b* are optionally mounted on separate vibration compensation mechanisms 230. In other examples, the first and second battery packs 202*a*, 202*b* are optionally mounted on a single vibration compensation mechanism 230. The vibration compensation mechanism 230 is the same as discussed with reference to the previous examples. In yet other examples the first and second battery packs 202*a*, 202*b* are optionally not mounted on any vibration compensation mechanism 230.

Examples described with reference to FIGS. 26 and 27 discuss the control of the first battery pack 202*a* and the second battery pack 202*b*. In some examples, the first battery pack 202*a* and the second battery pack 202*b* can be replaced with any suitable energy store e.g. the first and second energy stores 1300, 1302 as discussed in reference to FIG. 14. This means that the first battery pack 202*a* and the second battery pack 202*b* can be replaced with other energy storage devices e.g. a supercapacitor. Hereinafter, the reference will be made to the first battery pack 202*a* and the second battery pack 202*b* only. In another example, the first and/or second battery pack 202*a* and 202*b* may be replaced by an adaptor (not shown) that is configured to removably couple to the first or second battery connection 408 or 410 (also referred to herein as the first or second battery pack interface respectively). The adaptor is for connecting an AC power source to the rammer. The adaptor may removably couple to the first or second battery pack interface in the same way as the first or second battery pack 202*a* or 202*b*. The adaptor has an interface that is mechanically and electrically coupleable to the first or second battery pack interface. The adaptor is also connected to an AC power source (e.g., AC mains) via a cable. The adaptor has an AC to DC converter for converting the AC power from the AC mains to DC power to supply to the rammer. The adaptor may also have a voltage convertor for converting the AC mains (e.g., 230 VAC) voltage to the DC voltage required for the rammer motor (e.g., 40 VDC). The adaptor may be couple to one of the first or second battery pack interfaces and a battery pack may be coupled to the other of the first or second battery pack interfaces.

The first battery pack 202*a* and the second battery pack 202*b* can be each a single battery pack. In other examples, each of the first battery pack 202*a* and the second battery pack 202*b* can be each a group of battery packs or a group of battery cells. In some examples there can be other battery packs 2600. There can be any number of other battery packs 2600 as required. The example discussed below will only have a first battery pack 202*a* and a second battery pack 202*b* however the control functionality can be applied to any number of battery packs 202*a*, 202*b*, 2600 connected to the circuit 914 of the rammer 100.

The first and second battery packs 202*a*, 202*b* are electrically connectable to the motor 204. The first and second battery packs 202*a*, 202*b* can be connected together to the motor 204 in series or parallel. Alternatively, the first and second battery packs 202*a*, 202*b* are connectable separately to the motor 204. In other words, only one of the first and second battery packs 202*a*, 202*b* is connected to the motor 204 at any one time. In this example, a controller 910 is configured to selectively connect the first battery pack 202*a* and/or the second battery pack 202*b* to the motor 204.

In some examples, the controller 910 can switch the connection of the first and second battery packs 202*a*, 202*b* to the motor 204 between a series connection of the first and second battery packs 202*a*, 202*b*, a parallel connection of the first and second battery packs 202*a*, 202*b*, a single connection of the first battery pack 202*a* and a single connection of the second battery pack 202*b*.

Similar to the examples as discussed in reference to FIG. 14, a controller 910 is connected to the first battery pack 202*a* and the second battery pack 202*b*. The controller 910 is configured to issue control instructions to the first and second battery packs 202*a*, 202*b*. In some examples, the controller 910 is a separate battery controller configured to control the connections of the first and second battery packs 202*a*, 202*b* to the motor 204. However, in other examples (and as shown in FIG. 26) the controller 910 is configured to control the connections of the first and second battery packs 202*a*, 202*b* in addition to the control logic discussed with reference to the previous examples. Accordingly the controller 910 is configured to selectively connect the first battery pack 202*a* and/or the second battery pack 202*b* to the motor 204.

The controller 910 is configured to receive signals relating to parameters and/or variables for the first and second battery packs 202*a*, 202*b* as shown in step 2700 of FIG. 27. In a first example, the controller 910 optionally receives a manual input from a user. The manual input from the user is received from a user actuated battery switch 2602 mounted on the control panel 900. When the controller 910 receives the signal from the user actuated switch 2602, the controller 910 determines a status of the first and second battery packs 202*a*, 202*b* as shown in step 2702. For example, the actuation of the battery switch 2602 indicates to the controller 910 that the first battery pack 202*a* connected to the motor 204 has a low charge status.

The user may actuate the battery switch 2602 in response to the user seeing that the charge in the first battery pack 202*a* is depleted. The user may determine the charge status from the first battery pack 202*a* itself. For example, the first battery pack 202*a* may comprise charge indication LEDs (not shown). In another example, a display (e.g., a row of LEDs or a screen) may be provided on the handle 104 (or any other part of the rammer that is in the line of sight of the user from the operating position) that displays a state of charge for each battery pack 202*a*, 202*b*. The display may be electrically connected to battery packs 202*a*, 202*b* directly or via the controller 910. In another example, the display may wirelessly communicate (e.g., via Bluetooth) with the controller 910 to receive state of charge information wirelessly.

Once the controller 910 determines that the user has actuated the battery switch 2602, the controller 910 determines that a change in status of the first battery pack 202*a* has occurred as shown in step 2704. This means that there is a required change connection status of the current battery pack e.g. the first battery pack 202*a* connected to the motor 204. The controller 910 then issues a control instruction to the circuit 914 to connect the second battery pack 202*b* to the motor 204 as shown in step 2706. At the same time the controller 910 issues another control instruction to disconnect the first battery pack 202*a* from the motor 204. In this way the controller 910 separately connects the first or second battery packs 202*a*, 202*b* to the motor 204 as shown in step 2708. Once the second battery pack 202*b* is connected to the motor 204, the user can continue operating the rammer 100 normally.

In another example, there is optionally no manual input from the user via the battery switch 2602. Instead the controller 910 selectively controls the connection of the first battery pack 202*a* and/or the second battery pack 202*b* automatically. For example, the controller 910 can switch the connection to the motor 204 between the first and second battery packs 202*a*, 202*b* in dependence of the operational status of the first and second battery packs 202*a*, 202*b*.

In some examples, in step 2700 the controller 910 is configured to receive operational status information from the first and second battery packs 202*a*, 202*b*. The operational status information can comprise one or more of the following battery voltage, battery capacity, battery temperature, battery discharge rate, battery current or any other battery parameter or status information.

Once the controller 910 has received the signal from the first and second battery packs 202*a*, 202*b*, the controller 910 determines the current status information of the first and second battery packs 202*a*, 202*b* in step 2702. For example, the controller 910 determines that the first battery pack 202*a* which is connected to the motor 204 has an instantaneous operating temperature, an instantaneous operating voltage and/or an instantaneous remaining battery capacity.

The controller 910 then compares the determined status information of the first and second battery packs 202*a*, 202*b* to predetermined threshold values as shown in step 2710. The predetermined threshold values may optionally comprise operating voltage ranges, operating battery capacity and operating battery temperature. In some examples the predetermined threshold values are a look up table stored in memory of the controller 910.

For example in step 2710, the controller 910 determines that the battery capacity of the first battery pack 202*a* connected to the motor 204 has subceeded or dropped below a threshold of e.g. 30%, 25%, 20%, 15%, 10%, or 5% of the total battery capacity of the first battery pack 202*a*.

Alternatively, in step 2710, the controller 910 determines that the operating temperature of the first battery pack 202*a* connected to the motor 204 has exceeded an operating temperature threshold e.g. 60° C., 55° C., 50° C., 45° C., 40° C. etc.

Once the controller 910 has determined that the first battery pack 202*a* is operating outside the normal operating parameters in step 2710, the controller 910 determines similarly in step 2704 that the operational status of the first battery pack 202*a* has changed. Accordingly, the controller 910 issues a control instruction in step 2706 to the circuit 914 to connect the second battery pack 202*b* to the motor 204 and disconnect the first battery pack 202*a* from the motor 204 as shown in step 2708.

If the controller 910 determines that the first battery pack 202*a* is operating normally in step 2704 and there has not been a change in the operational status of the first battery pack 202*a*, the controller 910 does not issue a control instruction to change the connection to the motor 204 between the first and second battery packs 202*a*, 202*b*. Instead, the controller 910 returns to step 2700 and continues to receive signals relating to parameters and/or variables relating to the first and second battery packs 202*a*, 202*b*.

In some examples, the controller 910 issues a control instruction to charge the first battery pack 202*a* with the generator 1304 or energy recovery system as shown in step 2716. The generator 1304 or energy recovery system is the same as discussed in the previous examples e.g. in reference to FIGS. 13, 14 etc. This means that the first battery pack 202*a* can charge whilst the second battery pack 202*b* continues to power the motor 204.

Optionally, the controller 910 can issue a control instruction to the circuit 914 to connect the first and second battery packs 202*a*, 202*b* in parallel as shown in step 2712 or in series as shown in step 2714. This can provide a different voltage and current to the motor 204 if required.

As mentioned above, in some examples the first and second battery packs 202*a*, 202*b*, comprise battery circuits comprising the battery controller 210. The controller 910 in some examples is configured to receive operational data from the battery controller 210 as shown in step 2700. In some examples, the operational data is one or more error signals e.g. an error code indicating a fault or malfunction of the first or second battery packs 202*a*, 202*b*.

In this case in the controller 910 determines a fault status of the first battery pack 202*a* as shown in step 2702. The controller 910 determines that the first battery pack 202*a* has changed from normally operating to malfunctioning and needs to be disconnected from the motor 204. The controller 910 then connects the second battery pack 202*b* to the motor 204 and disconnects the first battery pack 202*a* is previously discussed.

In another example, the controller 910 is optionally configured to optimizing the voltage provided to the motor 204 by selectively connecting the first and second battery packs 202*a*, 202*b* to the motor 204. In this way, the controller 910 is configured to optimize the voltage provided to the motor 204 as the first and second battery packs 202*a*, 202*b* discharge.

The controller 910 is optionally configured to determine a motor parameter in step 2718. The controller 910 determines that the motor 204 may be rated for a first voltage, e.g., 40V. The controller 910 in some examples determines the motor voltage rating based on information stored in memory of the controller 910. The controller 910 may determine that the first and second battery packs 202*a*, 202*b*, at full charge, provide a second voltage. In some examples, the second voltage is higher than the first voltage e.g., 60V.

In some cases, the controller 910 selectively connects the first and second battery packs 202*a*, 202*b* to the motor 204. This means that the controller 910 does not need to use pulse width modulation (PWM) at a duty cycle to provide the lower first voltage to the motor 204 from e.g., the first battery pack 202*a* at the higher second voltage.

This can be advantageous because the controller 910 can avoid the inherent losses caused by PWM switching. In this case, the controller 910 can selectively connect the first and second battery packs 202*a*, 202*b* to the motor 204 with a 100% duty cycle.

In some examples in steps 2702, 2704, the controller 910 determines the current battery capacity of the first battery pack 202*a* and the second battery pack 202*b*. The controller 910 may determine that the first battery pack 202*a* and the second battery pack 202*b* may have a different state of charge. Accordingly, the controller 910 determines that the first battery pack 202*a* and the second battery pack 202*b* have different instantaneous voltages.

After the controller 910 determines the motor voltage rating in step 2718, the controller 910 determines which of the first and second battery pack 202*a*, 202*b* has an instantaneous voltage closer to the motor voltage rating. The controller 910 in step 2706 connects to either the first battery pack 202*a*, or the second battery pack 202*b* in dependence of which instantaneous voltage of the first and second battery packs 202*a*, 202*b* is closer to the motor voltage rating. In this way, the controller 910 can supply the correct voltage to the motor 204 whilst minimizing the PWM switching.

In step 2706, if the controller 910 determines that the motor voltage rating is 40V and the first battery pack 202*a* has an instantaneous voltage of 60V and the second battery pack 202*b* has an instantaneous voltage of 45V, then the controller 910 will connect the second battery pack 202*b* to the motor 204. This is because the voltage of the second battery pack 202*b* is closer to the motor voltage rating. This will mean that it may be more efficient to run the motor 204 from the second battery pack 202*b* so that limited or no PWM switching is needed.

In another example, controller 910 determines that the motor 204 requires different voltages in dependence of the motor speed. Accordingly, in step 2718 the controller 910 determines the required motor speed. Information relating to the required motor speed in some examples is received by the controller 910 in a signal. The signal may be generated by a user input e.g., a trigger switch or a speed dial. In step 2718 the controller 910 determines that a high motor speed or a low motor speed is required. The controller 910 determines the high motor speed voltage or the low motor speed voltage. Accordingly, the controller 910 determines the required motor voltage. The controller 910 determines in step 2706 which of the voltages of the first or second battery packs 202*a*, 202*b* most closely matches the required motor voltage.

For example, the controller 910 may determine that the required motor voltage for a low-speed rating is 40V and the first battery pack 202*a* has an instantaneous voltage of 60V and the second battery pack 202*b* has an instantaneous voltage of 40V. In this case, the controller 910 determines in step 2706 that the second battery pack 202*b* voltage is closest to the required motor voltage. The controller 910 then connects the second battery pack 202*b* to the motor 204.

Alternatively, the controller 910 may determine that the required motor voltage for a high-speed rating is 60V and the first battery pack 202*a* has an instantaneous voltage of 60V and the second battery pack 202*b* has an instantaneous voltage of 40V. In this case, the controller 910 determines in step 2706 that the first battery pack 202*a* voltage is closest to the required motor voltage. The controller 910 then connects the first battery pack 202*a* to the motor 204.

Furthermore, in some examples, the controller 910 is configured to connect the first and second battery packs 202*a*, 202*b* in series in parallel in step 2712 or in series as in step 2714 in order to generate a voltage supplied by the first and second battery packs 202*a*, 202*b* as close as possible to match the required motor voltage.

In another example, two or more examples are combined. Features of one example can be combined with features of other examples.

Examples of the present disclosure have been discussed with particular reference to the examples illustrated. However it will be appreciated that variations and modifications may be made to the examples described within the scope of the disclosure.

The invention claimed is:

1. A compacting power tool comprising:

a motor;

a housing;

at least one handle connected to the housing;

a reciprocating drive mechanism coupled to the motor;

a compacting foot coupled to the reciprocating drive mechanism and configured to engage a surface to be compacted; and a battery carrier coupled to a vibration compensation mechanism moveably mounted on a side of the housing.

2. A compacting power tool according to claim 1 wherein the vibration compensation mechanism is moveable between a first position and a second position during operation.

3. A compacting power tool according to claim 1 wherein the vibration compensation mechanism comprises at least one pivotable coupling.

4. A compacting power tool according to claim 3 wherein the vibration compensation mechanism comprises a first pivotable coupling to the housing and a second pivotable coupling to the handle.

5. A compacting power tool according to claim 3 wherein the vibration compensation mechanism comprises a vibration dampening mechanism.

6. A compacting power tool according to claim 5 wherein the vibration dampening mechanism comprises a frequency tuning mechanism.

7. A compacting power tool according to claim 6 wherein the frequency tuning mechanism comprises at least one spring.

8. A compacting power tool according to claim 1 further comprising a battery removably coupled to the battery carrier, the battery carrier comprises at least one electrical connection configured to electrically couple battery with the motor.

9. A compacting power tool according to claim 8 wherein at least one air conduit is connected between the housing and the vibration compensation mechanism for providing an air flow to the battery.

10. A compacting power tool according to claim 9 wherein the at least one air conduit are moveable with respect to the housing or the vibration compensation mechanism.

11. A compacting power tool according to claim 8 wherein at least one wire conduit is connected between the housing and the vibration compensation mechanism for routing wiring between the motor and the battery.

12. A compacting power tool according to claim 2 wherein the reciprocating drive mechanism and the compacting foot are configured to move substantially along a longitudinal axis of the compacting power tool.

13. A compacting power tool according to claim 12 wherein the vibration compensation mechanism is configured to move along a second axis remote from the longitudinal axis.

14. A compacting power tool according to claim 13 wherein the second axis is not perpendicular to the longitudinal axis.

15. A compacting power tool according to claim 14 wherein the longitudinal axis of the compacting power tool is inclined with respect to a plane of the compacting foot.

16. A compacting power tool according to claim 15 wherein the battery is mounted on the vibration compensation mechanism at a position between an intersection of the longitudinal axis of the compacting power tool and the plane of the compacting foot and the handle.

17. A compacting power tool according to claim 16 wherein at least a portion of the vibration compensation mechanism is mounted on a side of the housing between the motor and the handle.

18. A compacting power tool according to claim 16 wherein the battery carrier is mounted on a first and/or second lateral side of the housing extending between a front side and a rear side of the housing.

19. A compacting power tool according to claim 2 wherein the vibration compensation mechanism comprises a mass dampener.

20. A compacting power tool according to claim 1 wherein the battery carrier is mounted to at least one moveable plate and the at least one moveable plate is coupled to the housing via at least one torsional dampener.

21. A compacting power tool comprising:
- a housing having a motor mounted within the housing;
- at least one handle connected to the housing;
- a reciprocating drive mechanism coupled to the motor;
- a compacting foot coupled to the reciprocating drive mechanism and configured to engage a surface to be compacted; and
- a battery electrically connected to the motor is mounted on a side of the housing between the motor and the handle.

22. A compacting power tool comprising:
- a motor;
- a housing;
- at least one handle connected to the housing;
- a reciprocating drive mechanism coupled to the motor;
- a compacting foot coupled to the reciprocating drive mechanism and configured to engage a surface to be compacted; and
- first battery pack and second battery pack being electrically connectable to the motor.

23. A compacting power tool according to claim 22 wherein the first battery pack and the second battery pack are connected in series.

24. A compacting power tool according to claim 22 wherein the first battery pack and the second battery pack are connected in parallel.

25. A compacting power tool according to claim 22 wherein the compacting power tool comprises a controller configured to selectively connect the first battery pack and the second battery pack to the motor.

26. A compacting power tool according to claim 25 wherein the controller is configured to connect the first battery pack and/or the second battery pack to the motor in dependence of a received signal.

27. A compacting power tool according to claim 26 wherein the received signal is a manually actuated signal indicating a user battery selection.

28. A compacting power tool according to claim 26 wherein the received signal comprises a voltage indication the first battery pack and the second battery pack and the controller is configured to connect the motor to the first battery pack and/or the second battery pack in dependence of the voltage indication of the first battery pack and/or the second battery pack.

29. A compacting power tool according to claim 28 wherein the controller is configured to connect the first battery pack and/or the second battery pack to the motor in series, in parallel or separately.

30. A compacting power tool according to claim 28 wherein the controller is configured to compare the voltage indication of the first battery pack and the second battery pack and connect the first battery pack or the second battery pack in dependence of the voltage indication of the first battery pack or the second battery pack being closest to a required voltage of the motor.

31. A compacting power tool according to claim 30 wherein the required voltage of the motor is in dependence of the motor speed, a motor voltage rating, or a motor parameter.

32. A compacting power tool according to claim 26 wherein the received signal comprises an indication that a status of one of the first battery pack and the second battery pack has exceeded a threshold and the controller is configured to connect the motor to the other of the first battery pack and second battery pack which has not exceeded the threshold.

33. A compacting power tool according to claim 32 wherein the threshold is a battery operating temperature threshold, a battery capacity threshold, a battery voltage threshold, or a battery current threshold.

34. A compacting power tool according to claim 26 wherein the received signal is signal indicating an error status of one of the first battery pack and the second battery pack is malfunctioning or disconnected and the controller is configured to connect the motor to the other of the first battery pack and the second battery pack.

35. A compacting power tool comprising:

a motor;

a housing;

at least one handle connected to the housing;

a reciprocating drive mechanism coupled to the motor;

a compacting foot coupled to the reciprocating drive mechanism and configured to engage a surface to be compacted;

a first battery pack interface and a second battery pack interface;

a battery pack couplable to one of the first and second battery pack interfaces;

an adaptor couplable to the other of the first and second battery pack interfaces, wherein the adaptor is connected to an alternating current (AC) power source and comprises an AC to direct current (DC) converter for converting AC power from the AC power source to DC power.

* * * * *